US012135478B2

(12) United States Patent
Murata et al.

(10) Patent No.: US 12,135,478 B2
(45) Date of Patent: Nov. 5, 2024

(54) LIQUID CRYSTAL PANEL AND DISPLAY DEVICE

(71) Applicant: Sharp Display Technology Corporation, Kameyama (JP)

(72) Inventors: Koji Murata, Kameyama (JP); Hiroshi Tsuchiya, Kameyama (JP); Takashi Satoh, Kameyama (JP); Shinji Shimada, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/102,883

(22) Filed: Jan. 30, 2023

(65) Prior Publication Data

US 2023/0251522 A1 Aug. 10, 2023

(30) Foreign Application Priority Data

Feb. 4, 2022 (JP) .................................. 2022-016591
Jun. 22, 2022 (JP) .................................. 2022-100396

(51) Int. Cl.
*G02F 1/1335* (2006.01)
*G02F 1/13357* (2006.01)
(Continued)

(52) U.S. Cl.
CPC .. *G02F 1/133531* (2021.01); *G02F 1/133512* (2013.01); *G02F 1/133514* (2013.01);
(Continued)

(58) Field of Classification Search
CPC ......... G02F 1/133531; G02F 1/134318; G02F 1/13706; G02F 1/134372; G02F 1/133512;
(Continued)

(56) References Cited

U.S. PATENT DOCUMENTS

RE36,654 E * 4/2000 Conner ................. G06F 1/1601
349/97
6,727,968 B1 * 4/2004 Bryan-Brown ... G02F 1/133703
349/169
(Continued)

FOREIGN PATENT DOCUMENTS

JP          2008-203565 A          9/2008

OTHER PUBLICATIONS

Birendra Bahadur, Liquid Crystals Applications and Uses, World Scientific, vol. 1, pp. 171-194 (Year: 1990).*
(Continued)

*Primary Examiner* — Dung T Nguyen
*Assistant Examiner* — David Y Chung
(74) *Attorney, Agent, or Firm* — ScienBiziP, P.C.

(57) ABSTRACT

Provided is a liquid crystal panel sequentially including: a first polarizing plate with a first absorption axis; a first substrate including a first electrode; a liquid crystal layer containing liquid crystal molecules; and a second substrate including a second electrode. The liquid crystal panel satisfies the following Formula (1) as well as the following Formula (2-1) or Formula (2-2):

$$5° \leq |\varphi 1 - \varphi 2| \leq 20°$$ (Formula 1)

$$5° \leq |\varphi P1 - \varphi 2| \leq 20°$$ (Formula 2-1)

$$65° \leq |\varphi P1 - \varphi 2| \leq 80°$$ (Formula 2-2)

wherein φ1 represents an azimuthal angle of a director of liquid crystal molecules near the first substrate, φ2 represents an azimuthal angle of a director of liquid crystal molecules near the second substrate, and φP1 represents an azimuthal angle of the first absorption axis of the first polarizing plate, each with no voltage applied.

1 Claim, 37 Drawing Sheets

(51) Int. Cl.
*G02F 1/1343* (2006.01)
*G02F 1/137* (2006.01)

(52) U.S. Cl.
CPC .. *G02F 1/133603* (2013.01); *G02F 1/134318* (2021.01); *G02F 1/134363* (2013.01); *G02F 1/134372* (2021.01); *G02F 1/13706* (2021.01)

(58) Field of Classification Search
CPC ......... G02F 1/133514; G02F 1/133603; G02F 1/13463; G02F 1/1347; G02F 1/13471
USPC .......................................................... 349/76
See application file for complete search history.

(56) References Cited

U.S. PATENT DOCUMENTS

| 11,002,998 | B2 | 5/2021 | Hopkin et al. | |
|---|---|---|---|---|
| 2002/0060761 | A1* | 5/2002 | Scheuble | G02F 1/1396 349/123 |
| 2003/0147030 | A1* | 8/2003 | Sone | G02F 1/133555 349/113 |
| 2005/0190326 | A1* | 9/2005 | Jeon | G02F 1/133634 349/117 |
| 2011/0090433 | A1* | 4/2011 | Sakuragi | G02F 1/1396 349/96 |
| 2015/0168780 | A1* | 6/2015 | Ohno | G02F 1/133634 349/61 |
| 2016/0054573 | A1* | 2/2016 | Kasano | G02B 30/28 349/33 |
| 2017/0329073 | A1* | 11/2017 | Liu | G02B 6/0053 |
| 2021/0333580 | A1* | 10/2021 | Matsushima | G02F 1/13471 |

OTHER PUBLICATIONS

Min-Hsuan Chiu et al., "Advanced Hyper-Viewing Angle Controllable LCD", 543 • SID 2021 Digest, ISSN 0097-996X/21/5202-0543-$1.00 © 2021 SID.

* cited by examiner

Number of logos: 160 (16×10)

No ITO in portion with "SHARP" logos (Viewing surface side)

(Back surface side)

LIQUID CRYSTAL PANEL AND DISPLAY DEVICE

CROSS-REFERENCE TO RELATED APPLICATIONS

The present application claims priority under 35 U.S.C. § 119 to Japanese Patent Application No. 2022-016591 filed on Feb. 4, 2022 and Japanese Patent Application No. 2022-100396 filed on Jun. 22, 2022, the contents of which are incorporated herein by reference in their entirety.

BACKGROUND OF THE INVENTION

Field of the Invention

The following disclosure relates to liquid crystal panels and display devices including the liquid crystal panels.

Description of Related Art

Liquid crystal panels are panels utilizing a liquid crystal composition to control light passing therethrough. In a typical mode thereof, voltage is applied to a liquid crystal composition sealed between paired substrates such that the alignment of liquid crystal molecules in the liquid crystal composition is changed according to the applied voltage, whereby the amount of light passing through the panel is controlled. Such liquid crystal panels have advantageous features such as thin profile, light weight, and low power consumption, and are therefore used in a variety of fields.

Studies to enhance the viewing angle characteristics of display devices have been made such that the same image can be observed regardless of whether the angle of observation is in a narrow viewing angle range or a wide viewing angle range. Meanwhile, a display method considered in terms of privacy protection is one that allows observation of an image in a narrow viewing angle range but makes the image difficult to observe in a wide viewing angle range. Such studies and consideration suggest a desire for display devices capable of switching between these modes, namely the public mode (wide viewing angle mode) that allows observation of the same image both in a narrow viewing angle range and in a wide viewing angle range and the privacy mode (narrow viewing angle mode) that allows observation of an image in the narrow viewing angle range but makes the image difficult to observe in the wide viewing angle range.

A technique related to a liquid crystal panel used for such a display device capable of switching between the public mode and the privacy mode is disclosed in JP 2008-203565 A, for example. JP 2008-203565 A discloses a viewing angle-controlling liquid crystal panel which, when placed on the front or back surface of a display panel, controls the viewing angle of an image displayed on the display panel, and includes a liquid crystal layer and pixels as units used in application of voltage to the liquid crystal layer. Linearly polarized light is to be incident on the liquid crystal layer. On the surface of the liquid crystal layer from which light is to be emitted is provided a polarizing plate that transmits only light components parallel to the polarization axis of the linearly polarized light incident on the liquid crystal layer, among the light components emitted from the liquid crystal layer. The liquid crystal molecules in the liquid crystal layer tilt in the direction parallel or perpendicular to the polarization axis of linearly polarized light incident on the liquid crystal layer when voltage is applied to the liquid crystal layer. The pixels are arranged in a matrix pattern.

U.S. Pat. No. 11,002,998 B2 discloses a backlight system for controlling a viewing angle, the backlight system including: a first backlight unit that emits light from a non-viewing side of the backlight system toward a viewing side of the backlight system; a second backlight unit located on a viewing side of the first backlight unit that emits light toward the viewing side of the backlight system; a privacy optic that includes a liquid crystal material and is located on a non-viewing side of the second backlight unit and between the first backlight unit and the second backlight unit, wherein the privacy optic operates to transmit light from the first backlight unit in a limited viewing angle range; a first polarizer located on a viewing side of the privacy optic and on a non-viewing side of the second backlight unit; and a second polarizer located on a non-viewing side of the privacy optic and on a viewing side of the first backlight unit; wherein the privacy optic includes a liquid crystal cell configured as a hybrid aligned nematic (HAN) liquid crystal cell located between the first polarizer and the second polarizer, the HAN liquid crystal cell including a first substrate having a first electrode layer and a second substrate having a second electrode layer on opposite sides of a liquid crystal layer, and wherein a viewing angle restriction is stronger when a voltage is applied across the HAN liquid crystal cell.

AU Optronics Corp., Hsinchu et al., Taiwan, "Advanced Hyper-Viewing Angle Controllable LCD", SID 2021 DIGEST, 543 discloses a dual-cell liquid crystal display device including a vertical alignment (VA) mode liquid crystal lens cell; a viewing angle-controlling liquid crystal panel with an ITO grid electrode on its substrate on one side; a display-providing liquid crystal panel; and a louver film. This liquid crystal display device can utilize the transverse electric field to modulate the refractive index distribution in the cell and thereby diffuse the backlight illumination through the louver film (operates in the public mode) during voltage application to the grid electrode of the viewing angle-controlling liquid crystal panel, while allowing the backlight illumination to travel as is toward the display-providing liquid crystal panel without being diffused during no voltage application (operates in the privacy mode).

BRIEF SUMMARY OF THE INVENTION

None of JP 2008-203565 A, U.S. Pat. No. 11,002,998 B2, and Hsinchu et al. mentions consideration on reducing the polar angle (light-shielding angle) at which the transmittance is minimum (i.e., achieving a smaller light-shielding polar angle) in the narrow viewing angle mode. In other words, none of these documents mentions consideration on narrowing the viewing angle range (polar angle range) in the narrow viewing angle mode. In addition, none of the documents mentions consideration on the phenomenon that the color in a front view varies between a state with voltage applied and a state with no voltage applied (i.e., color shift in a front view).

In response to the above issues, an object of the present invention is to provide a liquid crystal panel capable of achieving a small light-shielding angle in the narrow viewing angle mode and a reduced color shift in a front view; and a display device including the liquid crystal panel.

(1) One embodiment of the present invention is directed to a liquid crystal panel sequentially including: a first polarizing plate with a first absorption axis; a first substrate including a first electrode; a liquid crystal layer containing liquid crystal molecules; and a second substrate including a second electrode, the liquid crystal panel satisfying the following Formula (1) as well as the following Formula (2-1) or Formula (2-2):

$$5° \leq |\varphi_1 - \varphi_2| \leq 20°  \quad \text{(Formula 1)}$$

$$5° \leq |\varphi P_1 - \varphi_2| \leq 20° \quad \text{(Formula 2-1)}$$

$$65° \leq |\varphi P_1 - \varphi_2| \leq 80° \quad \text{(Formula 2-2)}$$

wherein φ1 represents an azimuthal angle of a director of liquid crystal molecules near the first substrate, φ2 represents an azimuthal angle of a director of liquid crystal molecules near the second substrate, and φP1 represents an azimuthal angle of the first absorption axis of the first polarizing plate, each with no voltage applied.

(2) In an embodiment of the present invention, the liquid crystal panel includes the structure (1) and further includes a second polarizing plate with a second absorption axis parallel to the first absorption axis, the second polarizing plate facing the liquid crystal layer across the second substrate.

(3) In an embodiment of the present invention, the liquid crystal panel includes the structure (1) or (2), the first electrode and the second electrode are both solid electrodes, and a retardation Re of the liquid crystal layer with no voltage applied is not less than 700 nm and not more than 1200 nm.

(4) In an embodiment of the present invention, the liquid crystal panel includes the structure (1) or (2), the first electrode or the second electrode is patterned with a pattern to be observed from an oblique direction of the liquid crystal panel with voltage applied to the liquid crystal layer, and a retardation Re of the liquid crystal layer with no voltage applied is not less than 700 nm and not more than 900 nm.

(5) In an embodiment of the present invention, the liquid crystal panel includes the structure (1), (2), (3), or (4), and the liquid crystal molecules have a positive anisotropy of dielectric constant.

(6) In an embodiment of the present invention, the liquid crystal panel includes the structure (1), (2), (3), (4), or (5), and further includes a negative C plate that provides a retardation Rth in a thickness direction of not less than 500 nm.

(7) Another embodiment of the present invention is directed to a display device including the liquid crystal panel including any of the structures (1), (2), (3), (4), (5), and (6), and a display panel.

(8) In an embodiment of the present invention, the display device includes the structure (7), the liquid crystal layer is a first liquid crystal layer, the display panel sequentially includes a third polarizing plate with a third absorption axis, a second liquid crystal layer, and a fourth polarizing plate with a fourth absorption axis perpendicular to the third absorption axis, and an absorption axis of the third polarizing plate or the fourth polarizing plate, whichever is closer to the liquid crystal panel, is parallel to the first absorption axis.

(9) In an embodiment of the present invention, the display device includes the structure (7) or (8), and the display panel is an IPS mode or FFS mode liquid crystal display panel.

(10) In an embodiment of the present invention, the display device includes the structure (7), (8), or (9) and further includes a backlight, the backlight includes two light guide plates, and one of the two light guide plates has a function for a wide viewing angle mode and the other of the two light guide plates has a function for a narrow viewing angle mode.

(11) In an embodiment of the present invention, the display device includes the structure (7), and the display panel is an organic EL display panel, an inorganic EL display panel, a microLED display panel, or a QLED display panel.

(12) In an embodiment of the present invention, the display device includes the structure (7), (8), (9), or (10), the display panel includes a third substrate, a second liquid crystal layer, and a fourth substrate, the third substrate includes color filters of a plurality of colors, the fourth substrate includes a pixel electrode, the color filters of a plurality of colors and the pixel electrode each have an elongated shape, and a lengthwise direction of each of the color filters of a plurality of colors and the pixel electrode lies in a top-bottom direction of the display panel.

(13) In an embodiment of the present invention, the display device includes the structure (7), (8), (9), or (10), the display panel includes a third substrate, a second liquid crystal layer, and a fourth substrate, the third substrate includes color filters of a plurality of colors, the fourth substrate includes a pixel electrode, the color filters of a plurality of colors and the pixel electrode each have an elongated shape, and a lengthwise direction of each of the color filters of a plurality of colors and the pixel electrode lies in a left-right direction of the display panel.

(14) In an embodiment of the present invention, the display device includes the structure (13), the third substrate includes a black matrix layer provided with a plurality of apertures corresponding to the respective color filters of a plurality of colors, the apertures each have a width WB in the left-right direction of the display panel of not smaller than 80 μm and not greater than 140 μm, and the apertures each have a width LB in a top-bottom direction of the display panel of not greater than 80 μm.

The present invention can provide a liquid crystal panel capable of achieving a small light-shielding angle in the narrow viewing angle mode and a reduced color shift in a front view; and a display device including the liquid crystal panel.

DETAILED DESCRIPTION OF THE INVENTION

Figure 1:
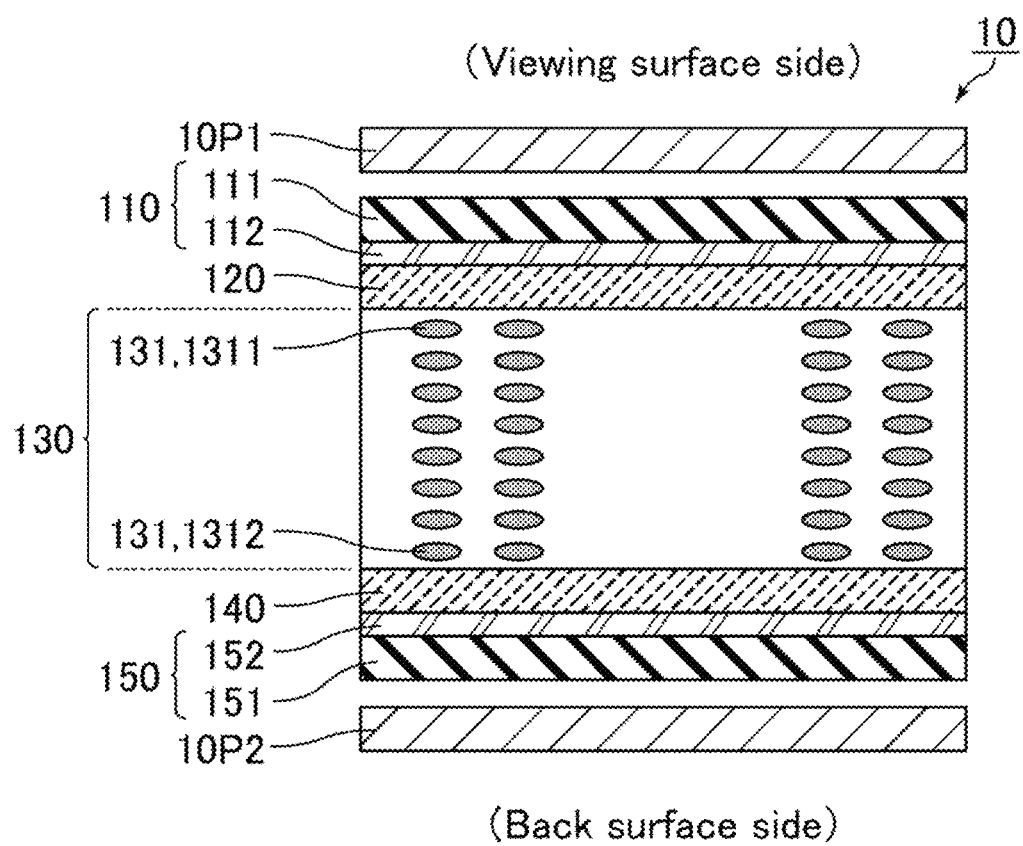
FIG. 1 is a schematic cross-sectional view of a viewing angle-controlling liquid crystal panel of Embodiment 1 with no voltage applied.

Hereinafter, embodiments of the present invention are described. The present invention is not limited to the following embodiments. The design may be modified as appropriate within the range satisfying the configuration of the present invention. In the following description, components having the same or similar functions in different drawings are commonly provided with the same reference sign so as to appropriately avoid repetition of description. The embodiments in the present invention may be combined as appropriate without departing from the spirit of the present invention.

Definition of Terms

The "viewing surface side" herein means the side closer to the screen (display surface) of the liquid crystal panel. The "back surface side" herein means the side farther from the screen (display surface) of the liquid crystal panel.

The "azimuth" herein means the direction in question (e.g., measurement direction) in a view projected onto the screen of the liquid crystal panel and is expressed as an angle (azimuthal angle) formed with the reference azimuth. The reference azimuth (0°) is set to the right in the horizontal direction of the screen of the liquid crystal panel. The azimuthal angle measures positive in the counterclockwise direction and measures negative in the clockwise direction. Both the counterclockwise and clockwise directions are rotational directions when the screen of the liquid crystal panel is viewed from the viewing surface side (front). The angle is a value measured in a plan view of the liquid crystal panel. The expression that two straight lines (including axes and directions) are "perpendicular" herein means that they are perpendicular in a plan view of the liquid crystal panel. The expression that two straight lines (including axes and directions) are "parallel" means that they are parallel in a plan view of the liquid crystal panel.

The "polar angle" herein means an angle formed by the direction in question (e.g., measurement direction) and the direction normal to the screen of the liquid crystal panel. A polar angle when the direction in question is at an azimuthal angle of 0° to 90° or 270° to 360° is a positive angle. An angle when the direction in question is at an azimuthal angle of 90° to 270° is a negative angle.

The "axis azimuth" herein means, unless otherwise specified, the azimuth of the absorption axis (reflection axis) of a polarizer or the optic axis (slow axis) of a retarder.

The expression that two axes are "perpendicular" herein means that they form an angle of 90°±3°, preferably 90°±1°, more preferably 90°±0.5°, particularly preferably 90° (perfectly perpendicular). The expression that two axes are "parallel" means that they form an angle of 0°±3°, preferably 0°±1°, more preferably 0°±0.5°, particularly preferably 0° (perfectly parallel).

The retardation Rp in the in-plane direction is defined by Rp=(ns−nf)d. The retardation Rth in the thickness direction is defined by Rth=(nz−(nx+ny)/2)d. In the formulas, ns represents nx or ny, whichever is greater, while of represents nx or ny, whichever is smaller; nx and ny each represent a principal refractive index in the in-plane direction of a birefringent layer (including a liquid crystal panel); nz represents a principal refractive index in the out-of-plane direction, i.e., the direction perpendicular to a surface of the birefringent layer; and d represents the thickness of the birefringent layer.

The measurement wavelength for optical parameters such as a principal refractive index and a phase difference herein is 550 nm unless otherwise specified.

The "birefringent layer" herein means a layer having optical anisotropy and is a concept encompassing a liquid crystal panel. The birefringent layer provides, for example, a retardation in the in-plane direction, or a retardation in the thickness direction in absolute value of not less than 10 nm, preferably not less than 20 nm.

Hereinafter, embodiments of the present invention are described. The present invention is not limited to the following embodiments. The design may be modified as appropriate within the range satisfying the configuration of the present invention.

Embodiment 1

Figure 2:
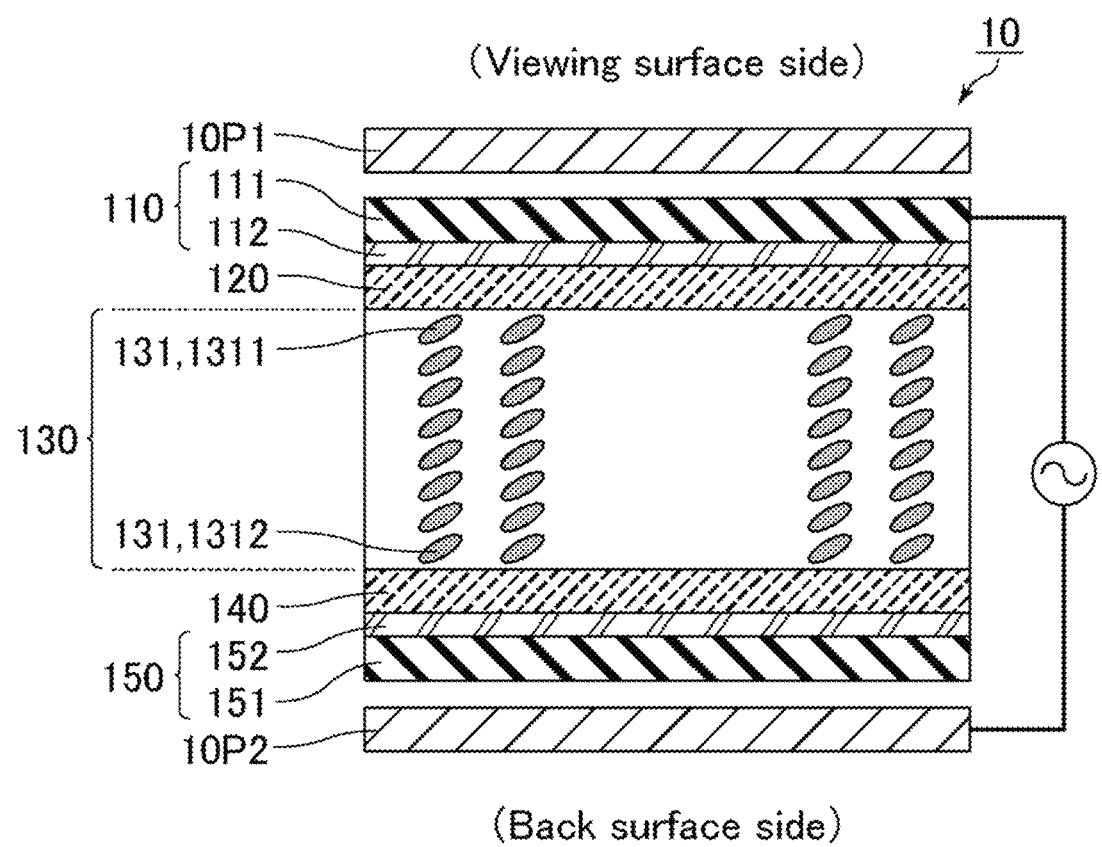
FIG. 2 is a schematic cross-sectional view of the viewing angle-controlling liquid crystal panel of Embodiment 1 with voltage applied.
Figure 3:
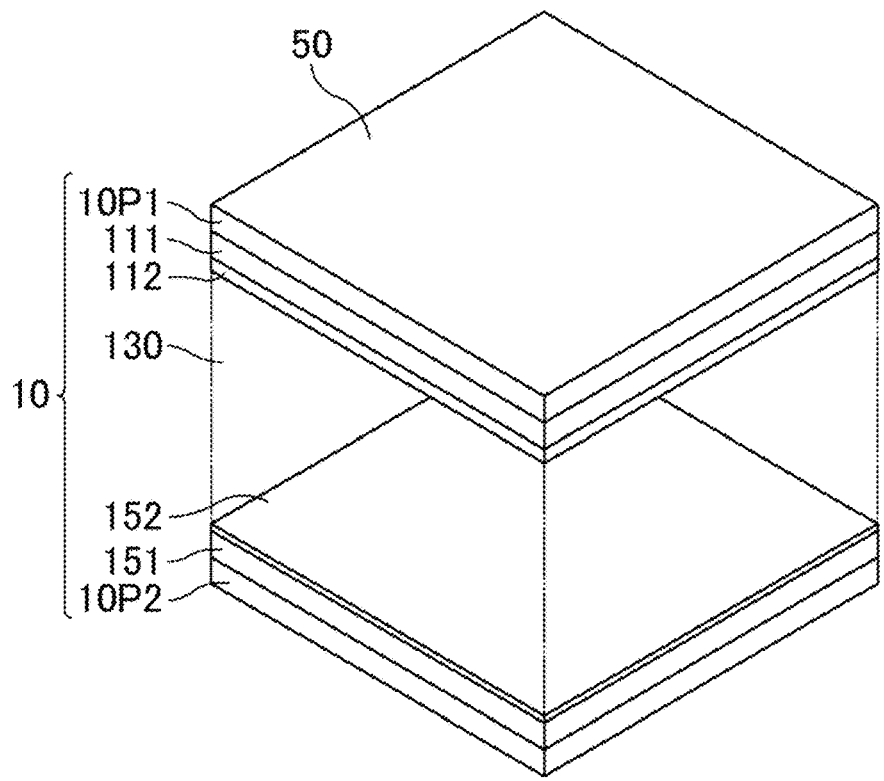
FIG. 3 is a schematic perspective view of the viewing angle-controlling liquid crystal panel of Embodiment 1.
Figure 4:
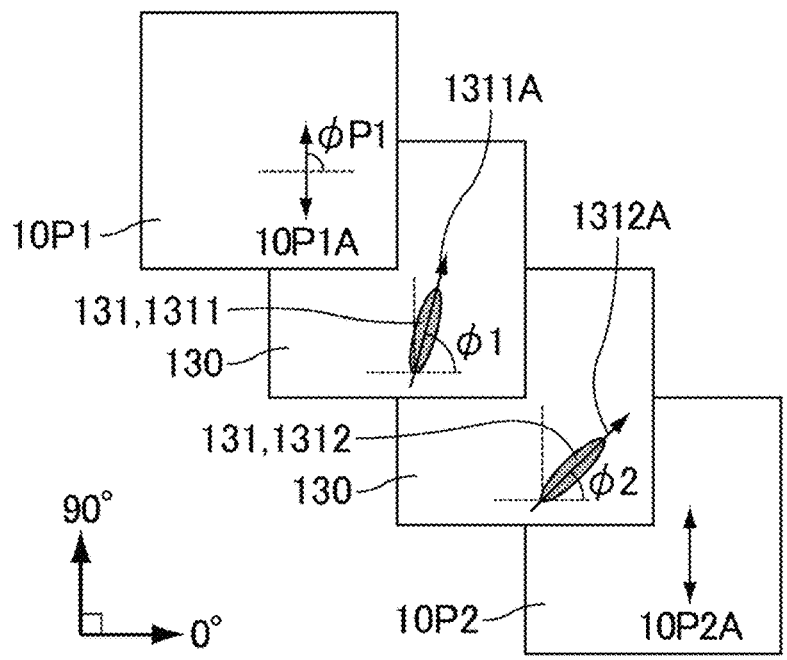
FIG. 4 is a schematic front view of the viewing angle-controlling liquid crystal panel of Embodiment 1.

FIG. 1 is a schematic cross-sectional view of a viewing angle-controlling liquid crystal panel of Embodiment 1 with no voltage applied. FIG. 2 is a schematic cross-sectional view of the viewing angle-controlling liquid crystal panel of Embodiment 1 with voltage applied. FIG. 3 is a schematic perspective view of the viewing angle-controlling liquid crystal panel of Embodiment 1. FIG. 4 is a schematic front view of the viewing angle-controlling liquid crystal panel of Embodiment 1.

As shown in FIG. 1 to FIG. 4, a viewing angle-controlling liquid crystal panel 10 as the liquid crystal panel of the present embodiment sequentially includes a first polarizing plate 10P1 with a first absorption axis 10P1A, a first substrate 110 including a first electrode 112, a liquid crystal layer 130 containing liquid crystal molecules 131, and a second substrate 150 including a second electrode 152. The viewing angle-controlling liquid crystal panel 10 satisfies the following Formula (1) as well as the following Formula (2-1) or Formula (2-2):

$$5° \le |\varphi1 - \varphi2| \le 20° \quad \text{(Formula 1)}$$

$$5° \le |\varphi P1 - \varphi2| \le 20° \quad \text{(Formula 2-1)}$$

$$65° \le |\varphi P1 - \varphi2| \le 80° \quad \text{(Formula 2-2)}$$

wherein φ1 represents an azimuthal angle of a director 1311A of liquid crystal molecules 1311 near the first substrate 110, φ2 represents an azimuthal angle of a director 1312A of liquid crystal molecules 1312 near the second substrate 150, and φP1 represents an azimuthal angle of the first absorption axis 10P1A of the first polarizing plate 10P1, each with no voltage applied.

The viewing angle-controlling liquid crystal panel 10 satisfying Formula (1) can achieve a reduced color shift in a front view. The relationship between φ1 and φ2 may be φ1>φ2 or φ1<φ2, in each case the same effect can be achieved. The viewing angle-controlling liquid crystal panel 10 satisfying Formula (2-1) or Formula (2-2) operates in a wide viewing angle mode with no voltage applied, while operating in a narrow viewing angle mode in which the viewing angle range is asymmetric about the central axis (polar angle of 0°, i.e., front direction) in the horizontal direction (azimuthal angle of 0° or 180°) with voltage applied. Specifically, the viewing angle-controlling liquid crystal panel 10 has positive and negative polar angles (light-shielding angles) at each of which the transmittance is minimum, and the light-shielding angles at the negative polar angle and the light-shielding angle at the positive polar angle are different in absolute value. In particular, in the narrow viewing angle mode, the light-shielding angle at the negative polar angle can be as small as, for example, a polar angle of −40° to −30°, so that the viewable angle range (polar angle range) can be sufficiently narrowed. This enables a sufficient light-shielding effect. Both when satisfying Formula (2-1) and when satisfying Formula (2-2), the viewing angle-controlling liquid crystal panel 10 (preferably in the electrically controlled birefringence (ECB) mode) introduces a retardation of λ/2 [nm] at a desired light-shielding angle (polar angle direction). This means that the viewing angle-controlling liquid crystal panel 10 can achieve the same light-shielding effect both when it satisfies Formula (2-1) and when it satisfies Formula (2-2). Herein, a small light-shielding angle means that the absolute value of the light-shielding angle is small.

The liquid crystal panel is in a mode such as a vertical electric field mode where a liquid crystal layer is sandwiched between paired substrates one of which includes pixel electrodes and the other of which includes a common electrode, and voltage is applied between the pixel electrodes and the common electrode to generate a vertical electric field in the liquid crystal layer.

Examples of the vertical electric field mode include the ECB mode that homogeneously (horizontally) aligns the liquid crystal molecules in the liquid crystal layer in the direction parallel to a substrate surface with no voltage applied, and the vertical alignment (VA) mode and the hybrid aligned nematic (HAN) mode that align liquid crystal molecules in the liquid crystal layer in the direction vertical to a substrate surface, i.e., homeotropically (vertically), with no voltage applied.

The director of the liquid crystal molecules near the first substrate means the director of the liquid crystal molecules horizontally aligned in the vicinity of the first substrate. Specifically, when the alignment film on the liquid crystal layer side of the first substrate is a horizontal alignment film, the director of the liquid crystal molecules near the first substrate means the director of the liquid crystal molecules in the first substrate side interface of the liquid crystal layer. When the alignment film on the liquid crystal layer side of the first substrate is a vertical alignment film, the liquid crystal molecules in the first substrate side interface of the liquid crystal layer are vertically aligned, and thus the director of the liquid crystal molecules near the first substrate means the director of horizontally aligned liquid crystal molecules that are closer to the center of the liquid crystal layer than the liquid crystal molecules in the first substrate side interface are. The director of liquid crystal molecules means the direction of the principal axes of alignment (the average direction of the long axes of molecules in nematic liquid crystal). Thus, the director of the liquid crystal molecules near the first substrate with no voltage applied and the alignment treatment direction for the alignment film on the liquid crystal layer side of the first substrate are at the same azimuthal angle.

Similarly, the director of the liquid crystal molecules near the second substrate is the alignment direction of the liquid crystal molecules horizontally aligned in the vicinity of the second substrate. Specifically, when the alignment film on the liquid crystal layer side of the second substrate is a horizontal alignment film, the director of the liquid crystal molecules near the second substrate means the director of the liquid crystal molecules in the second substrate side interface of the liquid crystal layer. When the alignment film on the liquid crystal layer side of the second substrate is a vertical alignment film, the liquid crystal molecules in the second substrate side interface of the liquid crystal layer are vertically aligned, and thus the director of the liquid crystal molecules near the second substrate means the director of horizontally aligned liquid crystal molecules that are closer to the center of the liquid crystal layer than the liquid crystal molecules in the second substrate side interface are. The director of the liquid crystal molecules near the second substrate with no voltage applied and the alignment treatment direction for the alignment film on the liquid crystal layer side of the second substrate are at the same azimuthal angle.

The alignment of the liquid crystal molecules can also be analyzed as follows. When an extinction position is found in a state where the liquid crystal panel with no voltage applied is sandwiched between paired polarizing plates arranged in the crossed Nicols, the liquid crystal molecules are determined to be in the homogeneous (horizontal) alignment state (State 1) or the homeotropic (vertical) alignment state (State 2), each with no twist. When no extinction position is found, only one of the polarizing plates arranged in the crossed Nicols is rotated in the azimuthal direction. If this rotation, in the counterclockwise direction by 10°, reveals an extinction position, the liquid crystal molecules in the liquid crystal panel are determined to be twisted by 10° with no voltage applied while being in (State 1) or (State 2).

A distinction can be made between (State 1) and (State 2) by determining the voltage dependence of the in-plane phase difference using Axoscan (available from Axometrics, Inc.) to see whether the mode is the ECB mode or a different mode (e.g., HAN mode, VA mode) based on the characteristic curve of the determined voltage dependence. Such a distinction between the modes can be made because the ECB mode shows a clear threshold in the voltage dependence of the in-plane phase difference whereas the HAN mode shows no threshold.

Whether the liquid crystal molecules are horizontally aligned or vertically aligned can be determined by measuring the in-plane phase difference with no voltage applied using Axoscan (available from Axometrics, Inc.). A horizontal alignment state with no twist shows an in-plane phase difference: $(ne-no) \times d$, while a horizontal alignment state with a twist of 10° shows an in-plane phase difference: $\{(ne-no) \times \cos 5°\} \times d$, where ne represents the refractive index along the long axes of the liquid crystal molecules, no represents the refractive index along the short axes of the liquid crystal molecules, and d represents a gap (thickness of the liquid crystal layer). In contrast, the vertical alignment state is clearly different from the horizontal alignment state because only light experiencing the refractive index along the short axes is perceived and thus the in-plane phase difference with no voltage applied is about 0 nm. The formula of the in-plane phase difference with a twist of 10° includes cos 5° because the liquid crystal molecules are twisted gradually in the thickness direction by a (total) twist of 10° and the average of such twists is 5°.

The alignment state (including the director) of the liquid crystal molecules can be more specifically analyzed using Axoscan (available from Axometrics, Inc.) by measuring oblique phase differences at two axes (measurement of oblique phase differences of a cell), specifically by measuring the in-plane phase differences of the liquid crystal panel from a polar angle of 0° (front) to a polar angle of ±60° at the two axes (two azimuth directions). These measurement results also allow estimation of the director of the liquid crystal molecules (information including specific tilt angles).

The viewing angle-controlling liquid crystal panel 10 of the present embodiment is preferably in the ECB mode. When satisfying Formula (2-1) or Formula (2-2), the viewing angle-controlling liquid crystal panel 10 can achieve a luminance viewing angle range bilaterally asymmetric in the horizontal direction about the front (polar angle of 0°) with voltage applied to the liquid crystal layer 130, thus achieving an even smaller polar angle (also referred to as a light-shielding angle) at which the transmittance is minimum. In other words, an ECB mode liquid crystal panel allowing blocking of light at smaller polar angles and exhibiting an asymmetric viewing angle range. Thus, the viewing angle-controlling liquid crystal panel 10 of the present embodiment can further narrow the viewable angle range (polar angle range) in the privacy mode.

In addition, the present inventors found that in a front view of an ECB mode liquid crystal panel exhibiting the asymmetric viewing angle range above, a color shift may occur between a state with voltage applied and a state with no voltage applied, and thus the panel can still be improved. For example, in the ECB mode liquid crystal panel exhibiting the asymmetric viewing angle range, when the first absorption axis of the first polarizing plate is at an azimuthal angle of 90° and the director of the liquid crystal molecules with no voltage applied is at an azimuthal angle of 75°, each color of polarized light incident thereon undergoes different refraction. The inventors found that this phenomenon tends to cause the color displayed in a front view to shift between a state with voltage applied and a state with no voltage applied. The viewing angle-controlling liquid crystal panel 10 of the present embodiment satisfies Formula (1) and contains the liquid crystal molecules 131 twist-aligned with a twist angle φ=|φ1−φ2| in the liquid crystal layer 130, and thus can reduce the color shift in the front view.

As described above, the viewing angle-controlling liquid crystal panel 10 of the present embodiment operates in an ECB mode with a slight twist angle (not smaller than 5° and not greater than 20°) where the azimuthal angle φP1 of the first absorption axis 10P1A of the first polarizing plate 10P1 and the azimuthal angle φ2 of the director 1312A of the liquid crystal molecules 1312 near the second substrate 150 with no voltage applied are set to the respective predetermined angles while the azimuthal angle φ2 of the director 1312A of the liquid crystal molecules 1312 near the second substrate 150 with no voltage applied and the azimuthal angle φ1 of the director 1311A of the liquid crystal molecules 1311 near the first substrate 110 are set to the respective predetermined angles. Thus, the viewing angle-controlling liquid crystal panel 10 can achieve a reduced color shift while blocking light at small polar angles. The viewing angle-controlling liquid crystal panel 10 of the present embodiment is especially suitable for the on-board device market where strict privacy protection requirements are set and even higher levels of privacy protection (image/video display unviewability) are desired.

In the ECB mode liquid crystal panel containing liquid crystal molecules having a positive anisotropy of dielectric constant, there is a trade-off relationship between the light-shielding angle and the retardation Re of the liquid crystal layer. Specifically, when the liquid crystal layer provides a Re of 800 nm with no voltage applied, the light-shielding angle at the optimal voltage is about 45 degrees. Meanwhile, in order to achieve a light-shielding angle of about 30°, Re needs to be about 1600 nm, meaning that the birefringence Δn or the cell thickness d of the liquid crystal layer has to be increased. For example, Δn needs to be 0.12 and d needs to be 13 μm when the cell thickness d is to be increased, while Δn needs to be 0.22 and d needs to be 7 μm when the birefringence Δn is to be increased.

Increasing the cell thickness d and increasing the birefringence Δn, however, both raise issues of productivity and reliability. Specifically, increasing the cell thickness d involves issues of in-plane unevenness and yield (property stability) due to the increased thickness. Increasing the birefringence Δn leads to unstable operation at low temperature although it can achieve a high Δn when a tolane-based liquid crystal material is used. In contrast, the viewing angle-controlling liquid crystal panel 10 of the present embodiment eliminates the need for increasing the cell thickness d or birefringence Δn, and thus can achieve a sufficiently small light-shielding angle in the narrow viewing angle mode without a decline in productivity or reliability while preventing or reducing unstable operation at low temperature.

JP 2008-203565 A mentions only the case of including the viewing angle-controlling liquid crystal panel and the display-providing liquid crystal panel, wherein the viewing angle-controlling liquid crystal panel is in the ECB mode (homogeneous alignment state) in which the director of the liquid crystal molecules and the transmission axis of each of the polarizing plates between which the display-providing liquid crystal panel is sandwiched form an angle of 0° (parallel). In this case, the light-shielding angle cannot be made sufficiently small. In contrast, the viewing angle-controlling liquid crystal panel 10 of the present embodiment can achieve a sufficiently small light-shielding angle in the narrow viewing angle mode and a reduced color shift in a front view.

The liquid crystal display device disclosed in U.S. Pat. No. 11,002,998 B2 includes the HAN mode viewing angle-controlling liquid crystal panel, the display-providing liquid crystal panel, and the two layers of backlight units for the public mode and the privacy mode. This display device is a dual-cell liquid crystal display device capable of switching between the narrow viewing angle mode and the wide viewing angle mode, wherein the narrow viewing angle mode is achieved by shifting the viewing angle-controlling liquid crystal panel to the off state, the backlight unit for the privacy mode to the on state, and the backlight unit for the public mode to the off state, while the wide viewing angle mode is achieved by shifting the viewing angle-controlling liquid crystal panel to the on state, the backlight unit for the public mode to the on state, and the backlight unit for the privacy mode to the off state. In the liquid crystal display device disclosed in U.S. Pat. No. 11,002,998 B2, achieving a small light-shielding angle requires an increase in retardation (Re=Δn×d) provided by the liquid crystal layer, which is however difficult to achieve at the same time as the mass productivity. In contrast, the viewing angle-controlling liquid crystal panel 10 of the present embodiment can achieve a sufficiently small light-shielding angle in the narrow viewing angle mode while preventing or reducing a decline in mass productivity and a reduced color shift in a front view.

The liquid crystal display device disclosed in Hsinchu et al. is a dual-cell liquid crystal display device including a VA mode viewing angle-controlling liquid crystal panel, a display-providing liquid crystal panel, and a louver film, wherein the viewing angle-controlling liquid crystal panel includes an ITO grid electrode only on its substrate on one side. The liquid crystal display device disclosed in Hsinchu et al. achieves the public mode by utilizing a transverse electric field to modulate the refractive index distribution in the liquid crystal cell and thereby diffusing the backlight illumination through the louver film during voltage application to the grid electrode. The liquid crystal display device achieves the privacy mode by allowing the backlight illumination to travel as is toward the display-providing liquid crystal panel without being diffused during no voltage application. In this manner, in the method of Hsinchu et al., the light-shielding angle in the privacy mode depends on the louver film. This causes a failure in achieving a sufficiently wide viewing angle in the public mode in the case of using a louver film having a small light-shielding angle. In contrast, the viewing angle-controlling liquid crystal panel 10 of the present embodiment can achieve a sufficiently wide viewing angle in the public mode, a sufficiently small light-shielding angle in the privacy mode, and a reduced color shift in a front view.

Hereinafter, the present embodiment is described in more detail.

As shown in FIG. 1 to FIG. 4, the viewing angle-controlling liquid crystal panel 10 of the present embodiment preferably further includes a second polarizing plate 10P2 with a second absorption axis 10P2A parallel to the first absorption axis 10P1A, the second polarizing plate 10P2 facing the liquid crystal layer 130 across the second substrate 150. This configuration allows the first polarizing plate 10P1 and the second polarizing plate 10P2 to be arranged in parallel Nicols. The configuration thus enables more effective transmission of backlight illumination in a region ranging from small to large polar angles with no voltage applied when a backlight is placed on the back surface side of the viewing angle-controlling liquid crystal panel 10.

The viewing angle-controlling liquid crystal panel 10 of the present embodiment more specifically includes, as shown in FIG. 1 to FIG. 4, sequentially from the viewing surface side toward the back surface side, the first polarizing plate 10P1 with a first absorption axis 10P1A, the first substrate 110 including a first support substrate 111 and the first electrode 112, the first alignment film 120, the liquid crystal layer 130 containing the liquid crystal molecules 131, the second alignment film 140, the second substrate 150 including the second electrode 152 and a second support substrate 151, and the second polarizing plate 10P2 with the second absorption axis 10P2A parallel to the first absorption axis 10P1A. The viewing angle-controlling liquid crystal panel 10 can change the voltage to be applied between the first electrode 112 and the second electrode 152 to change the retardation of the liquid crystal layer 130, thus controlling transmission and blocking of light in the liquid crystal layer 130.

The viewing angle-controlling liquid crystal panel 10 is a passive liquid crystal panel which is passively driven. Similar to a typical passive liquid crystal panel, the first substrate 110 of the viewing angle-controlling liquid crystal panel 10 includes the first electrode 112 as a solid electrode covering the entire surface of a screen 50, and the second substrate 150 includes the second electrode 152 as a solid electrode covering the entire surface of the screen 50. This configuration enables switching between the public mode and the privacy mode throughout the screen 50.

Examples of the first support substrate 111 and the second support substrate 151 include substrates such as glass substrates and plastic substrates. Examples of the material for the glass substrates include glass such as float glass and soda-lime glass. Examples of the material for the plastic substrates include plastics such as polyethylene terephthalate, polybutylene terephthalate, polyethersulfone, polycarbonate, and alicyclic polyolefin.

The first electrode 112 and the second electrode 152 may be transparent electrodes that can be formed from, for example, a transparent conductive material such as indium tin oxide (ITO), indium zinc oxide (IZO), zinc oxide (ZnO), or tin oxide (SnO) or an alloy of any of these materials.

The first alignment film 120 and the second alignment film 140 control the alignment azimuth for the liquid crystal molecules 131 with no voltage applied and the tilt angle of the liquid crystal molecules 131 with no voltage applied. The first alignment film 120 and the second alignment film 140 may be horizontal alignment films or vertical alignment films. In order to increase the transmittance with no voltage applied, the first alignment film 120 and the second alignment film 140 are preferably horizontal alignment films.

A horizontal alignment film, when provided to a substrate in a liquid crystal panel, exerts an alignment control force of aligning the liquid crystal molecules in the liquid crystal layer substantially horizontally thereto, with no voltage applied to the liquid crystal layer. A vertical alignment film, when provided to a substrate in a liquid crystal panel, exerts an alignment control force of aligning the liquid crystal molecules in the liquid crystal layer substantially vertically thereto, with no voltage applied to the liquid crystal layer.

The expression "substantially horizontally" means that the tilt angle is not smaller than 0° and not greater than 10°, preferably not smaller than 0° and not greater than 5°, more preferably not smaller than 0° and not greater than 2°. The expression "substantially vertically" means that the tilt angle is not smaller than 83° and not greater than 90°, preferably not smaller than 85° and not greater than 90°, more preferably not smaller than 87.5° and not greater than 88.0°.

The "tilt angle" herein does not mean the angle formed by the director of liquid crystal molecules and the main surface of each substrate, but means the average angle formed by the director of liquid crystal molecules in the thickness direction of the liquid crystal layer and the main surface of each substrate (each of the first substrate and the second substrate), with the angle parallel to the substrate surface measuring 0° and the angle of the line normal to the substrate surface measuring 90°. In particular, the tilt angle of the liquid crystal molecules with no voltage applied is also referred to as a pre-tilt angle. The alignment azimuth of liquid crystal molecules with no voltage applied is also referred to as an initial alignment azimuth. The tilt angle can be measured by the rotating crystal method with, for example, Axoscan (available from Axometrics, Inc.). The director of liquid crystal molecules in the present embodiment means the direction of the principal axes of alignment (the average direction of the long axes of molecules in nematic liquid crystal). For example, in a plan view, the director of liquid crystal molecules with no voltage applied coincides with the alignment treatment direction for the alignment films.

The first alignment film 120 and the second alignment film 140 can be made of a material commonly used in the field of liquid crystal panels, such as a polymer having a polyimide structure in its main chain, a polymer having a polyamic acid structure in its main chain, or a polymer having a polysiloxane structure in its main chain. The first alignment film 120 and the second alignment film 140 can be formed by, for example, applying an alignment film material to a substrate. The application method may be any method such as flexo printing or inkjet coating.

The first alignment film 120 and the second alignment film 140 may each be a photoalignment film containing a photo-functional group and having undergone a photoalignment treatment as the alignment treatment, a rubbed alignment film having undergone a rubbing treatment as the alignment treatment, or an alignment film having undergone no alignment treatment.

The liquid crystal layer 130 contains the liquid crystal molecules 131 and controls the amount of light passing therethrough by changing the alignment of the liquid crystal molecules 131 according to the voltage applied to the liquid crystal layer 130. The anisotropy of dielectric constant ($\Delta\varepsilon$) of the liquid crystal molecules 131 is defined by the following formula (L). Preferably, the liquid crystal molecules 131 have a positive anisotropy of dielectric constant. This configuration can reduce the driving voltage. The configuration also can make the liquid crystal panel resistant to the external thermal environment (highly reliable). Liquid crystal molecules having a positive anisotropy of dielectric constant are referred to as positive liquid crystal molecules, while liquid crystal molecules having a negative anisotropy of dielectric constant are referred to as negative liquid crystal molecules. The direction of the long axes of liquid crystal molecules with no voltage applied is also referred to as the initial alignment direction of the liquid crystal molecules.

$$\Delta\varepsilon = \text{(dielectric constant in long axis direction of liquid crystal molecules)} - \text{(dielectric constant in short axis direction of liquid crystal molecules)} \quad \text{(L)}$$

The liquid crystal molecules 131 are homogeneously aligned with no voltage applied and thus can achieve the ECB mode when the liquid crystal molecules 131 have a positive anisotropy of dielectric constant. Herein, the homogeneous alignment means an alignment state where the liquid crystal molecules are aligned horizontally to the surfaces of a substrate constituting the viewing angle-controlling liquid crystal panel 10 (e.g., the surfaces of at least one of the first substrate 110 or the second substrate 150) and the orientations of the liquid crystal molecules are the same. The state with no voltage applied (during no voltage application) herein means a state where voltage of not lower than the threshold for the liquid crystal molecules is not applied to the liquid crystal layer. For example, the same constant voltage may be applied to the first electrode 112 and the second electrode 152, or a constant voltage may be applied to one of the first electrode 112 and the second electrode 152 while a voltage lower than the threshold for the liquid crystal molecules relative to the constant voltage may be applied to the other of the electrodes. The state with voltage applied (during voltage application) herein means a state where a voltage of not lower than the threshold for the liquid crystal molecules is applied to the liquid crystal layer. The state with voltage applied is, for example, a state where the optimal voltage is applied. The optimal voltage means the voltage that causes the liquid crystal panel (e.g., in the ECB mode) to introduce a retardation of λ/2 [nm] at the light-shielding angle (e.g., angle falling within a polar angle range of −40° to −30°).

Figure 5:
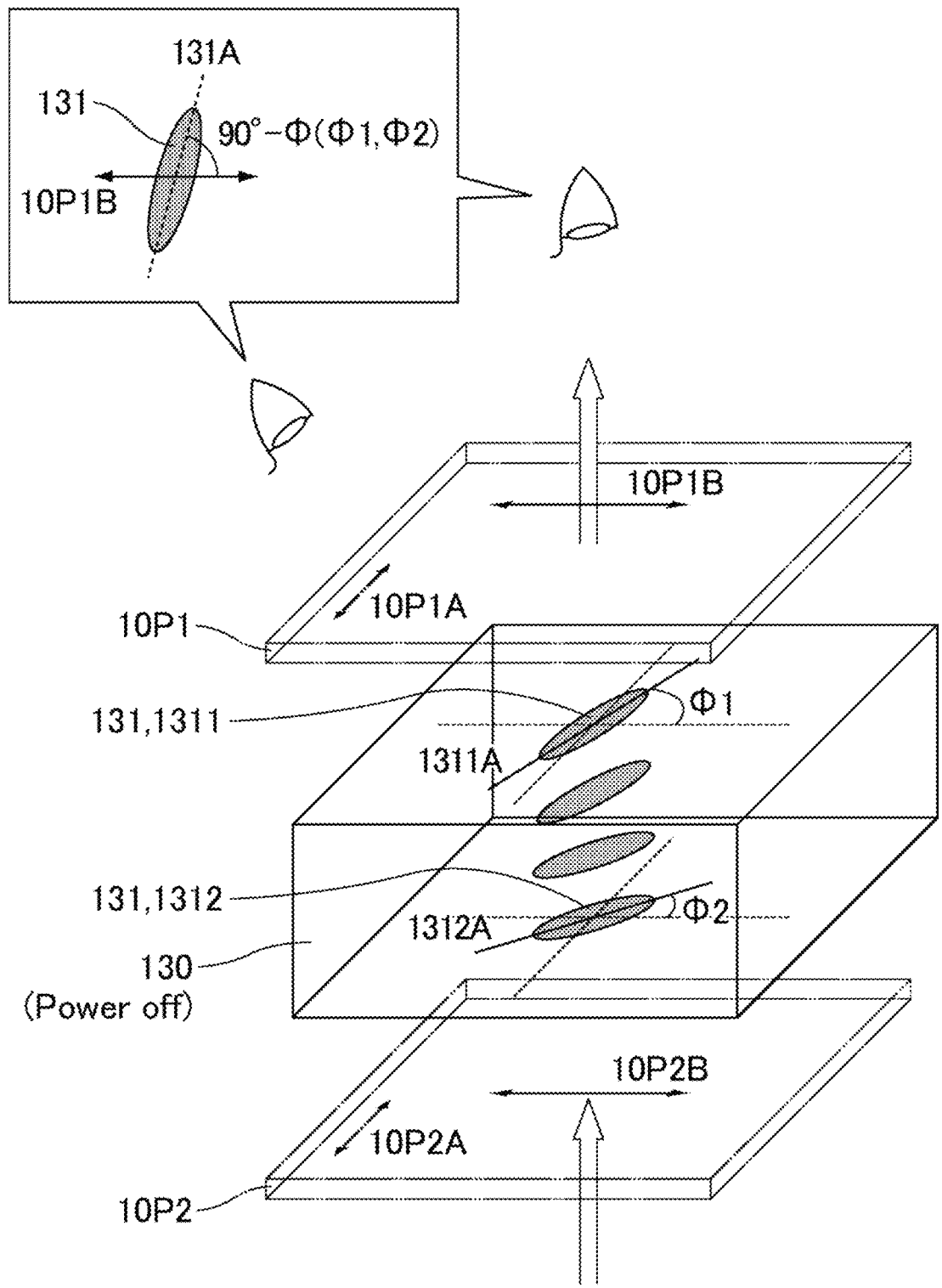
FIG. 5 is a schematic perspective view showing the relationship between the director of liquid crystal molecules with no voltage applied and the absorption axes of polarizing plates in the viewing angle-controlling liquid crystal panel of Embodiment 1.
Figure 6:
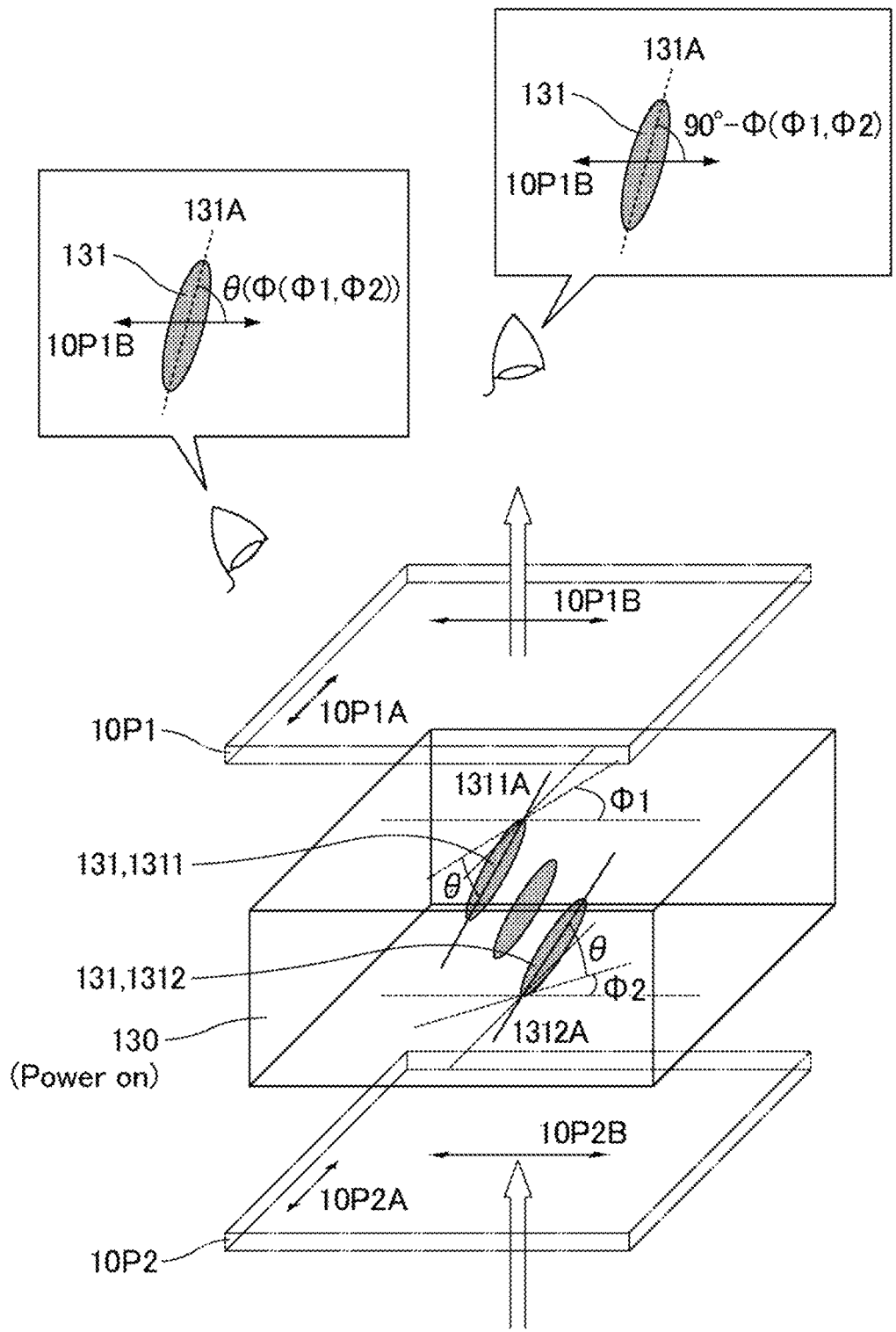
FIG. 6 is a schematic perspective view showing the relationship between the director of the liquid crystal molecules with voltage applied and the absorption axes of the polarizing plates in the viewing angle-controlling liquid crystal panel of Embodiment 1.

FIG. 5 is a schematic perspective view showing the relationship between the director of liquid crystal molecules with no voltage applied and the absorption axes of polarizing plates in the viewing angle-controlling liquid crystal panel of Embodiment 1. FIG. 6 is a schematic perspective view showing the relationship between the director of the liquid crystal molecules with voltage applied and the absorption axes of the polarizing plates in the viewing angle-controlling liquid crystal panel of Embodiment 1.

The viewing angle-controlling liquid crystal panel 10 of the present embodiment satisfies Formula (2-1) or Formula (2-2). Thus, as shown in FIG. 5, in a plan view, when the angle formed by a director 131A of the liquid crystal molecules 131 with no voltage applied and a first transmission axis 10P1B of the first polarizing plate 10P1 satisfies the expression [90°−φ (φ1, φ2)] in observation of the screen both at a polar angle of 0° (front direction) and at a larger polar angle (e.g., polar angle of −30°) as shown in FIG. 5. The director 131A of the liquid crystal molecules 131 means the average of the directors of the liquid crystal molecules 131 in the liquid crystal layer 130.

Meanwhile, with voltage applied, as shown in FIG. 6, the angle formed by the director 131A of the liquid crystal molecules 131 and the first transmission axis 10P1B of the first polarizing plate 10P1 satisfies the expression 90°−φ (φ1, φ2) in observation of the screen at a polar angle of 0° (front direction). However, in observation of the screen at a larger polar angle (e.g., polar angle of −30°), the angle formed by the director 131A of the liquid crystal molecules 131 and the first transmission axis 10P1B of the first polarizing plate 10P1 depends on the tilt angle θ of the liquid crystal molecules 131 and the azimuthal angles φ1 and φ2, and thus is different from the angle in observation from the front direction.

As described above, in the present embodiment, the viewing angle-controlling liquid crystal panel 10, when satisfying Formula (2-1) or Formula (2-2), can operate in the narrow viewing angle mode in which the viewing angle range is asymmetric about the central axis (polar angle of 0°, i.e., front direction) in the horizontal direction (azimuthal angle of 0° or 180°) with voltage applied. In particular, in the narrow viewing angle mode, the light-shielding angle can be reduced to, for example, a polar angle of −40° to −30° to sufficiently narrow the viewable angle range (polar angle range), thus achieving a sufficient light-shielding effect.

The viewing angle-controlling liquid crystal panel 10 of the present embodiment satisfies Formula (1). In other words, the liquid crystal layer 130 contains the liquid crystal molecules 131 twist-aligned (in a twist alignment) between the first substrate 110 and the second substrate 150. The liquid crystal molecules 131 are twist-aligned from the first substrate 110 toward the second substrate 150. This configuration, in a front view, can reduce a color shift generated between the wide viewing angle mode and the narrow viewing angle mode.

The viewing angle-controlling liquid crystal panel 10 more preferably satisfies the following Formula (1-1). This configuration enables more effective reduction of a color shift in a front view.

$$5° \leq |\varphi 1 - \varphi 2| \leq 15°$$ (Formula 1-1)

The twist alignment of the liquid crystal molecules 131 can be achieved by, for example, adding a chiral agent to the liquid crystal material. The chiral agent is not limited and can be a conventionally known one. Examples of the chiral agent include S-811 (available from Merck KGaA). Achievement of a twist alignment with a small twist, such as a twist of 5° to 10°, without display defects such as disclination not necessarily requires addition of a chiral agent to the liquid crystal material.

Preferably, the tilt angle of the liquid crystal molecules 131 with no voltage applied is not smaller than 1° and not greater than 5°, while the tilt angle of the liquid crystal molecules 131 with voltage applied is not smaller than 40° and not greater than 75°. This configuration can further reduce the viewable angle range (polar angle range) in the privacy mode. In other words, the configuration enables blocking of light at smaller polar angles. Herein, with the direction perpendicular to the display surface of the liquid crystal panel taken as the reference, the polar angle decreases as it goes closer to the perpendicular direction, while the polar angle increases as it goes farther from the perpendicular direction.

The birefringence Δn of the liquid crystal molecules 131 may be not lower than 0.08 and not higher than 0.24. For a high degree of reliability (high voltage holding ratio, wide operation temperature range), the birefringence Δn is preferably not lower than 0.08 and not higher than 0.16.

The thickness (cell thickness) d of the liquid crystal layer 130 is preferably not smaller than 3 μm and not greater than 10 μm. This configuration can increase the response speed of the liquid crystal molecules 131. Also, the thickness of the viewing angle-controlling liquid crystal panel 10 can be further reduced. In terms of reduction of thickness, the thickness d of the liquid crystal layer 130 is more preferably not smaller than 3 μm and not greater than 5 μm. In terms of the yield, the thickness d of the liquid crystal layer 130 is more preferably not smaller than 5 μm and not greater than 10 μm. The liquid crystal layer 130 having a thickness d of not smaller than 5 μm can cause the display unevenness due to contamination with a foreign material to be less noticeable, thus increasing the yield.

Preferably, the first electrode 112 and the second electrode 152 are solid electrodes, and the liquid crystal layer 130 with no voltage applied provides a retardation Re of not less than 700 nm and not more than 1200 nm. This configuration can reliably achieve sufficient blocking of light and sufficient production stability with voltage applied while exhibiting viewing angle characteristics of bright and wide with no voltage applied. The retardation Re provided by the liquid crystal layer 130 is expressed as the product of the birefringence (Δn) of the liquid crystal molecules and the thickness (d) of the liquid crystal layer.

The first electrode 112 or the second electrode 152 is preferably patterned with a pattern to be observed from an oblique direction of the viewing angle-controlling liquid crystal panel 10 with voltage applied to the liquid crystal layer 130. This configuration causes the patterned portion to be perceived as a result of transmission of light in an oblique view in the narrow viewing angle mode, thus making the contents displayed on the display panel less perceivable when the display panel is disposed on the back surface side of the viewing angle-controlling liquid crystal panel 10. This can provide better privacy protection.

The pattern is a design pattern identified by, for example, at least one design element selected from letters, figures, shapes, symbols, and designs. Specific examples of the design element include logos.

The first electrode 112 or the second electrode 152 is more preferably patterned with a logo. This configuration can make the logo perceivable in an oblique view in the narrow viewing angle mode. The size of one logo is not limited. For example, the area of one logo is preferably not smaller than 5 mm$^2$ and not greater than 500 mm$^2$, more preferably not smaller than 10 mm$^2$ and not greater than 100 mm$^2$.

Preferably, the first electrode 112 or the second electrode 152 is patterned with a pattern to be observed from an oblique direction of the viewing angle-controlling liquid crystal panel 10 with voltage applied to the liquid crystal layer 130, and the retardation Re of the liquid crystal layer 130 with no voltage applied is not less than 700 nm and not more than 900 nm. The liquid crystal panel with this configuration exhibits viewing angle characteristics of bright and wide with no voltage applied (wide viewing angle mode) while reliably exhibiting a sufficient capability of blocking light and production stability with voltage applied (narrow viewing angle mode). In addition, the patterned portion includes no electrode, meaning that no voltage is applied to the portion. The portion is thus always in the wide viewing angle mode and allows light to pass therethrough both in the front direction and oblique directions. This causes the patterned portion to be perceived as a result of transmission of light in an oblique view in the narrow viewing angle mode, and thus can make the contents displayed on the display panel less perceivable and prevent the patterned portion from being perceived in the narrow viewing angle mode when the display panel is disposed on the back surface side of the viewing angle-controlling liquid crystal panel 10.

The first polarizing plate 10P1 and the second polarizing plate 10P2 are both absorptive polarizers. The first polarizing plate 10P1 and the second polarizing plate 10P2 may each be, for example, a polarizer (absorptive polarizing plate) obtained by dyeing a polyvinyl alcohol (PVA) film with an anisotropic material such as an iodine complex (or dye) to adsorb the anisotropic material on the PVA film, and stretching the film for alignment.

The first polarizing plate 10P1 has the first absorption axis 10P1A and the first transmission axis 10P1B perpendicular to the first absorption axis 10P1A. The second polarizing plate 10P2 has the second absorption axis 10P2A and a second transmission axis 10P2B perpendicular to the second absorption axis 10P2A.

Preferably, the second absorption axis 10P2A is parallel to the first absorption axis 10P1A. For example, the first absorption axis 10P1A and the second absorption axis 10P2A are set at an azimuthal angle of 90°.

Modified Example 1 of Embodiment 1

Figure 7:
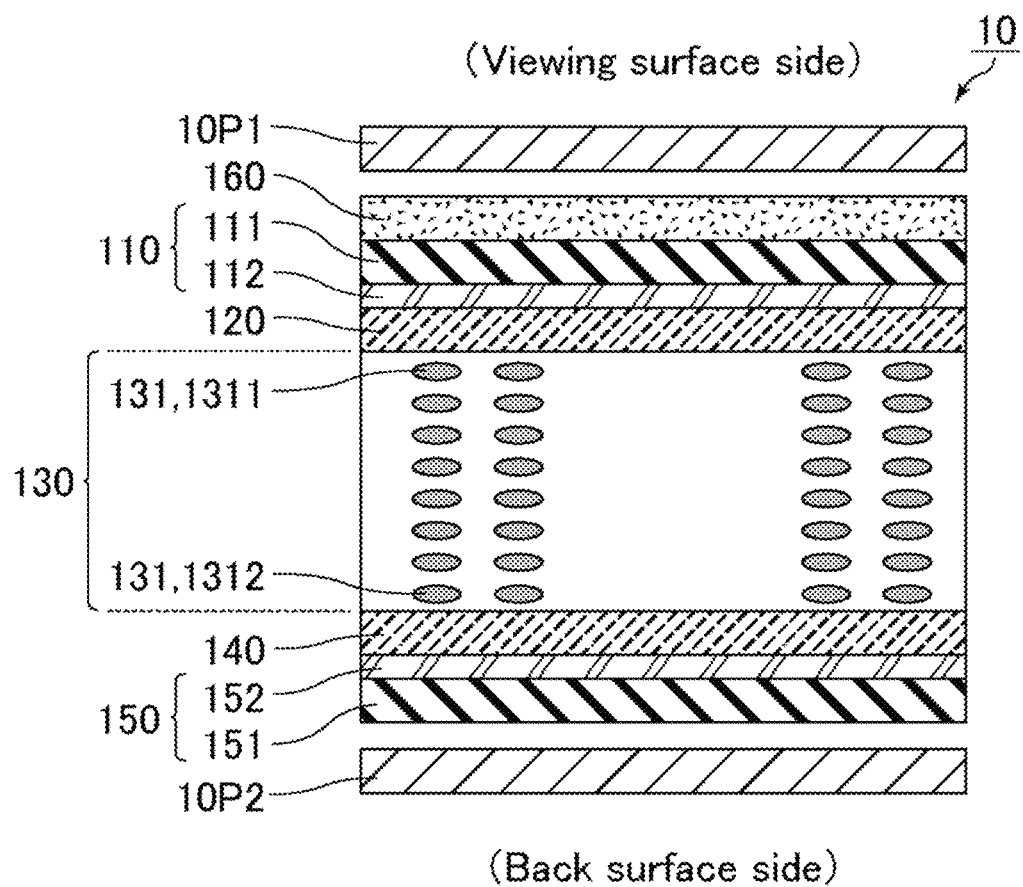
FIG. 7 is a schematic perspective view of a viewing angle-controlling liquid crystal panel of Modified Example 1 of Embodiment 1.

FIG. 7 is a schematic perspective view of a viewing angle-controlling liquid crystal panel of Modified Example 1 of Embodiment 1. As shown in FIG. 7, preferably, the viewing angle-controlling liquid crystal panel 10 further includes a negative C plate 160 providing a retardation Rth in the thickness direction of not less than 500 nm. This configuration can achieve an even smaller light-shielding angle in the narrow viewing angle mode. The negative C plate 160 may be a single-layered plate or a laminate of a plurality of layers. Configurations except for those described in the present modified example are the same as those in Embodiment 1. For the convenience of description, components having the same functions in FIG. 7 and the drawings for Embodiment 1 are provided with the same reference sign so as to avoid repetition of description.

The retardation Rth in the thickness direction provided by the negative C plate 160 is more preferably not less than 550 nm. The upper limit of the retardation Rth in the thickness direction provided by the negative C plate 160 is not limited and may be, for example, not more than 1000 nm.

Examples of the negative C plate include stretched cycloolefin polymer films.

Modified Example 2 of Embodiment 1

The viewing angle-controlling liquid crystal panel 10 of Embodiment 1 is a passive liquid crystal panel which is passively driven. The viewing angle-controlling liquid crystal panel 10 is not limited thereto and may be, for example, an active matrix liquid crystal panel which is driven by an active matrix driving method. Configurations except for those described in the present modified example are the same as those in Embodiment 1. For the convenience of description, components having the same functions in FIG. 8 and the drawings for Embodiment 1 are commonly provided with the same reference sign so as to avoid repetition of description.

Figure 8:
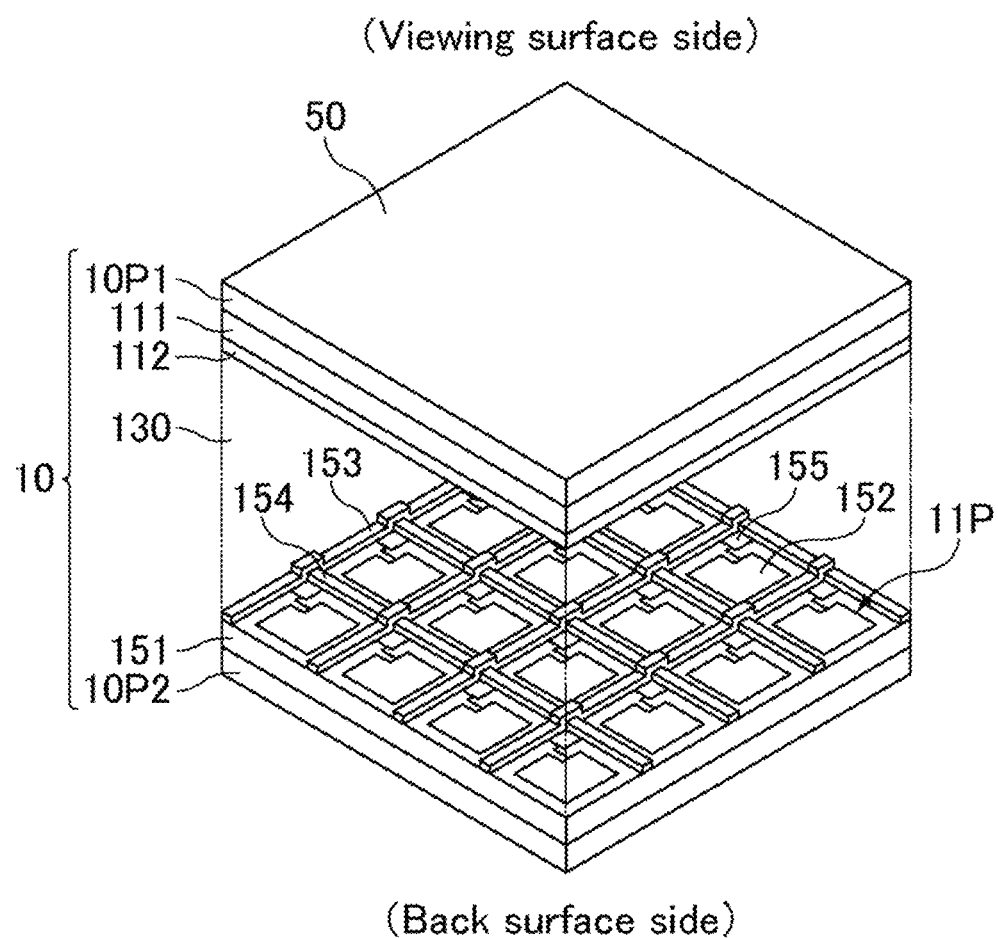
FIG. 8 is a schematic perspective view of a viewing angle-controlling liquid crystal panel of Modified Example 2 of Embodiment 1.

FIG. 8 is a schematic perspective view of a viewing angle-controlling liquid crystal panel of Modified Example 2 of Embodiment 1. The viewing angle-controlling liquid crystal panel 10 of the present modified example shown in FIG. 8 is an active matrix liquid crystal panel adopting active matrix driving. This configuration enables switching between the public mode and the privacy mode partially, not entirely, on the screen 50.

The second substrate 150 of the viewing angle-controlling liquid crystal panel 10 includes, as in a typical active matrix liquid crystal panel, gate lines 153 and source lines 154 arranged perpendicularly to each other and forming a grid pattern, and thin film transistors (TFTs) 155 as switching elements at or near the respective intersections. Regions surrounded by the gate lines 153 and the source lines 154 define pixels 11P, and each pixel 11P includes as the second electrode 152 a pixel electrode connected to a corresponding TFT 155.

The first substrate 110 facing the second substrate 150 includes as the first electrode 112 a common electrode that is a solid electrode covering the entire screen 50.

The viewing angle-controlling liquid crystal panel 10 may be driven by any method such as a typical active matrix driving method. In other words, the TFTs 155 in the respective pixels are switched on or off (turned on or off) via a gate driver. The switching is followed by application of voltage to the switched-on pixel via the source driver so as to store electric charge in the storage capacitor in the pixel via the drain bus of the corresponding TFT. The storage capacitance maintains the pixel turned on.

The gate lines 153 are conductive lines connected to the gate electrodes of the respective TFTs 155 (typically, the bus lines connected to the gate electrodes). Scanning signals (signals that control the on and off states of the TFTs) are supplied to the connected gate electrodes of the TFTs 155. The source lines 154 are conductive lines connected to the source electrodes of the respective TFTs 155 (typically, bus lines connected to the source electrodes). Data signals (e.g., video signals) are supplied to the connected TFTs 155. Typically, either the gate lines 153 or the source lines 154 are in the form of lines vertically crossing an array region with the TFTs 155 arranged in a matrix pattern while the others are in the form of lines horizontally crossing the array region.

The gate lines 153, the source lines 154, and the conductive lines and electrodes of the TFTs 155 can be formed by forming a single- or multi-layered film of a metal such as copper, titanium, aluminum, molybdenum, or tungsten, or an alloy of any of these metals by a method such as sputtering, followed by patterning of the film by a method such as photolithography. Various conductive lines and electrodes to be formed in the same layer are produced from the same material for a higher efficiency of production.

Embodiment 2

The features unique to the present embodiment are mainly described here, and description of the matters already described in Embodiment 1 is omitted. The present embodiment relates to a display device including the viewing angle-controlling liquid crystal panel 10 of Embodiment 1 and a display panel.

Figure 9:
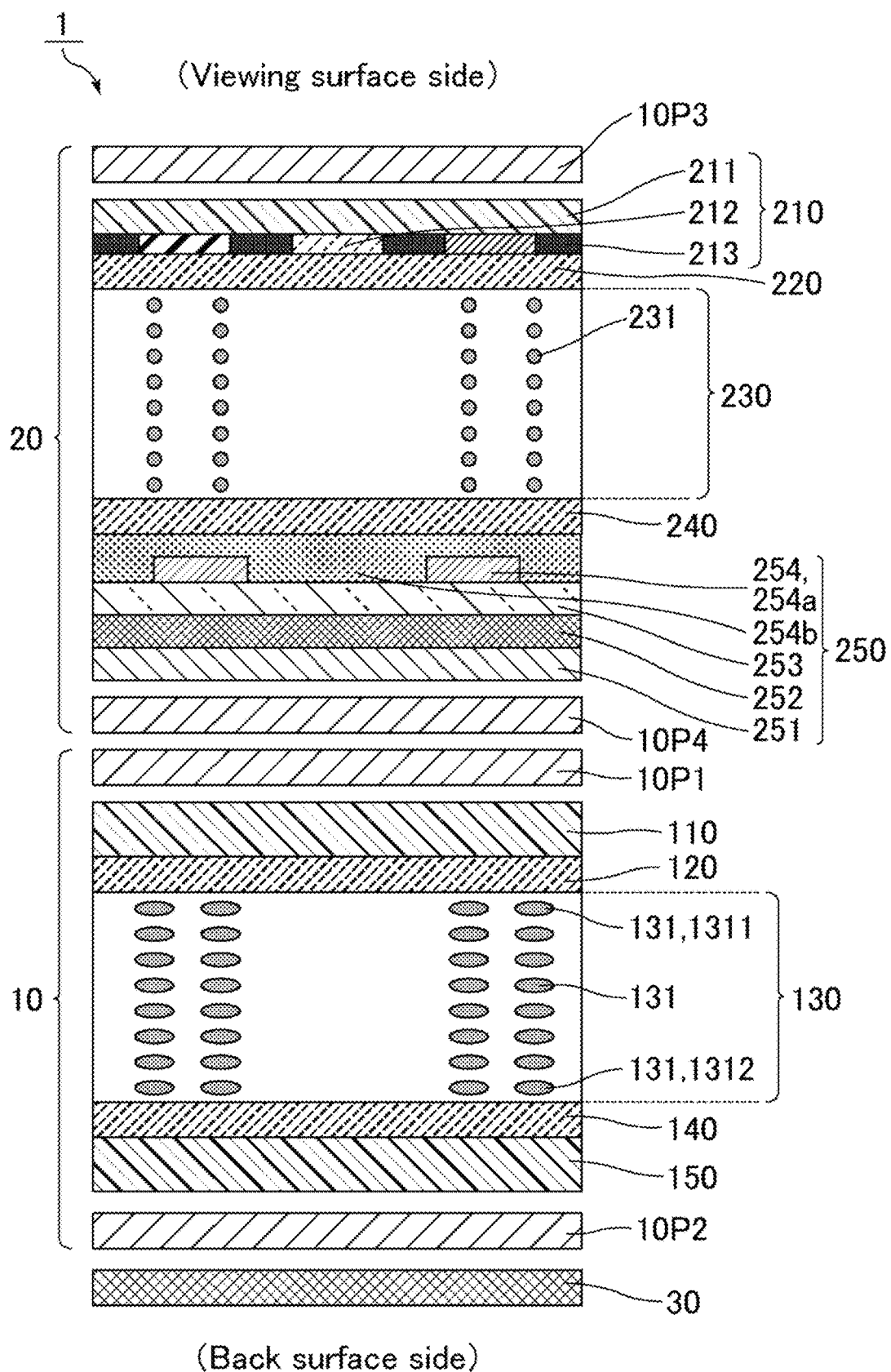
FIG. 9 is a schematic cross-sectional view of a display device of Embodiment 2.
Figure 10:
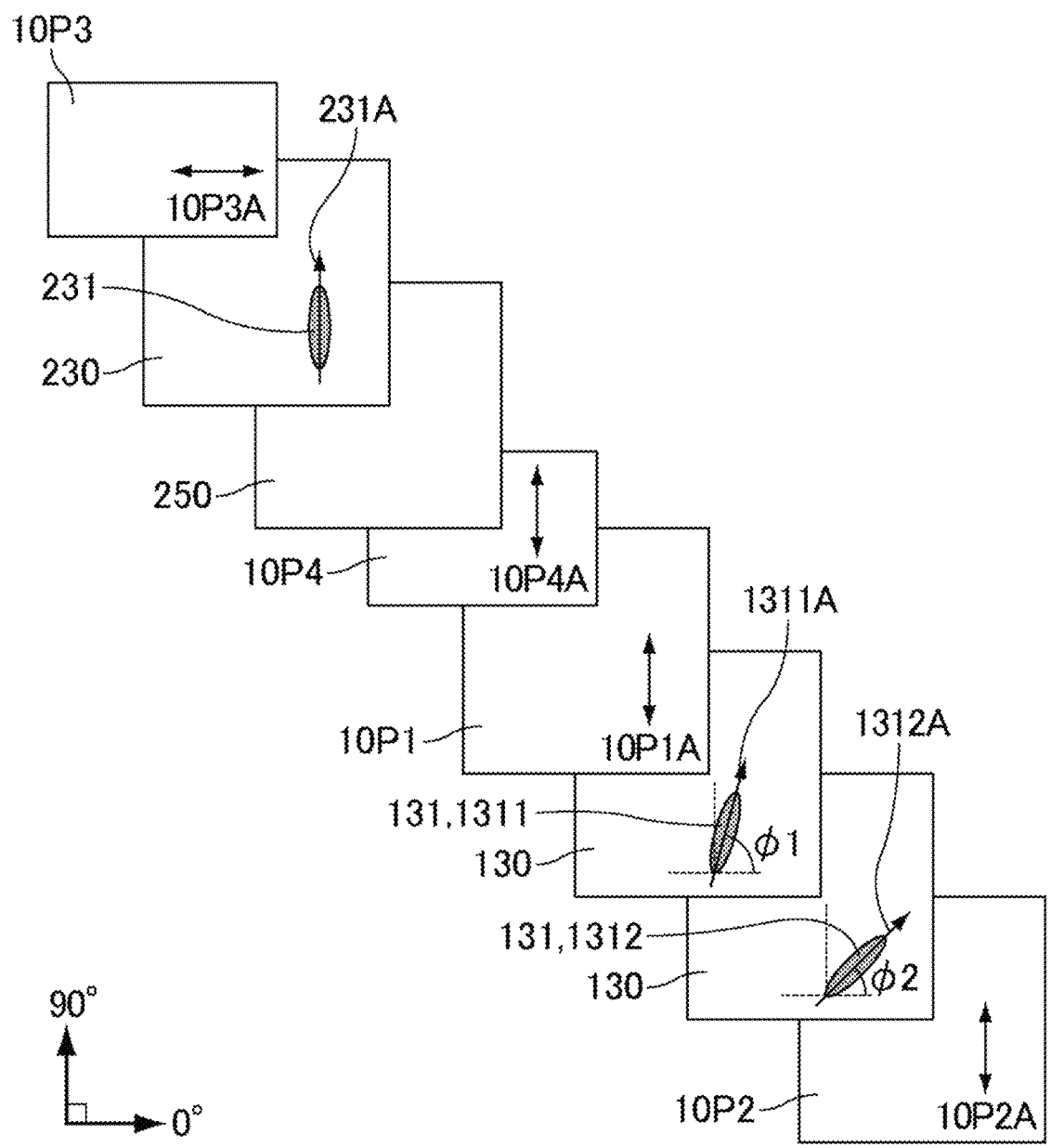
FIG. 10 is a schematic front view of the display device of Embodiment 2.

FIG. 9 is a schematic cross-sectional view of the display device of Embodiment 2. FIG. 10 is a schematic front view of the display device of Embodiment 2. As shown in FIG. 9 and FIG. 10, a display device 1 of the present embodiment includes the viewing angle-controlling liquid crystal panel 10 of Embodiment 1 and a liquid crystal display panel 20 as the display panel. The display device 1 of the present embodiment is a dual-cell viewing angle-controlling liquid crystal display device. This configuration enables the viewing angle-controlling liquid crystal panel 10 to operate in the wide viewing angle mode in a state with no voltage applied where a voltage not lower than the threshold is not applied to the liquid crystal layer 130, thus enabling an image displayed on the liquid crystal display panel 20 to be viewable in a wide viewing angle range. Also, the configuration enables the viewing angle-controlling liquid crystal panel 10 to operate in the narrow viewing angle mode in which the viewing angle range is asymmetric about the central axis (polar angle of 0°, i.e., front direction) in the horizontal direction (azimuthal angle of 0° or 180°) in a state with voltage applied where a voltage not lower than the threshold is applied to the liquid crystal layer 130. In particular, the light-shielding angle can be reduced to, for example, a polar angle of −40° to −30° to sufficiently narrow the viewable angle range (polar angle range), so that a sufficient light-shielding effect can be achieved. As a result, the configuration can narrow the range (polar angle range) in which an image displayed on the liquid crystal display panel 20 is viewable in the narrow viewing angle mode. In addition, the configuration, in a front view of the display device 1, can reduce a color shift generated between the wide viewing angle mode and the narrow viewing angle mode.

The display device 1 of the present embodiment includes, sequentially from the back surface side toward the viewing surface side, a backlight 30, the viewing angle-controlling liquid crystal panel 10, and the liquid crystal display panel 20.

The viewing angle-controlling liquid crystal panel 10 includes, sequentially from the viewing surface side toward the back surface side, the first polarizing plate 10P1, the first substrate 110, the first alignment film 120, the liquid crystal layer 130 (hereinafter, also referred to as a first liquid crystal layer 130), the second alignment film 140, the second substrate 150, and the second polarizing plate 10P2.

The liquid crystal display panel 20 includes, sequentially from the viewing surface side toward the back surface side, a third polarizing plate 10P3, a third substrate 210, a third alignment film 220, a second liquid crystal layer 230, a fourth alignment film 240, a fourth substrate 250, and a fourth polarizing plate 10P4. The liquid crystal display panel 20 includes pixels arranged in the in-plane direction in a matrix pattern.

The third substrate 210 incudes, sequentially from the viewing surface side toward the back surface side, a third support substrate 211, a color filter layer 212, and a black matrix layer 213. The third substrate 210 is also referred to as a color filter substrate.

The third support substrate 211 is not limited and may be, for example, the same substrate as the first support substrate 111 and the second support substrate 151.

The color filter layer 212 is defined by, for example, red color filters, green color filters, and blue color filters. The red color filters, the green color filters, and the blue color filters each are made of, for example, a transparent resin containing a pigment.

The black matrix layer 213 is disposed in a grid-like pattern to partition the color filters of multiple colors in the color filter layer 212. The black matrix layer may be made of any material capable of blocking light and may preferably be made of a resin material containing a black pigment or a metal material capable of blocking light. The black matrix layer 213 is formed by, for example, applying a photosensitive resin containing a black pigment to form a film, followed by photolithography including exposure and development.

The fourth substrate 250 preferably includes third electrodes 252 and fourth electrodes 254. This configuration can achieve the liquid crystal display panel 20 in the in-plane switching (IPS) mode or the fringe field switching (FFS) mode and allows the liquid crystal display panel 20 alone to achieve a wide viewing angle range. The present embodiment is described based on a case where the liquid crystal display panel 20 is in the FFS mode.

As shown in FIG. 9, the fourth substrate 250 includes, sequentially from the back surface side toward the viewing surface side, a fourth support substrate 251, the third electrodes 252 arranged in the respective pixels, an insulating layer 253, and the fourth electrodes 254 each including linear electrodes 254a. In other words, the fourth substrate 250 has an FFS electrode structure in which the third electrodes 252 and the fourth electrodes 254 are stacked with the insulating layer 253 in between. The fourth substrate 250 is also referred to as an active matrix substrate.

The fourth substrate 250 includes, on the fourth substrate 250, parallel gate lines and parallel source lines crossing the gate lines via an insulating film. The gate lines and the source lines as a whole are formed in a grid pattern. TFTs are arranged as switching elements at the respective intersections of the gate lines and the source lines.

The present embodiment is described with reference to the liquid crystal display panel 20 having an FFS-mode electrode structure as an example. Yet, the concept of the present embodiment is also applicable to an IPS-mode electrode structure in which the third electrodes 252 and the fourth electrodes 254 are both comb-teeth electrodes, and the third electrodes 252 as comb-teeth electrodes and the fourth electrodes 254 as comb-teeth electrodes are formed in the same electrode layer such that their comb teeth fit each other.

Non-limiting examples of the fourth support substrate 251 of the fourth substrate 250 include the same support substrates as the first support substrate 111 and the second support substrate 151.

The third electrodes 252 and the fourth electrodes 254 are arranged in the respective pixels. The third electrodes 252 are preferably planar electrodes. Herein, the "planar electrode" means an electrode without any slit or aperture in a plan view. The third electrodes 252 preferably overlap at least the later-described linear electrodes 254a of the fourth electrodes 254 in a plan view.

The fourth electrodes 254 are electrically connected to one another over the pixels. The fourth electrodes 254 each include the linear electrodes 254a. The planar shape of the fourth electrodes 254 may be, for example, a structure in which the ends of the linear electrodes 254a are both closed. The fourth electrodes 254 may each be provided with an aperture 254b surrounded by its electrode portion.

The fourth electrodes 254 arranged in the respective pixels may be electrically connected to one another and a common constant voltage may be applied to the pixels, while each of the third electrodes 252 arranged in the respective pixels may be electrically connected to the corresponding source line via the semiconductor layer of the corresponding TFT and different voltages may be applied to the respective pixels according to the respective image signals. Also, each of the fourth electrodes 254 may be electrically connected to the corresponding source line via the semiconductor layer of the corresponding TFT and different voltages may be applied to the respective pixels according to the respective image signals, while the third electrodes 252 may be electrically connected to one another and a common constant voltage may be applied to the pixels.

Examples of the third electrodes 252 and the fourth electrodes 254 include the same electrodes as the first electrode 112 and the second electrode 152.

Examples of the insulating layer 253 include inorganic insulating films and organic insulating films. The inorganic insulating films may be, for example, inorganic films (relative dielectric constant ε=5 to 7) such as a silicon nitride (SiNx) film or a silicon oxide ($SiO_2$) film, or a laminate of these films. The organic insulating films may be, for example, organic films such as an acrylic resin film, a polyimide resin film, or a novolac resin film, or a laminate of any of these films.

The third alignment film 220 and the fourth alignment film 240 control the alignment azimuth of the liquid crystal molecules 231 with no voltage applied and the tilt angle of the liquid crystal molecules 231 with no voltage applied. The third alignment film 220 and the fourth alignment film 240 may each be a horizontal alignment film or a vertical alignment film. To control the in-plane liquid crystal retardation and achieve sufficient white luminance, the third alignment film 220 and the fourth alignment film 240 are preferably horizontal alignment films.

The third alignment film 220 and the fourth alignment film 240 may be rubbed alignment films or photoalignment films. The third alignment film 220 and the fourth alignment film 240 contain, for example, a polymer for an alignment film such as a polymer having a polyimide structure in its main chain, a polymer having a polyamic acid structure in its main chain, or a polymer having a polysiloxane structure in its main chain. The third alignment film 220 and the fourth alignment film 240 can be formed by, for example, applying an alignment film material containing the polymer for an alignment film to the third substrate 210 and the fourth substrate 250, respectively. The application method may be any method such as flexo printing or inkjet coating.

The second liquid crystal layer 230 contains the liquid crystal molecules 231 and controls the amount of light passing therethrough by changing the alignment of the liquid crystal molecules 231 according to the voltage applied to the second liquid crystal layer 230. The anisotropy of dielectric constant (Δε) of the liquid crystal molecules defined by the formula (L) may be positive or negative, and is preferably positive.

The third polarizing plate 10P3 and the fourth polarizing plate 10P4 are both absorptive polarizers. The third polarizing plate 10P3 and the fourth polarizing plate 10P4 may each be, for example, a polarizer (absorptive polarizing plate) obtained by dyeing a polyvinyl alcohol (PVA) film with an anisotropic material such as an iodine complex (or dye) to adsorb the anisotropic material on the PVA film, and stretching the film for alignment.

The third polarizing plate 10P3 has a third absorption axis 10P3A and a third transmission axis perpendicular to the third absorption axis 10P3A. The fourth polarizing plate 10P4 has a fourth absorption axis 10P4A and a fourth transmission axis perpendicular to the fourth absorption axis 10P4A.

Preferably, the liquid crystal display panel 20 sequentially includes the third polarizing plate 10P3 with the third absorption axis 10P3A, the second liquid crystal layer 230, and the fourth polarizing plate 10P4 with the fourth absorption axis 10P4A perpendicular to the third absorption axis 10P3A, and the fourth absorption axis 10P4A of the fourth polarizing plate 10P4, which is closer to the viewing angle-controlling liquid crystal panel 10 than the third polarizing plate 10P3 is, is parallel to the first absorption axis 10P1A. This configuration can achieve the black display with no voltage applied.

In the present embodiment, for example, the azimuthal angle φP1 of the first absorption axis 10P1A, the azimuthal angle of the second absorption axis 10P2A, and the azimuthal angle of the fourth absorption axis 10P4A are set to 90°, and the azimuthal angle of the third absorption axis 10P3A is set to 0°.

The backlight 30 may be one commonly used in the field of liquid crystal display devices. The backlight 30 may be any one that can be placed on the back surface side of the viewing angle-controlling liquid crystal panel 10 and emit light from the backlight 30 to the viewing surface side. The backlight 30 may be a direct-lit one or an edge-lit one. The light source of the backlight 30 may be of any type such as a light emitting diode (LED) or a cold cathode fluorescent lamp (CCFL).

The backlight 30 may include a louver film to improve the directivity. Preferably, the backlight 30 includes two light guide plates, and one of the two light guide plates has a function for the wide viewing angle mode and the other of the two light guide plates has a function for the narrow viewing angle mode. Specifically, for example, the backlight 30 may include a light guide plate laminate of a diffusing light guide plate and a non-diffusing light guide plate and independently control the LEDs arranged at the end of each of the two light guide plates, so as to be able to switch the mode of the backlight between the public mode and the privacy mode.

The liquid crystal display panel 20 may further include a viewing angle widening film (retardation film) on the viewing surface side of the third substrate 210 or on the back surface side of the fourth substrate 250. Examples of the viewing angle widening film include SAM films that have a fine wedge-like slope structure and disperse straight-forward-travelling light to all the azimuths.

Modified Example 1 of Embodiment 2

Figure 11:
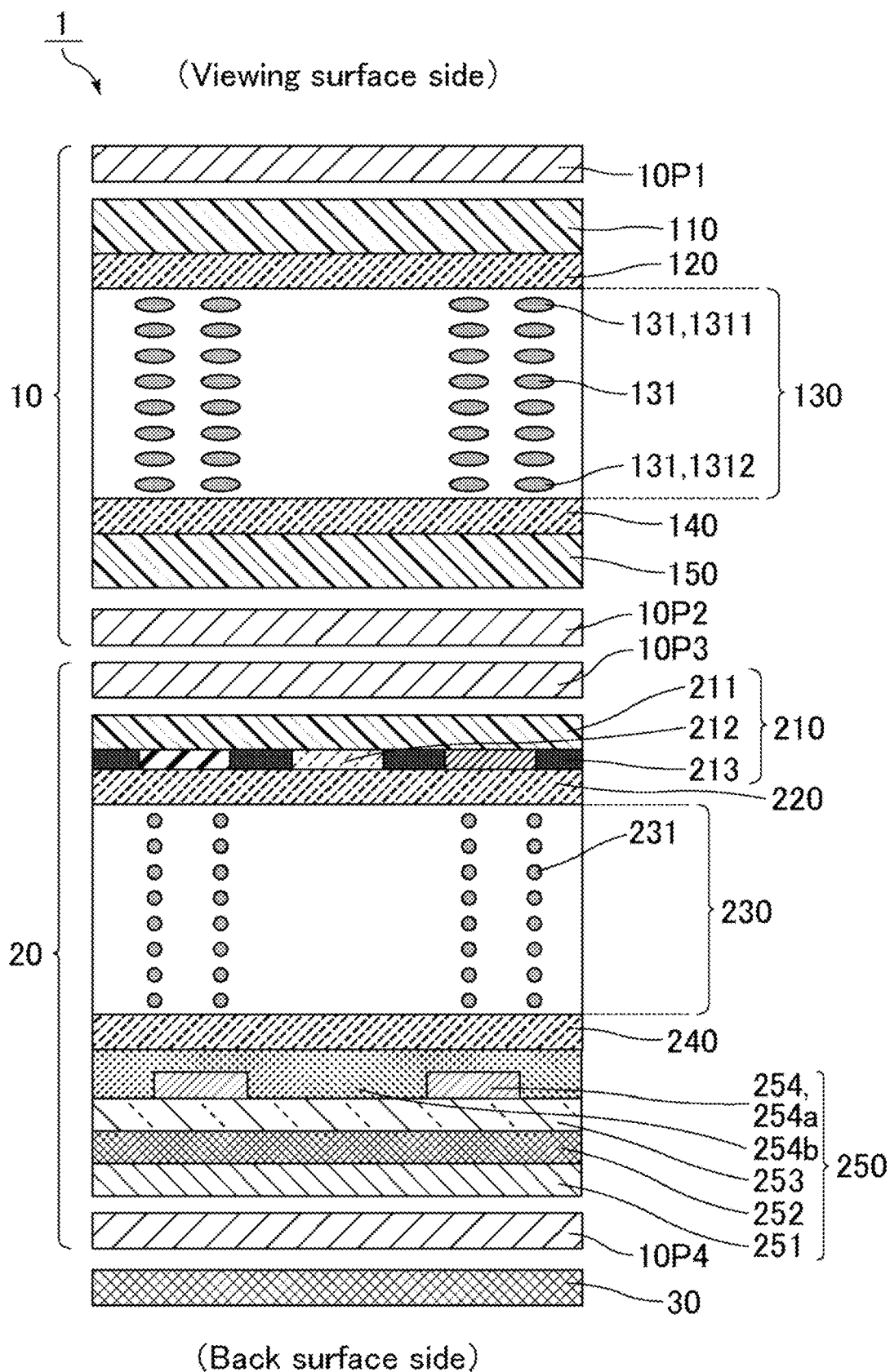
FIG. 11 is a schematic cross-sectional view of a display device of Modified Example 1 of Embodiment 2.
Figure 12:
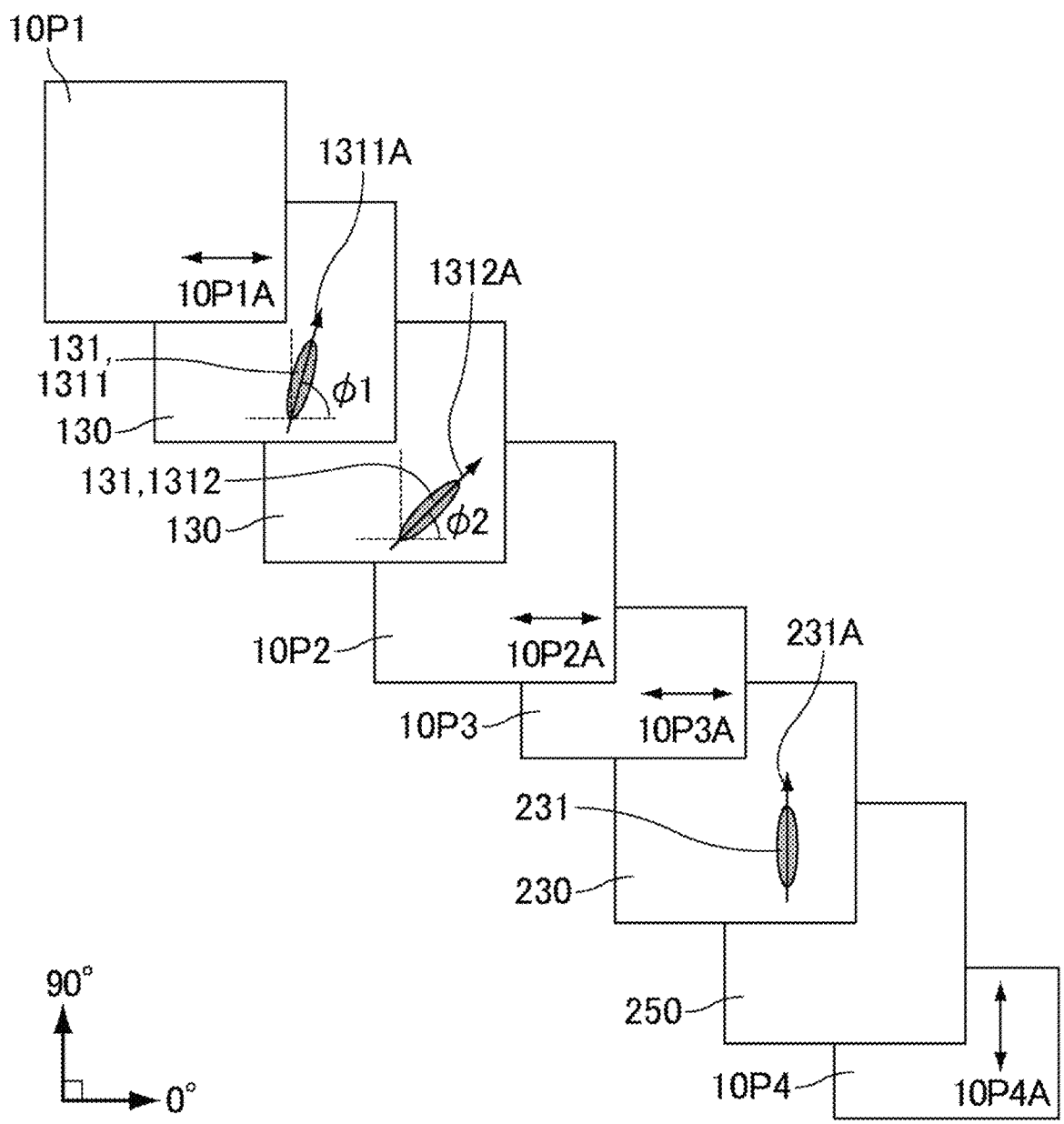
FIG. 12 is a schematic front view of the display device of Modified Example 1 of Embodiment 2.

FIG. 11 is a schematic cross-sectional view of a display device of Modified Example 1 of Embodiment 2. FIG. 12 is a schematic front view of the display device of Modified Example 1 of Embodiment 2. The liquid crystal display panel 20 in the display device 1 of Embodiment 2 is disposed on the viewing surface side of the viewing angle-controlling liquid crystal panel 10. The position of the liquid crystal display panel 20 is not limited thereto, and the liquid crystal display panel 20 may be disposed on the back surface side of the viewing angle-controlling liquid crystal panel 10 as shown in FIG. 11 and FIG. 12. This configuration can achieve the same effect as Embodiment 2.

Preferably, in the liquid crystal display panel 20 in the present modified example, the third absorption axis 10P3A of the third polarizing plate 10P3, which is closer to the viewing angle-controlling liquid crystal panel 10 than the fourth polarizing plate 10P4 is, is parallel to the first absorption axis 10P1A. This configuration can achieve the black display with no voltage applied.

In the present modified example, for example, the azimuthal angle φP1 of the first absorption axis 10P1A, the azimuthal angle of the second absorption axis 10P2A, and the azimuthal angle of the third absorption axis 10P3A are set to 0°, and the azimuthal angle of the fourth absorption axis 10P4A is set to 90°.

Modified Example 2 of Embodiment 2

Embodiment 2 adopts the liquid crystal display panel 20 as the display panel. The display panel may be any light-emitting unit and may be, for example, an organic electroluminescent (EL) display panel, an inorganic EL display panel, a microLED display panel, or a quantum dot light emitting diode (QLED) display panel. When the display panel is an organic EL display panel, an inorganic EL display panel, a microLED display panel, or a QLED display panel, the viewing angle-controlling liquid crystal panel 10 is disposed on the viewing surface side of the display panel and the display device 1 includes no backlight. The QLED display panel may be, for example, a liquid crystal-type one adopting blue LEDs as the backlight light sources and wavelength conversion by quantum dots (conversion from blue light to green light and conversion from blue light to red light, with the blue light transmitted as is to provide a blue color), so that the panel can reproduce a wider variety of colors and achieve lower power consumption than conventional liquid crystal panels.

The second polarizing plate 10P2 may be an absorptive polarizing plate. Yet, for example, a reflective polarizing plate (having a structure of a linearly polarizing plate/reflective polarizing plate) may also be used to increase the light recycling efficiency and thus the luminance as well, since the light from organic light emitting diodes (OLEDs) used in an organic EL display panel is unpolarized.

Modified Example 3 of Embodiment 2

Figure 32:
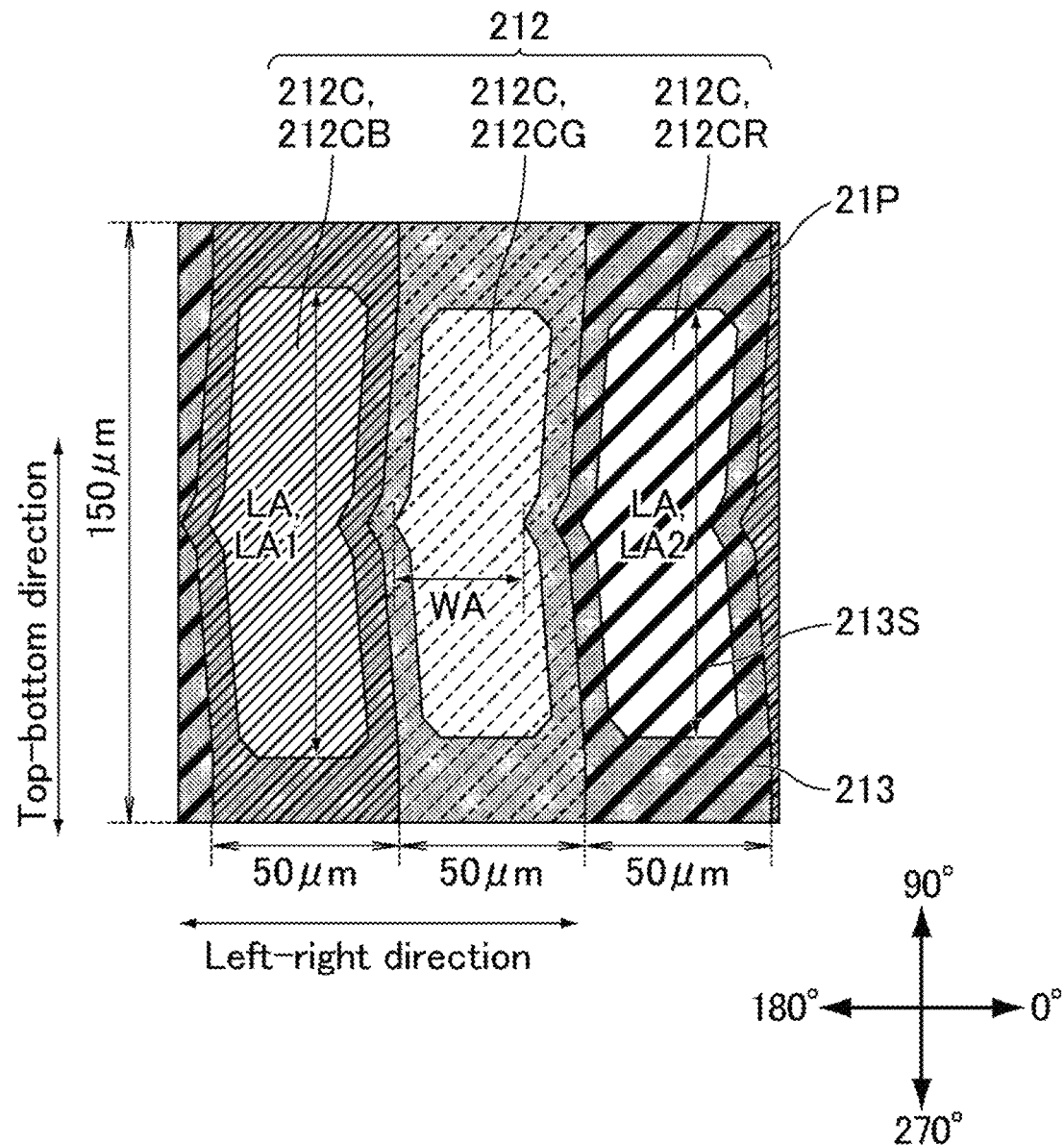
FIG. 32 is a schematic plan view of a third substrate of a liquid crystal display panel in a display device of Modified Example 3 of Embodiment 2.
Figure 33:
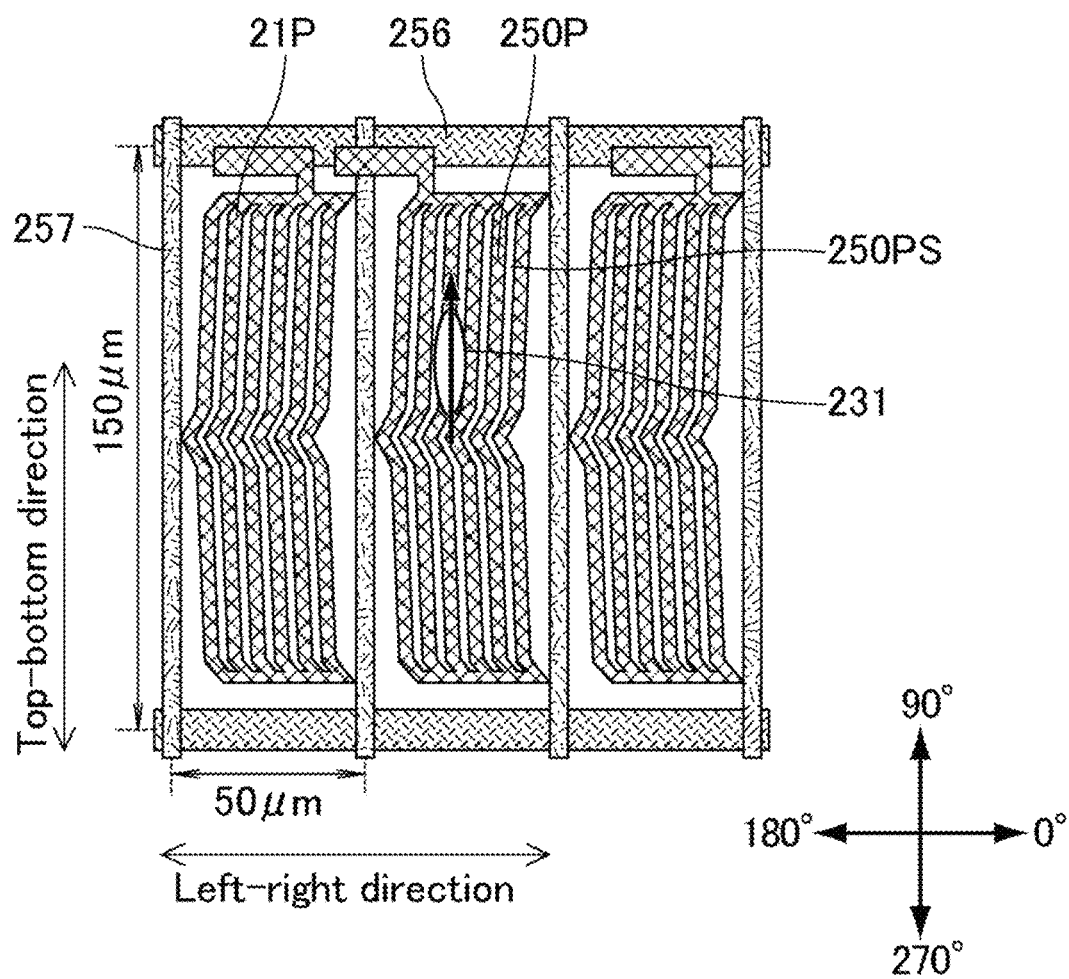
FIG. 33 is a schematic plan view of a fourth substrate of the liquid crystal display panel in the display device of Modified Example 3 of Embodiment 2.

In Embodiment 2, the liquid crystal display panel 20 may adopt a vertical (lengthwise) pixel arrangement. FIG. 32 is a schematic plan view of a third substrate of a liquid crystal display panel in a display device of Modified Example 3 of Embodiment 2. FIG. 33 is a schematic plan view of a fourth substrate of the liquid crystal display panel in the display device of Modified Example 3 of Embodiment 2.

As shown in FIG. 9, FIG. 32, and FIG. 33, the liquid crystal display panel 20 as the display panel includes the third substrate 210, the second liquid crystal layer 230, and the fourth substrate 250. The third substrate 210 includes color filters 212C of a plurality of colors. The fourth substrate 250 includes the third electrodes 252 or the fourth electrodes 254 as the pixel electrodes 250P. The color filters 212C of a plurality of colors and the pixel electrodes 250P each have an elongated shape, and the lengthwise direction of each of the color filters 212C of a plurality of colors and the pixel electrodes 250P lies in the top-bottom direction of the liquid crystal display panel 20. In this manner, with the vertical pixel arrangement where the lengthwise direction of each of the color filters 212C of a plurality of colors and the pixel electrodes 250P lies in the top-bottom direction of the liquid crystal display panel 20, an increase in width of the frame region, where modules are arranged, on the left and right sides of the liquid crystal display panel 20 can be prevented or reduced.

Herein, the top of the liquid crystal display panel 20 means an azimuthal angle of 90° of the liquid crystal display panel 20. The bottom of the liquid crystal display panel 20 means an azimuthal angle of 270° of the liquid crystal display panel 20. The right of the liquid crystal display panel 20 means an azimuthal angle of 0° of the liquid crystal display panel 20. The left of the liquid crystal display panel 20 means an azimuthal angle of 180° of the liquid crystal display panel 20. In other words, the top-bottom direction of the liquid crystal display panel 20 means the direction of 90°-270° azimuth of the liquid crystal display panel 20. The left-right direction of the liquid crystal display panel 20 is the direction of 0°-180° azimuth, i.e., the horizontal direction, of the liquid crystal display panel 20. Herein, an azimuth of 0° means the same as an azimuthal angle of 0°, an azimuth of 90° means the same as an azimuthal angle of 90°, an azimuth of 180° means the same as an azimuthal angle of 180°, an azimuth of 270° means the same as an azimuthal angle of 270°, and an azimuth of 360° means the same as an azimuthal angle of 360°. In other words, the angle following the azimuth is the azimuthal angle.

The fourth substrate 250 includes the gate lines 256 and the source lines 257 arranged perpendicularly to each other and forming a grid pattern, and TFTs as switching elements at or near the respective intersections. Regions surrounded by the gate lines 256 and the source lines 257 define pixels 21P, and each pixel 21P includes as a third electrode 252 or a fourth electrode 254 a pixel electrode 250P connected to a corresponding TFT. The fourth substrate 250 is also referred to as a TFT substrate.

Each pixel electrode 250P has an elongated shape, and the lengthwise direction of each pixel electrode 250P lies in the top-bottom direction of the liquid crystal display panel 20. In other words, each pixel electrode 250P lies in the top-bottom direction of the liquid crystal display panel 20.

Each pixel 21P has an elongated shape, and the lengthwise direction of each pixel 21P lies in the top-bottom direction of the liquid crystal display panel 20. In other words, each pixel 21P lies in the top-bottom direction of the liquid crystal display panel 20.

The length of each pixel 21P in the lengthwise direction (top-bottom direction) is not shorter than 130 µm and not longer than 170 µm, preferably not shorter than 140 µm and not longer than 160 µm, and is 150 µm, for example. The length of each pixel 21P in the widthwise direction (left-right direction) is not shorter than 30 µm and not longer than 70 µm, preferably not shorter than 40 µm and not longer than 60 µm, and is 50 µm, for example.

Each pixel electrode 250P is provided with a slit 250PS in the lengthwise direction (top-bottom direction) of the pixel electrode 250P. The liquid crystal molecules 231 in the second liquid crystal layer 230 with no voltage applied are aligned along the slits 250PS.

The third substrate 210 includes the color filter layer 212 with the color filters 212C of a plurality of different colors, and the black matrix layer 213. The color filters 212C of a plurality of colors include, for example, red color filters 212CR, green color filters 212CG, and blue color filters 212CB. Each pixel 21P includes a color filter 212C of one of these colors. The third substrate 210 is also referred to as a color filter substrate.

The red color filters 212CR, the green color filters 212CG, and the blue color filters 212CB each have an elongated shape, and the lengthwise direction of each of the filters lies in the top-bottom direction of the liquid crystal display panel 20. In other words, the red color filters 212CR, the green color filters 212CG, and the blue color filters 212CB each lie in the top-bottom direction of the liquid crystal display panel 20.

The third substrate 210 includes the black matrix layer 213 provided with a plurality of apertures 213S corresponding to the respective color filters 212C of a plurality of colors. The width LA of each of the apertures 213S in the top-bottom direction of the liquid crystal display panel 20 is not smaller than 80 µm and not greater than 140 µm, and the width WA of each of the apertures 213S in the left-right direction of the liquid crystal display panel 20 is not greater than 80 µm.

The width LA (also referred to as "LA1") of each aperture 213S corresponding to a blue color filter 212CB in the top-bottom direction of the liquid crystal display panel 20 is greater than the width LA (also referred to as "LA2") of each aperture 213S corresponding to a green color filter 212CG and the width LA (LA2) of each aperture 213S corresponding to a red color filter 212CR in the top-bottom direction of the liquid crystal display panel 20. The width LA (LA1) of each aperture 213S corresponding to a blue color filter 212CB in the top-bottom direction of the liquid crystal display panel 20 is 120 µm, for example. The width LA (LA2) of each aperture 213S corresponding to a green color filter 212CG and the width LA (LA2) of each aperture 213S corresponding to a red color filter 212CR in the top-bottom direction of the liquid crystal display panel 20 are 100 µm, for example.

The width WA of each aperture 213S corresponding to a blue color filter 212CB, the width WA of each aperture 213S corresponding to a green color filter 212CG, and the width WA of each aperture 213S corresponding to a red color filter 212CR in the left-right direction of the liquid crystal display panel 20 is 40 µm, for example.

Modified Example 4 of Embodiment 2

Figure 34:
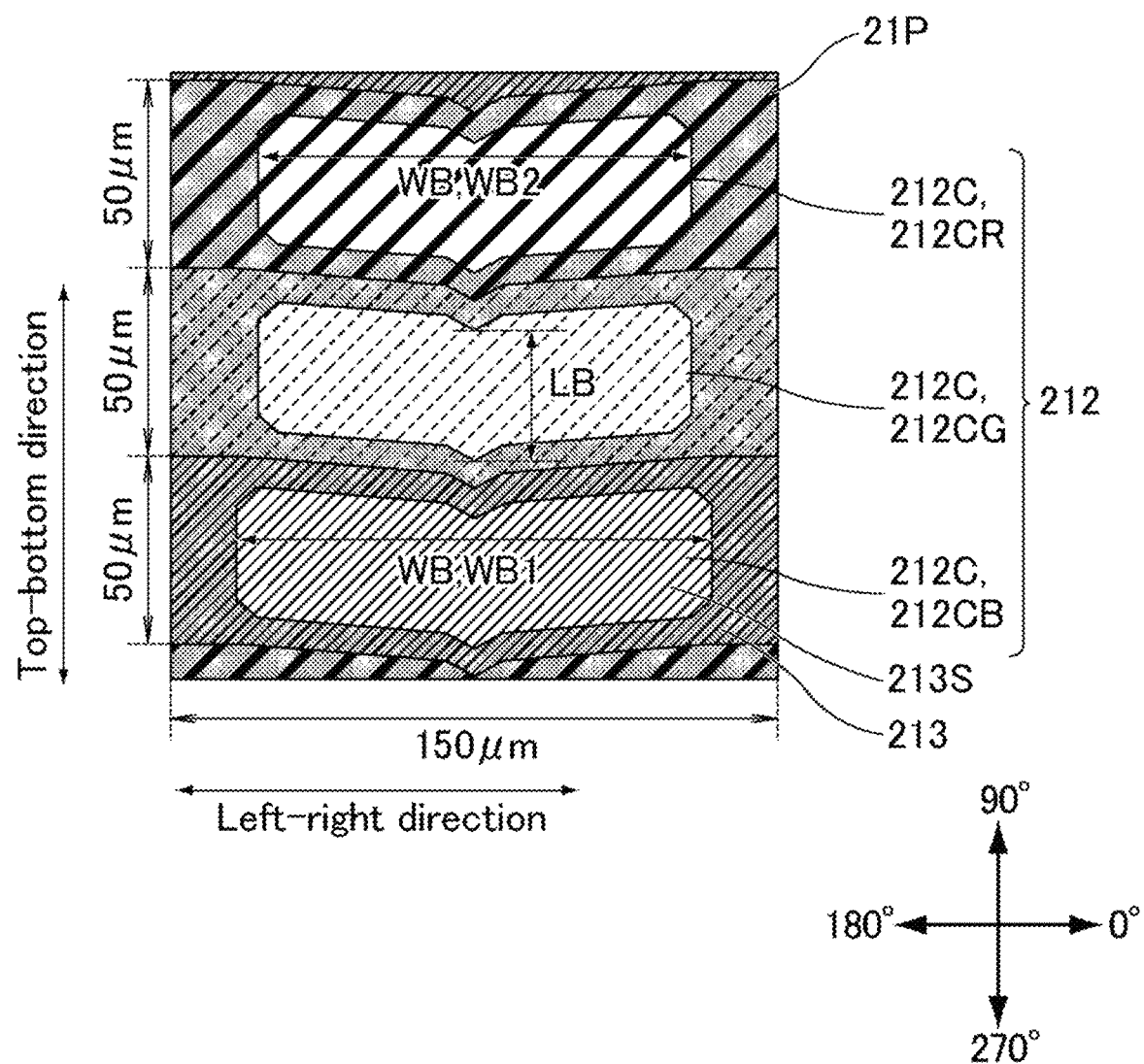
FIG. 34 is a schematic plan view of a third substrate of a liquid crystal display panel in a display device of Modified Example 4 of Embodiment 2.
Figure 35:
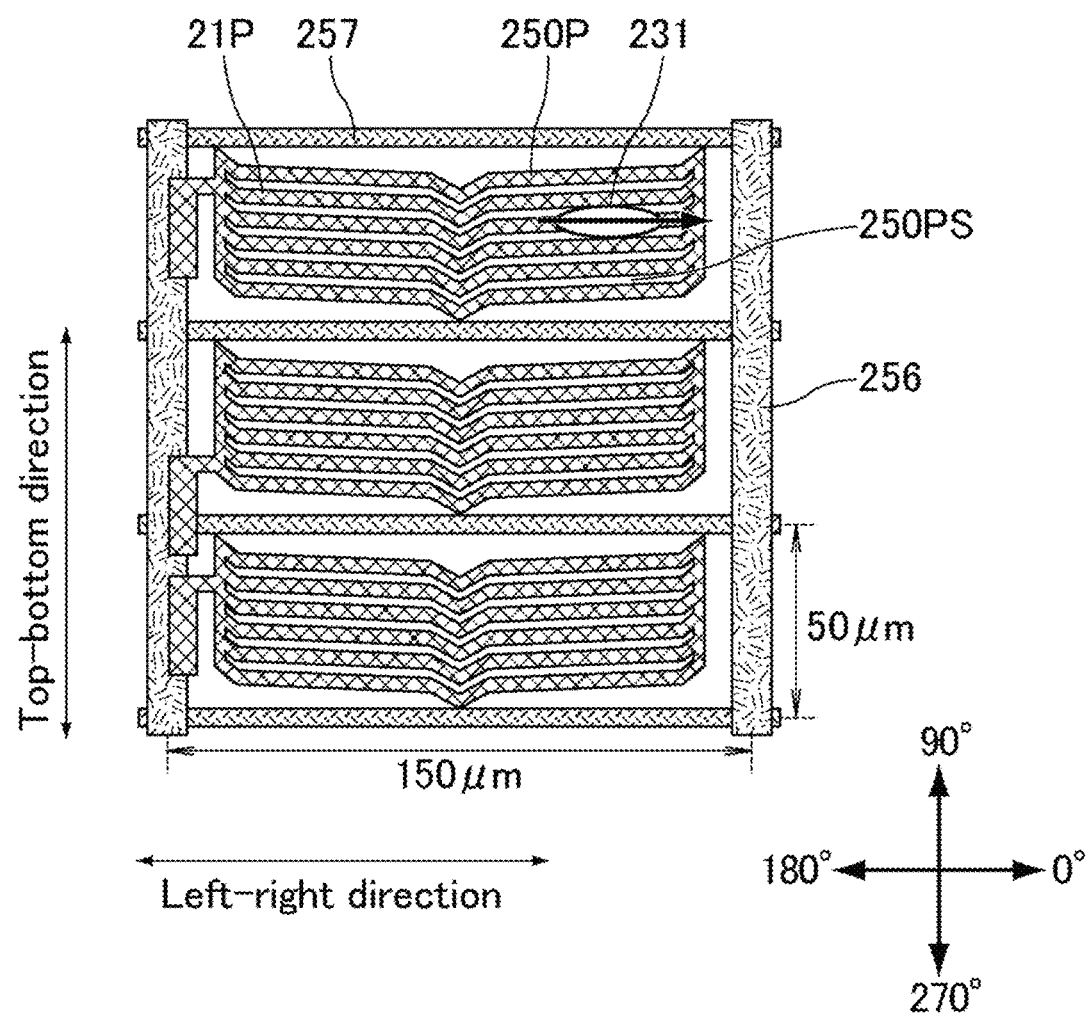
FIG. 35 is a schematic plan view of a fourth substrate of the liquid crystal display panel in the display device of Modified Example 4 of Embodiment 2.

In Embodiment 2, the liquid crystal display panel 20 may adopt a horizontal (widthwise) pixel arrangement. FIG. 34 is a schematic plan view of a third substrate of a liquid crystal display panel in a display device of Modified Example 4 of Embodiment 2. FIG. 35 is a schematic plan view of a fourth substrate of the liquid crystal display panel in the display device of Modified Example 4 of Embodiment 2.

As shown in FIG. 9, FIG. 34, and FIG. 35, the liquid crystal display panel 20 as the display panel includes the third substrate 210, the second liquid crystal layer 230, and the fourth substrate 250. The third substrate 210 includes the color filters 212C of a plurality of colors. The fourth substrate 250 includes the third electrodes 252 or the fourth electrodes 254 as the pixel electrodes 250P. The color filters 212C of a plurality of colors and the pixel electrodes 250P each have an elongated shape, and the lengthwise direction of each of the color filters 212C of a plurality of colors and the pixel electrodes 250P lies in the left-right direction of the liquid crystal display panel 20.

In the vertical pixel arrangement shown in Modified Example 3 of Embodiment 2, polarized light passing through the fourth polarizing plate 10P4 is likely to be diffracted due to the pitch of the conductive lines in the left-right direction in the fourth substrate 250, i.e., the pitch (e.g., about 50 µm) between the source lines 257 in FIG. 33, and the width (e.g., about 40 µm) in the left-right direction (widthwise direction) of the apertures 213S of the black matrix layer 213 in FIG. 32. The vertical pixel arrangement is therefore likely to involve a decline in capability of blocking light.

In contrast, when the horizontal pixel arrangement is adopted where the lengthwise direction of each of the color filters 212C of a plurality of colors and the pixel electrodes 250P lies in the left-right direction of the liquid crystal display panel 20 as in the present modified example, the pitch of the conductive lines in the fourth substrate 250 in the left-right direction and the width of the apertures 213S of the black matrix layer 213 in the left-right direction can be widened, so that light diffraction can be reduced as compared with the vertical pixel arrangement. As a result, the horizontal pixel arrangement can achieve better blocking of light than the vertical pixel arrangement, leading to better privacy protection.

For example, in a 12.3-inch/170-ppi display device, the pitch of the conductive lines in the left-right direction in the fourth substrate 250, i.e., the pitch between the gate lines 256 in FIG. 35, is widened to approximately 150 µm. Also, the width of the apertures 213S in the left-right direction (lengthwise direction) of the black matrix layer 213 in FIG. 34 is widened to not smaller than 100 µm and not greater than 120 µm. As a result, the horizontal pixel arrangement is less likely to cause light diffraction than the vertical pixel arrangement, and thus can achieve better blocking of light. As described above, the present modified example adopting the horizontal pixel arrangement can provide better privacy protection than Modified Example 3 of Embodiment 2 adopting the vertical pixel arrangement. In a display device with a resolution lower than the resolution described above (e.g., <100 ppi), the pixel shape is not necessarily a horizontally long rectangular shape and may be a square-like shape as long as its width WB in the left-right direction is not smaller than 80 µm and not greater than 140 µm.

In a 12.3-inch/170-ppi display device, for example, privacy protection (blocking of light) in the screen horizontal direction (azimuthal angle of 0° or 180°) at a polar angle of −30° is achieved about twice better in the horizontal pixel arrangement than in the vertical pixel arrangement. In other words, the luminance in the horizontal pixel arrangement in the screen horizontal direction (azimuthal angle of 0° or 180°) at a polar angle of −30° is substantially half the luminance in the vertical pixel arrangement.

The horizontal pixel arrangement corresponds to an arrangement obtained by rotating the liquid crystal display panel 20 in the vertical pixel arrangement shown in the modified example above by an azimuth of 90°. The liquid crystal display panel 20 alone is rotated without any change in the third absorption axis 10P3A of the third polarizing plate 10P3 and the fourth absorption axis 10P4A of the fourth polarizing plate 10P4.

In the present modified example, an increase in width of the frame region, where modules are arranged, on the upper and lower sides of the liquid crystal display panel 20 can be prevented or reduced. However, the number of gate lines 256 arranged in the left-right direction of the liquid crystal display panel increases, which may increase the width of the frame region, where modules are arranged, on at least one of the left side or the right side of the liquid crystal display panel 20.

In both of the structures of Modified Example 3 and the present Modified Example 4 of Embodiment 2, the liquid crystal display panel 20 is in the IPS mode or the FFS mode, so that the display device 1 has a sufficiently wide viewing angle range in the public mode.

The fourth substrate 250 includes the gate lines 256 and the source lines 257 arranged perpendicularly to each other and forming a grid pattern, and TFTs as switching elements at or near the respective intersections. Regions surrounded by the gate lines 256 and the source lines 257 define pixels 21P, and each pixel 21P includes as a third electrode 252 or a fourth electrode 254 a pixel electrode 250P connected to a corresponding TFT. The fourth substrate 250 is also referred to as a TFT substrate. In the present modified example, the gate lines 256 are arranged in the top-bottom direction and the source lines 257 are arranged in the left-right direction. The arrangement of the gate lines 256 and the source lines 257 is not limited thereto, and the gate lines 256 may be arranged in the left-right direction and the source lines 257 may be arranged in the top-bottom direction.

Each pixel electrode 250P has an elongated shape, and the lengthwise direction of each pixel electrode 250P lies in the left-right direction of the liquid crystal display panel 20. In other words, each pixel electrode 250P lies in the left-right direction of the liquid crystal display panel 20.

Each pixel 21P has an elongated shape, and the lengthwise direction of each pixel 21P lies in the left-right direction of the liquid crystal display panel 20. In other words, each pixel 21P lies in the left-right direction of the liquid crystal display panel 20.

The length of each pixel 21P in the lengthwise direction (left-right direction) is not shorter than 130 μm and not longer than 170 μm, preferably not shorter than 140 μm and not longer than 160 μm, and is 150 μm, for example. The length of each pixel 21P in the widthwise direction (top-bottom direction) is not shorter than 30 μm and not longer than 70 μm, preferably not shorter than 40 μm and not longer than 60 μm, and is 50 μm, for example.

Each pixel electrode 250P is provided with a slit 250PS in the lengthwise direction (left-right direction) of the pixel electrode 250P. The liquid crystal molecules 231 in the second liquid crystal layer 230 with no voltage applied are aligned along the slits 250PS.

The third substrate 210 includes the color filter layer 212 with the color filters 212C of a plurality of different colors, and the black matrix layer 213. The color filters 212C of a plurality of colors include, for example, the red color filters 212CR, the green color filters 212CG, and the blue color filters 212CB. Each pixel 21P includes a color filter 212C of one of these colors. The third substrate 210 is also referred to as a color filter substrate.

The red color filters 212CR, the green color filters 212CG, and the blue color filters 212CB each have an elongated shape, and the lengthwise direction of each of the filters lies in the left-right direction of the liquid crystal display panel 20. In other words, the red color filters 212CR, the green color filters 212CG, and the blue color filters 212CB each lie in the left-right direction of the liquid crystal display panel 20.

Preferably, the third substrate 210 includes the black matrix layer 213 provided with the apertures 213S corresponding to the respective color filters 212C of a plurality of colors. A width WB of each of the apertures 213S in the left-right direction of the liquid crystal display panel 20 is not smaller than 80 μm and not greater than 140 μm, and a width LB of each of the apertures 213S in the top-bottom direction of the liquid crystal display panel 20 is not greater than 80 μm. This configuration can effectively prevent or reduce light diffraction due to the black matrix layer 213. As a result, the configuration can achieve better blocking of light, leading to better privacy protection.

The width WB (also referred to as "WB1") of each aperture 213S corresponding to a blue color filter 212CB in the left-right direction of the liquid crystal display panel 20 is greater than the width WB (also referred to as "WB2") of each aperture 213S corresponding to a green color filter 212CG and the width WB (WB2) of each aperture 213S corresponding to a red color filter 212CR in the left-right direction of the liquid crystal display panel 20. The width WB (WB1) of each aperture 213S corresponding to a blue color filter 212CB in the left-right direction of the liquid crystal display panel 20 is 120 μm, for example. The width WB (WB2) of each aperture 213S corresponding to a green color filter 212CG and the width WB (WB2) of each aperture 213S corresponding to a red color filter 212CR in the left-right direction of the liquid crystal display panel 20 is 100 μm, for example.

The width LB of each aperture 213S corresponding to a blue color filter 212CB, the width LB of each aperture 213S corresponding to a green color filter 212CG, and the width LB of each aperture 213S corresponding to a red color filter 212CR in the top-bottom direction of the liquid crystal display panel 20 is 40 μm, for example.

Modified Example 5 of Embodiment 2

Figure 36:
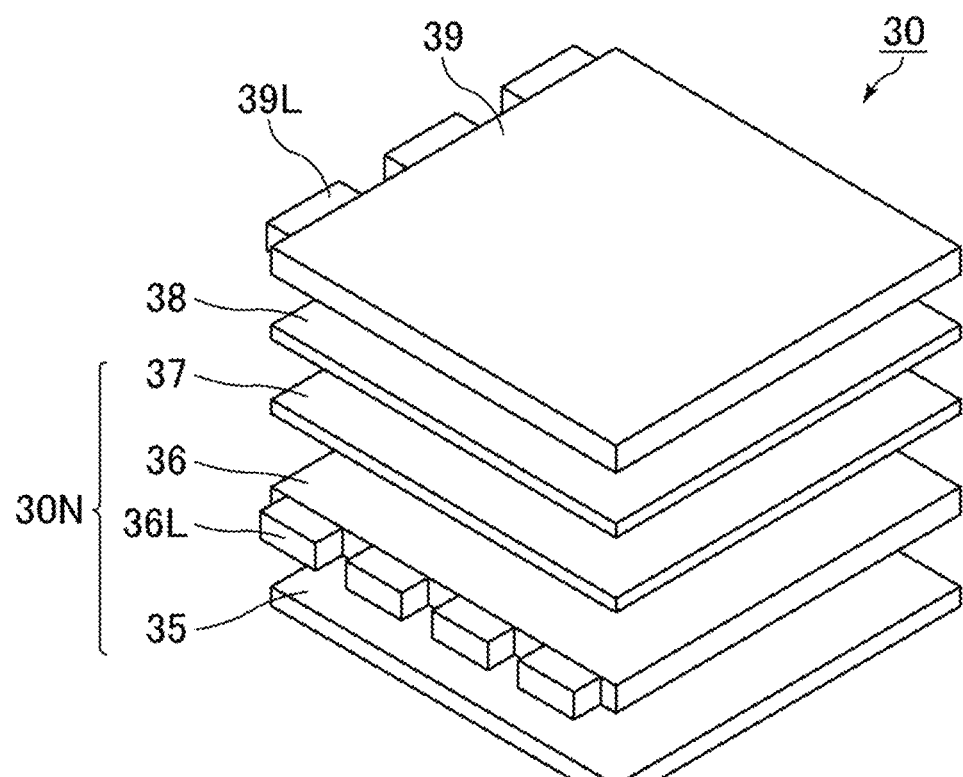
FIG. 36 is a schematic perspective view of a backlight in a display device of Modified Example 5 of Embodiment 2.

The backlight 30 may be any of the backlights mentioned in the present modified example. FIG. 36 is a schematic perspective view of a backlight in a display device of Modified Example 5 of Embodiment 2. As shown in FIG. 36, the backlight 30 of the present modified example includes, sequentially from the back surface side toward the viewing surface side, a reflector 35, a normal light guide plate 36 having LEDs 36L at its end (end surface), a prism sheet 37, a louver film 38, and a public-mode light guide plate 39 having LEDs 39L at its end (end surface). A backlight including the reflector 35, the normal light guide plate 36 having the LEDs 36L at its end (end surface), and the prism sheet 37 is also referred to as a normal backlight 30N. A backlight including LEDs at the ends of two layers as in the present modified example is also referred to as a two-layered backlight.

The reflector 35 is an optical film having a reflectance of not lower than 98% and is an ESR available from 3M, for example. The normal light guide plate 36 has the same configuration as a typical light guide plate and has a function of guiding light from the LEDs 36L into the plane of the normal light guide plate 36. The prism sheet 37 has the same configuration as a normal prism sheet and can be a BEF series (brightness enhancement film) available from 3M, for example. The louver film 38 has a function of reducing the luminance of oblique light in the left-right direction (horizontal direction), i.e., the direction of an azimuthal angle of 0° or 180°. The louver film 38 may bilaterally symmetrically block oblique light in the left-right direction. The public-mode light guide plate 39 has a function of diffusing light from the LEDs 39L on the structures engraved in the public-mode light guide plate 39, thereby emitting diffused light. The public-mode light guide plate 39 also includes fine particles that diffuse incident light in a wide viewing angle range, and an acrylic resin. The acrylic resin is particularly preferably polymethyl methacrylate (PMMA).

The combination of the normal backlight 30N and the louver film 38 provides a short optical path, so that the fine particles in the public-mode light guide plate 39 do not diffuse incident light. This results in a narrow viewing angle range.

Figure 37:
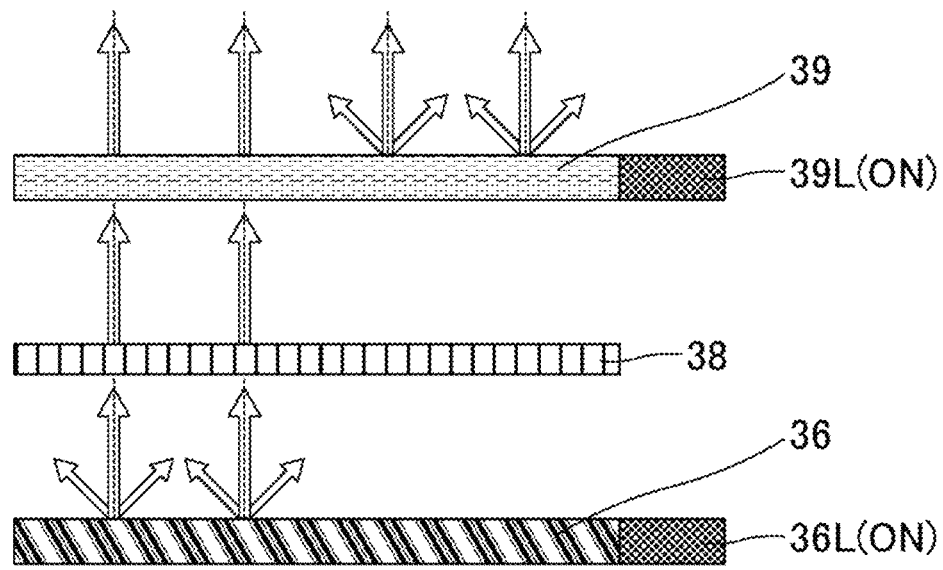
FIG. 37 is a schematic cross-sectional view showing a case where LEDs on a normal light guide plate and LEDs on a public-mode light guide plate are in the on state in the backlight in the display device of Modified Example 5 of Embodiment 2.
Figure 38:
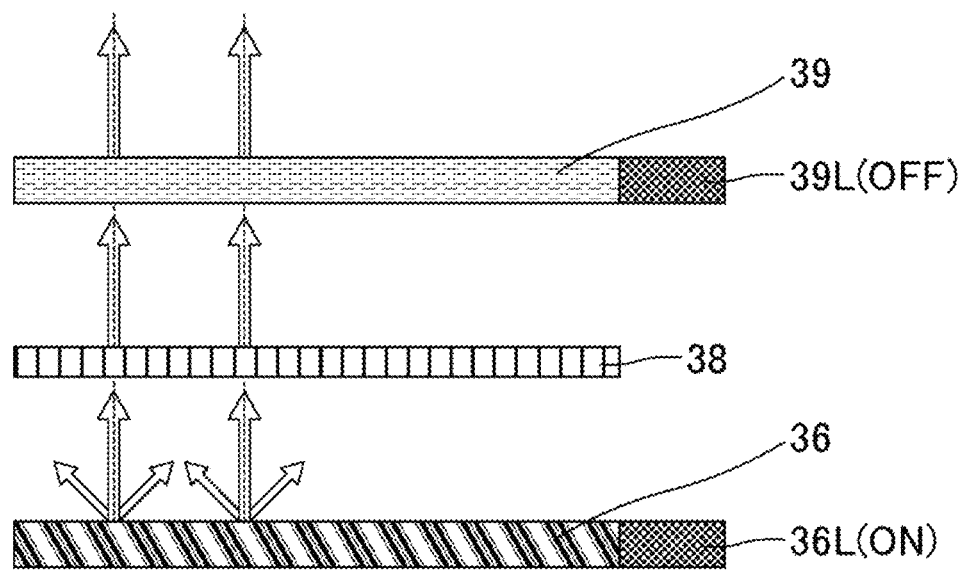
FIG. 38 is a schematic cross-sectional view showing a case where the LEDs on the normal light guide plate are in the on state and the LEDs on the public-mode light guide plate are in an off state in the backlight in the display device of Modified Example 5 of Embodiment 2.
Figure 39:
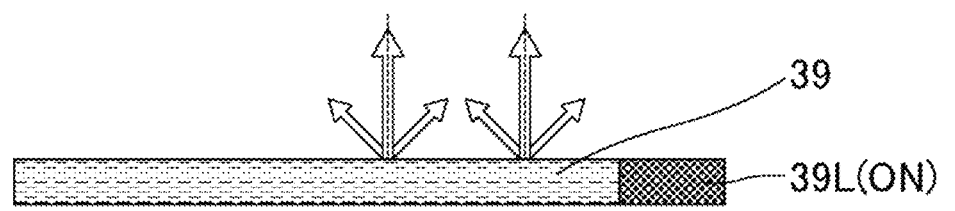
FIG. 39 is a schematic cross-sectional view showing a case where the LEDs on the normal light guide plate are in the off state and the LEDs on the public-mode light guide plate are in the on state in the backlight in the display device of Modified Example 5 of Embodiment 2.
Figure 39:
Figure 39:

FIG. 37 is a schematic cross-sectional view showing a case where the LEDs on the normal light guide plate and the LEDs on the public-mode light guide plate are in the on state in the backlight in the display device of Modified Example 5 of Embodiment 2. FIG. 38 is a schematic cross-sectional view showing a case where the LEDs on the normal light guide plate are in the on state and the LEDs on the public-mode light guide plate are in an off state in the backlight in the display device of Modified Example 5 of Embodiment 2. FIG. 39 is a schematic cross-sectional view showing a case where the LEDs on the normal light guide plate are in the off state and the LEDs on the public-mode light guide plate are in the on state in the backlight in the display device of Modified Example 5 of Embodiment 2.

As shown in FIG. 37, when both the LEDs 36L on the normal light guide plate 36 and the LEDs 39L on the public-mode light guide plate 39 are in the on state, i.e., both the LEDs 36L and the LEDs 39L are simultaneously turned on, the backlight 30 operates in the wide viewing angle mode.

As shown in FIG. 38, when the LEDs 36L on the normal light guide plate 36 are in the on state and the LEDs 39L on the public-mode light guide plate 39 are in the off state, i.e., the LEDs 36L are turned on while the LEDs 39L are turned off, the backlight 30 operates in the narrow viewing angle mode.

Although the front luminance decreases as compared with the narrow viewing angle mode shown in FIG. 38, when the LEDs 36L on the normal light guide plate 36 are in the off state and the LEDs 39L on the public-mode light guide plate 39 are in the on state as shown in FIG. 39, i.e., the LEDs 36L are turned off while the LEDs 39L are turned on, the backlight 30 operates in the narrow viewing angle mode.

Modified Example 6 of Embodiment 2

Figure 40:
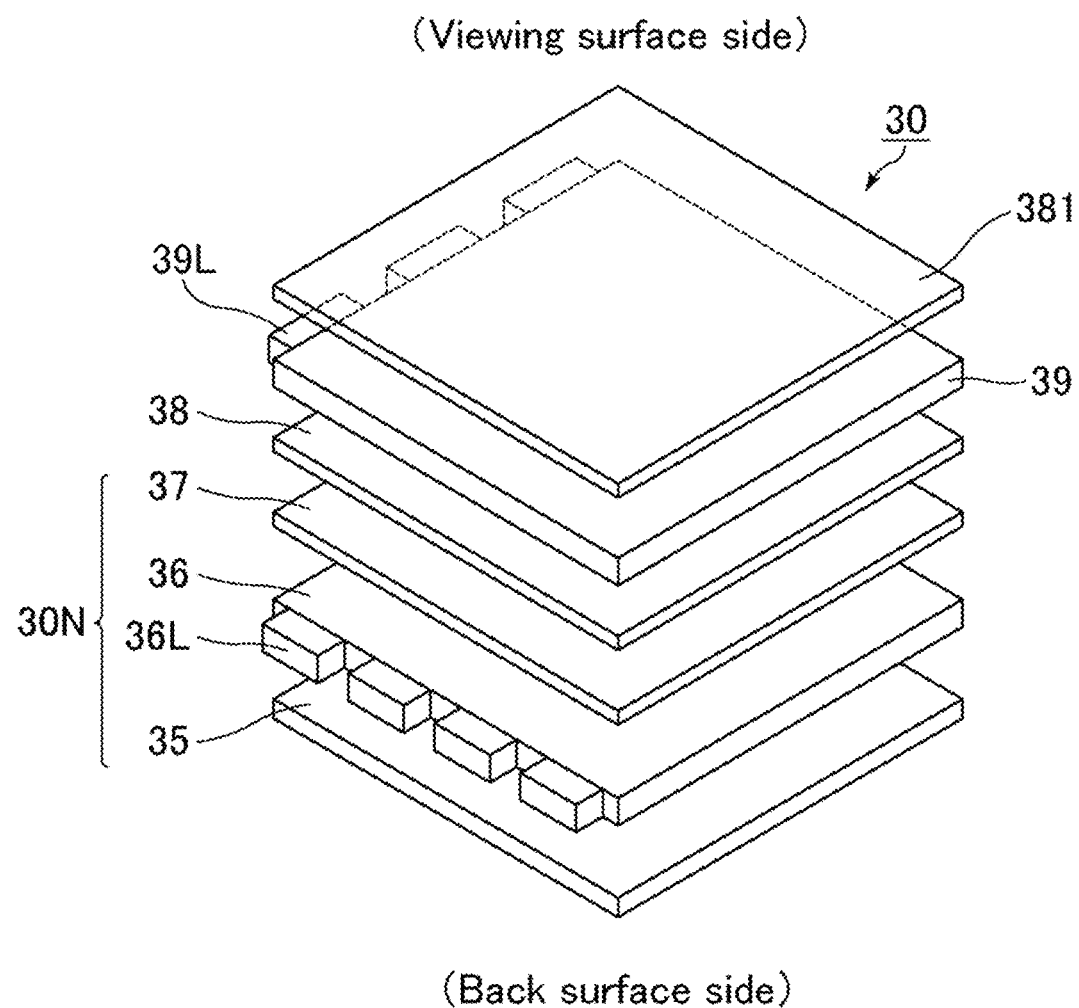
FIG. 40 is a schematic perspective view of a backlight in a display device of Modified Example 6 of Embodiment 2.

FIG. 40 is a schematic perspective view of a backlight in a display device of Modified Example 6 of Embodiment 2. As shown in FIG. 40, a louver film 381 which reduces the luminance of oblique light in the top-bottom direction (vertical direction), i.e., the direction of an azimuthal angle of 90° or 270°, may be provided on or over the public-mode light guide plate 39, in addition to the structure in Modified Example 5 of Embodiment 2. With the louver film 381 as in the present modified example, the display device 1, when mounted on a vehicle, can prevent glare on the windshield. The louver film 381 can be a common louver film.

EXAMPLES

Hereinafter, the effects of the present invention are described with reference to examples and comparative examples. The present invention is not limited to these examples.

Example 1

A viewing angle-controlling liquid crystal panel 10 of Example 1 having the same configuration as in Embodiment 1 was used to simulate the color difference between the wide viewing angle mode and the narrow viewing angle mode versus retardation of the first liquid crystal layer 130 and the light-shielding angle versus retardation of the first liquid crystal layer 130.

Figure 13A:
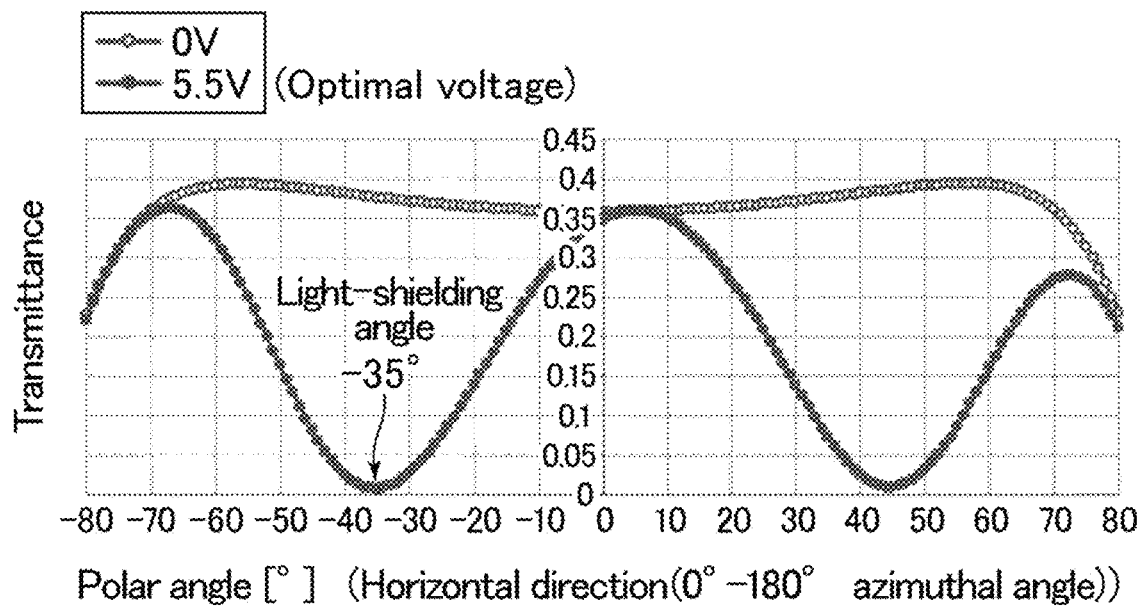
FIG. 13A is a view showing an example of the measurement results of a light-shielding angle.

The LCD Master 2D was used to determine the color difference by calculating the voltage dependence (wavelength range of 400 nm to 800 nm) of the transmittance (vertical axis) relative to the polar angle (horizontal axis) in the horizontal direction (azimuthal angle of 0° or 180°) of the viewing angle-controlling liquid crystal panel. In other words, the front chromaticity coordinates (x, y) at certain voltages (e.g., 0 V and 5.5 V (optimal voltage)) can be obtained from the calculation results. These front chromaticity coordinates (x, y) are converted to the front chromaticity coordinates (u', v'), specifically to the front chromaticity coordinates (u'_public, v'_public) in the wide viewing angle mode (0 V) and to the front chromaticity coordinates (u'_privacy, v'_privacy) in the narrow viewing angle mode (5.5 V). Then, as shown in the following equation, the color difference (u'v' color difference) was calculated as the difference between the front chromaticity coordinates (u'_public, v'_public) in the wide viewing angle mode (0 V) and the front chromaticity coordinates (u'_privacy, v'_privacy) in the narrow viewing angle mode (5.5 V). u'v' Color difference=$\sqrt{\{(u'\_public-u'\_privacy)^2+(v'\_public-v'\_privacy)^2\}}$ FIG. 13A is a view showing an example of the measurement results of a light-shielding angle. The LCD Master 2D was used to determine the light-shielding angle by calculating the voltage dependence (wavelength of 550 nm) of the transmittance (vertical axis) relative to the polar angle (horizontal axis) in the horizontal direction (azimuthal angle of 0° or 180°) of the viewing angle-controlling liquid crystal panel. FIG. 13A shows an example of the measurement results. FIG. 13A shows that the panel operated in the wide viewing angle mode when the applied voltage was 0 V, while operating in the narrow viewing angle mode when the applied voltage was 5.5 V (optimal voltage). As shown in FIG. 13A, in the narrow viewing angle mode with the optimal voltage applied, the light-shielding angle in question here is the negative polar angle at which the transmittance was lowest. FIG. 13A shows the measurement results of the light-shielding angle of the liquid crystal panel having the same configuration as in the later-described Example 4.

In Example 1, the azimuthal angle φP1 of the first absorption axis 10P1A of the first polarizing plate 10P1 was 90°, the azimuthal angle of the second absorption axis 10P2A of the second polarizing plate 10P2 was 90°, the azimuthal angle φ1 of the director 1311A of the liquid crystal molecules 1311 near the first substrate 110 with no voltage applied was 90°, and the azimuthal angle φ2 of the director 1312A of the liquid crystal molecules 1312 near the second substrate 150 with no voltage applied was 75°. In other words, the azimuthal angle φ1 of the director 1311A of the liquid crystal molecules 1311 near the first substrate 110 and the azimuthal angle φ2 of the director 1312A of the liquid crystal molecules 1312 near the second substrate 150 satisfied the relationship φ1>φ2, so that the liquid crystal molecules 131 was twist-aligned in the liquid crystal layer 130. In the examples and comparative examples herein, the azimuthal angles φ1 and φ2 of the directors of the liquid crystal molecules were determined based on the alignment treatment directions of the alignment films.

In Example 1, in a plan view, the first absorption axis 10P1A and the second absorption axis 10P2A formed an angle of 15° with the director 1312A of the liquid crystal molecules 1312 near the second substrate 150 with no voltage applied, the first absorption axis 10P1A and the second absorption axis 10P2A were parallel to the director 1311A of the liquid crystal molecules 1311 near the first substrate 110 with no voltage applied, the viewing angle-controlling liquid crystal panel 10 contained the liquid crystal molecules 131 having a positive anisotropy of dielectric constant, and the twist angle with no voltage applied was 15° (initial twist was 15°). The retardation Re of the first liquid crystal layer 130 with voltage applied was 831 nm.

Figure 13B:
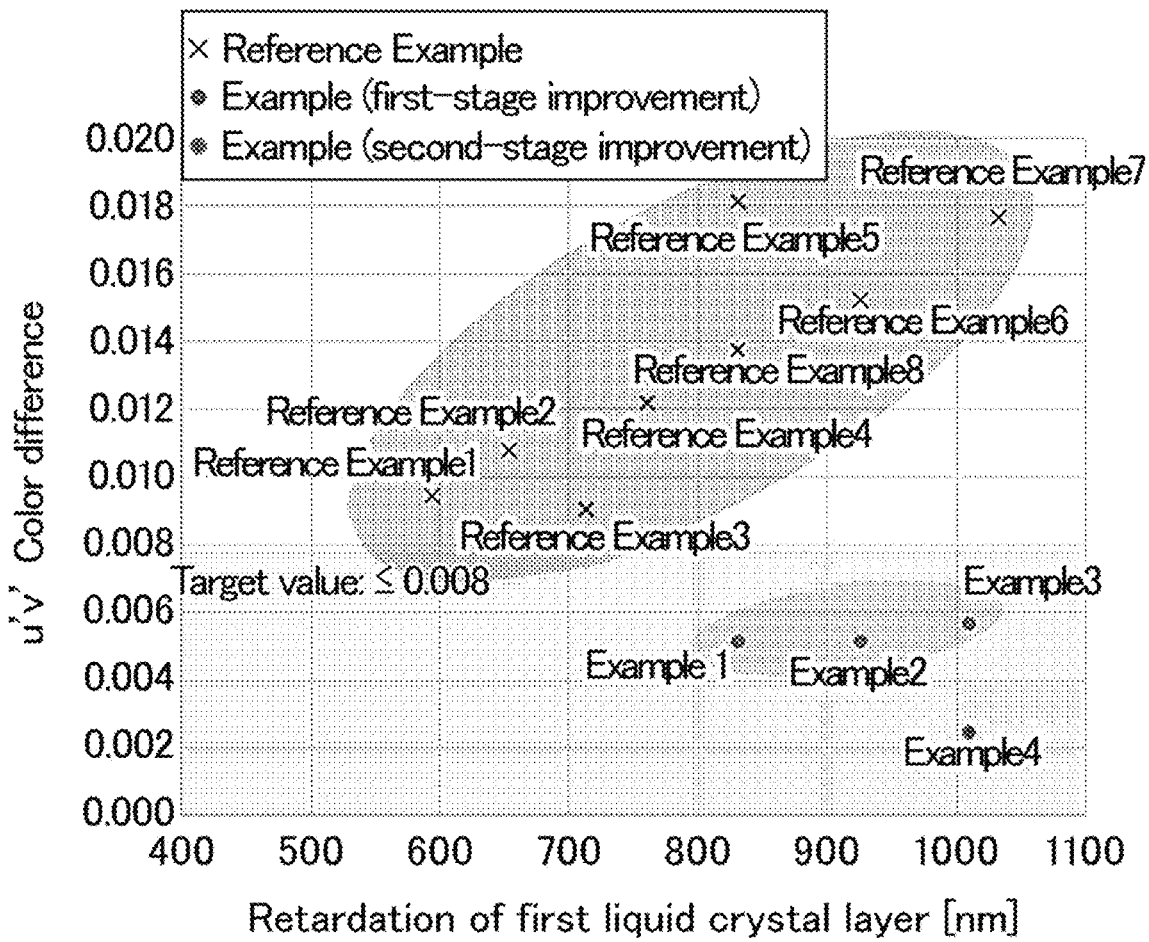
FIG. 13B is a graph of color difference between the wide viewing angle mode and the narrow viewing angle mode versus retardation of a first liquid crystal layer in viewing angle-controlling liquid crystal panels of Example 1 to Example 4 and Reference Example 1 to Reference Example 7.
Figure 14:
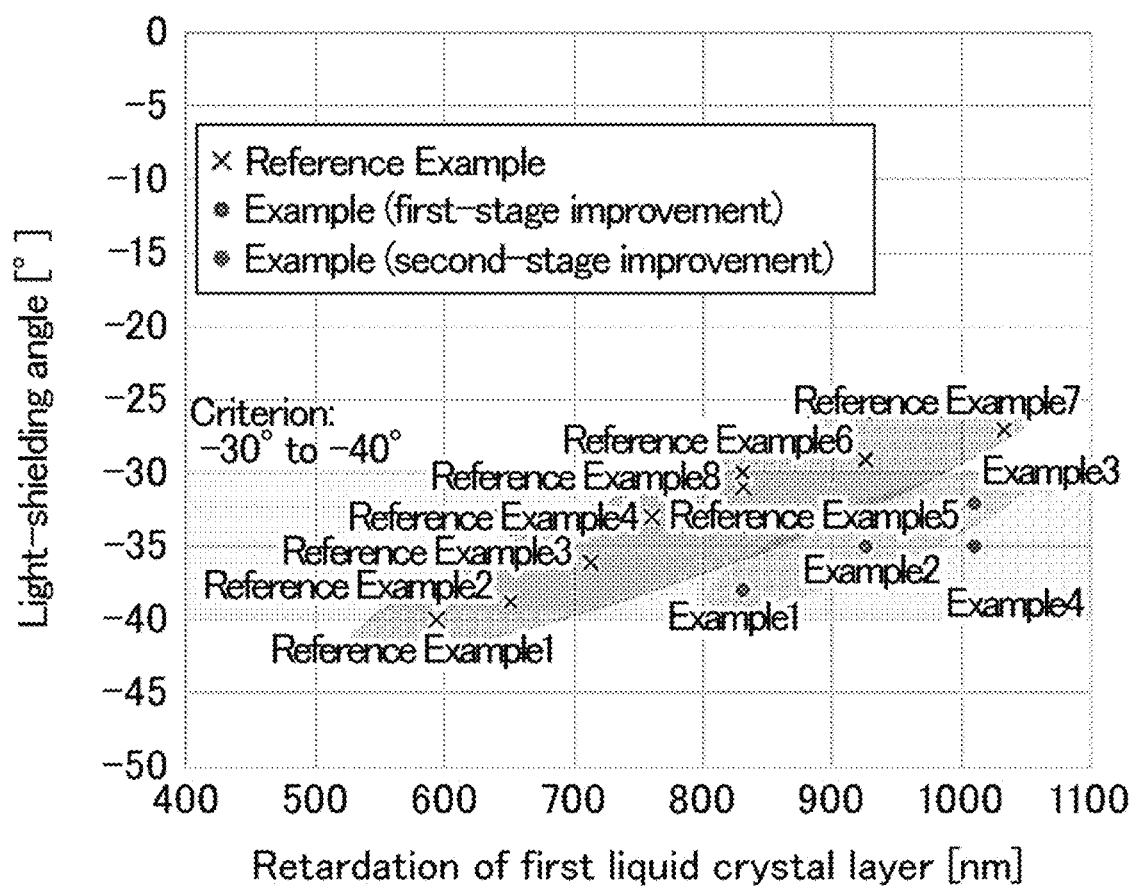
FIG. 14 is a graph of light-shielding angle versus retardation of the first liquid crystal layer in the viewing angle-controlling liquid crystal panels of Example 1 to Example 4 and Reference Example 1 to Reference Example 7.

The color difference between the wide viewing angle mode and the narrow viewing angle mode, and the light-shielding angle relative to the retardation of the first liquid crystal layer 130 are shown in the following Table 1 as well as FIG. 13B and FIG. 14. FIG. 13B is a graph of color difference between the wide viewing angle mode and the narrow viewing angle mode versus retardation of a first liquid crystal layer in viewing angle-controlling liquid crystal panels of Example 1 to Example 4 and Reference Example 1 to Reference Example 7. FIG. 14 is a graph of light-shielding angle versus retardation of the first liquid crystal layer in the viewing angle-controlling liquid crystal panels of Example 1 to Example 4 and Reference Example 1 to Reference Example 7. The privacy was considered favorably protected when the light-shielding angle was greater than −40°, i.e., when the absolute value of the light-shielding angle was smaller than 40°, and the color shift was considered favorable when the color difference was not more than 0.008. In the examples, the light-shielding angle in question was the negative polar angle at which the transmittance was lowest. Thus, the expression that the light-shielding angle was greater than −40° (the absolute value of the light-shielding angle was smaller than 40°) means that the light-shielding angle was greater than −40° and smaller than 0°.

TABLE 1

| | Cell design of first liquid crystal panel (viewing angle-controlling liquid crystal panel) | | | | | Characteristics | | | |
| --- | --- | --- | --- | --- | --- | --- | --- | --- | --- |
| | Azimuthal angle φP1 of first absorption axis [°] | Azimuthal angle φ1 of director of liquid crystal molecules near first substrate [°] | Azimuthal angle φ2 of director of liquid crystal molecules near second substrate [°] | Twist angle φ = \|φ1 − φ2\| [°] | \|φP1 − φ2\| [°] | Retardation Re of first liquid crystal layer [nm] | Light-shielding angle [°] | u'v' Color difference between wide viewing angle mode and narrow viewing angle mode | Determination | Reason |
| Reference Example 1 | 90 | 75 | 75 | 0 | 15 | 594 | −40 | 0.009480 | Poor | Large color shift, low level of privacy protection |
| Reference Example 2 | 90 | 75 | 75 | 0 | 15 | 653 | −38 | 0.010801 | Average | Large color shift, high level of privacy protection |
| Reference Example 3 | 90 | 75 | 75 | 0 | 15 | 713 | −36 | 0.009020 | Average | Large color shift, high level of privacy protection |
| Reference Example 4 | 90 | 75 | 75 | 0 | 15 | 760 | −33 | 0.012183 | Average | Large color shift, high level of privacy protection |
| Reference Example 5 | 90 | 75 | 75 | 0 | 15 | 831 | −31 | 0.018127 | Average | Large color shift, high level of privacy protection |
| Reference Example 6 | 90 | 75 | 75 | 0 | 15 | 926 | −29 | 0.015205 | Average | Large color shift, high level of privacy protection |
| Reference Example 7 | 90 | 75 | 75 | 0 | 15 | 1033 | −27 | 0.017658 | Average | Large color shift, high level of privacy protection |

TABLE 1-continued

| | | Cell design of first liquid crystal panel (viewing angle-controlling liquid crystal panel) | | | | | | Characteristics | | | |
|---|---|---|---|---|---|---|---|---|---|---|---|
| | | Azimuthal angle φP1 of first absorption axis [°] | Azimuthal angle φ1 of director of liquid crystal molecules near first substrate [°] | Azimuthal angle φ2 of director of liquid crystal molecules near second substrate [°] | Twist angle φ = \|φ1 − φ2\| [°] | \|φP1 − φ2\| [°] | Retardation Re of first liquid crystal layer [nm] | Light-shielding angle [°] | u'v' Color difference between wide viewing angle mode and narrow viewing angle mode | Determination | Reason |
| | Reference Example 8 | 90 | 90 | 60 | 30 | 30 | 831 | −30 | 0.013745 | Average | Large color shift |
| First-stage improvement | Example 1 | 90 | 90 | 75 | 15 | 15 | 831 | −38 | 0.005123 | Good | Small color shift, high level of privacy protection |
| | Example 2 | 90 | 90 | 75 | 15 | 15 | 926 | −35 | 0.005123 | Good | Small color shift, high level of privacy protection |
| | Example 3 | 90 | 90 | 75 | 15 | 15 | 1010 | −32 | 0.005671 | Good | Small color shift, high level of privacy protection |
| Second-stage improvement | Example 4 | 90 | 90 | 80 | 10 | 10 | 1010 | −35 | 0.002439 | Excellent | Very small color shift, high level of privacy protection |

As shown in Table 1 as well as FIG. 13B and FIG. 14, the viewing angle-controlling liquid crystal panel 10 of Example 1 operated in the wide viewing angle mode in a state with no voltage applied, and operated in the narrow viewing angle mode (narrow in the direction of negative polar angle) in which the viewing angle range was asymmetric about the central axis (polar angle of 0°, i.e., front direction) in the horizontal direction (azimuthal angle of 0° or 180°) in a state with voltage applied. In particular, in the narrow viewing angle mode, the retardation Re of the first liquid crystal layer 130 was 831 nm, and the light-shielding angle at −38° (>−40°) was achieved while the color shift amount (u'v' color difference) in a front view in switching between the wide viewing angle mode and the narrow viewing angle mode was as small as 0.005123. As described above, in Example 1, a reduced color shift was successfully achieved in switching between the wide viewing angle mode and the narrow viewing angle mode while the privacy was protected at a high level. This revealed that as long as the retardation Re of the first liquid crystal layer 130 with voltage applied can be designed to 831 nm, the viewable (polar) angle range can be narrowed and the front color variation can be reduced in the narrow viewing angle mode while sufficient production efficiency and sufficient reliability are achieved.

Example 2

A viewing angle-controlling liquid crystal panel 10 of Example 2 having the same configuration as in Example 1, except that the retardation Re of the first liquid crystal layer 130 with voltage applied was 926 nm, was used to simulate the color difference between the wide viewing angle mode and the narrow viewing angle mode relative to the retardation of the first liquid crystal layer 130 and the light-shielding angle relative to the retardation of the first liquid crystal layer 130 as in Example 1. The results are shown in Table 1 as well as FIG. 13B and FIG. 14. The viewing angle-controlling liquid crystal panel 10 of Example 2 was an ECB mode liquid crystal panel which contained the liquid crystal molecules 131 having a positive anisotropy of dielectric constant and in which the twist angle with no voltage applied was 15° (initial twist angle was 15°).

As shown in Table 1 as well as FIG. 13B and FIG. 14, the viewing angle-controlling liquid crystal panel 10 of Example 2 operated in the wide viewing angle mode in a state with no voltage applied, and operated in the narrow viewing angle mode (narrow in the direction of negative polar angle) in which the viewing angle range was asymmetric about the central axis (polar angle of 0°, i.e., front direction) in the horizontal direction (azimuthal angle of 0° or 180°) in a state with voltage applied. In particular, in the narrow viewing angle mode, the retardation Re of the first liquid crystal layer 130 was 926 nm, and the light-shielding angle at −35° (>−40°) was achieved while the color shift amount (u'v' color difference) in a front view in switching between the wide viewing angle mode and the narrow viewing angle mode was as small as 0.005123. As described above, in Example 2, a reduced color shift was successfully achieved in switching between the wide viewing angle mode and the narrow viewing angle mode while a smaller light-shielding polar angle than in Example 1 was achieved, i.e., the privacy was protected at a higher level than in Example 1. This revealed that as long as the retardation Re of the first liquid crystal layer 130 with voltage applied can be designed to 926 nm, the viewable (polar) angle range can be narrowed and the front color variation can be reduced in the narrow viewing angle mode while sufficient production efficiency and sufficient reliability are achieved.

Example 3

A viewing angle-controlling liquid crystal panel 10 of Example 3 having the same configuration as in Example 1, except that the retardation Re of the first liquid crystal layer 130 with voltage applied was 1010 nm, was used to simulate the color difference between the wide viewing angle mode and the narrow viewing angle mode relative to the retardation of the first liquid crystal layer 130 and the light-shielding angle relative to the retardation of the first liquid crystal layer 130 as in Example 1. The results are shown in Table 1 as well as FIG. 13B and FIG. 14. The viewing angle-controlling liquid crystal panel 10 of Example 3 was an ECB mode liquid crystal panel which contained the liquid crystal molecules 131 having a positive anisotropy of dielectric constant and in which the twist angle with no voltage applied was 15° (initial twist angle was 15°).

As shown in Table 1 as well as FIG. 13B and FIG. 14, the viewing angle-controlling liquid crystal panel 10 of Example 3 operated in the wide viewing angle mode in a state with no voltage applied, and operated in the narrow viewing angle mode (narrow in the direction of negative polar angle) in which the viewing angle range was asymmetric about the central axis (polar angle of 0°, i.e., front direction) in the horizontal direction (azimuthal angle of 0° or 180°) in a state with voltage applied. In particular, in the narrow viewing angle mode, the retardation Re of the first liquid crystal layer 130 was 1010 nm, and the light-shielding angle at −32° (>−40°) was achieved while the color shift amount (u'v' color difference) in a front view in switching between the wide viewing angle mode and the narrow viewing angle mode was as small as 0.005671. As described above, in Example 3, a reduced color shift was successfully achieved in switching between the wide viewing angle mode and the narrow viewing angle mode while a smaller light-shielding polar angle than in Examples 1 and 2 was achieved, i.e., the privacy was protected at a higher level than in Examples 1 and 2. This revealed that as long as the retardation Re of the first liquid crystal layer 130 with voltage applied can be designed to 1010 nm, the viewable (polar) angle range can be narrowed and the front color variation can be reduced in the narrow viewing angle mode while sufficient production efficiency and sufficient reliability are achieved.

Example 4

A viewing angle-controlling liquid crystal panel 10 of Example 4 having the same configuration as in Example 1, except that the retardation Re of the first liquid crystal layer 130 with voltage applied was 1010 nm and the azimuthal angle φ2 of the director 1312A of the liquid crystal molecules 1312 near the second substrate 150 was 80°, was used to simulate the color difference between the wide viewing angle mode and the narrow viewing angle mode relative to the retardation of the first liquid crystal layer 130 and the light-shielding angle relative to the retardation of the first liquid crystal layer 130, as in Example 1. The results are shown in Table 1 as well as FIG. 13B and FIG. 14. The viewing angle-controlling liquid crystal panel 10 of Example 4 was an ECB mode liquid crystal panel which contained the liquid crystal molecules 131 having a positive anisotropy of dielectric constant and in which the twist angle with no voltage applied was 10° (initial twist angle was 10°).

As shown in Table 1 as well as FIG. 13B and FIG. 14, the viewing angle-controlling liquid crystal panel 10 of Example 4 operated in the wide viewing angle mode in a state with no voltage applied, and operated in the narrow viewing angle mode (narrow in the direction of negative polar angle) in which the viewing angle range was asymmetric about the central axis (polar angle of 0°, i.e., front direction) in the horizontal direction (azimuthal angle of 0° or 180°) in a state with voltage applied. In particular, in the narrow viewing angle mode, the retardation Re of the first liquid crystal layer 130 was 1010 nm, and the light-shielding angle at −35° (>−40°) was achieved while the color shift amount (u'v' color difference) in a front view in switching between the wide viewing angle mode and the narrow viewing angle mode was as small as 0.002439. As described above, in Example 4, a reduced color shift was successfully achieved in switching between the wide viewing angle mode and the narrow viewing angle mode while a light-shielding polar angle smaller than that in Example 1 and as small as that in Example 2 was achieved, i.e., the privacy was protected at a higher level than in Examples 1 and 2. This revealed that as long as the retardation Re of the first liquid crystal layer 130 with voltage applied can be designed to 1010 nm, the viewable (polar) angle range can be narrowed and the front color variation can be reduced in the narrow viewing angle mode while sufficient production efficiency and sufficient reliability are achieved.

Reference Example 1

A viewing angle-controlling liquid crystal panel of Reference Example 1 having the same configuration as in Example 1, except that the retardation Re of the first liquid crystal layer with voltage applied was 594 nm and the azimuthal angle φ1 of the director of the liquid crystal molecules near the first substrate and the azimuthal angle φ2 of the director of the liquid crystal molecules near the second substrate were 75°, was used to simulate the color difference between the wide viewing angle mode and the narrow viewing angle mode relative to the retardation of the first liquid crystal layer and the light-shielding angle relative to the retardation of the first liquid crystal layer as in Example 1. The results are shown in Table 1 as well as FIG. 13B and FIG. 14. The viewing angle-controlling liquid crystal panel of Reference Example 1 was an ECB mode liquid crystal panel which contained the liquid crystal molecules 131 having a positive anisotropy of dielectric constant and exhibited no twist with no voltage applied.

The viewing angle-controlling liquid crystal panel of Reference Example 1 exhibited a front color shift amount (color difference) in switching between the modes of not less than 0.009, failing to satisfy the reference value (not more than 0.008).

Reference Example 2

A viewing angle-controlling liquid crystal panel of Reference Example 2 having the same configuration as in Example 1, except that the retardation Re of the first liquid crystal layer with voltage applied was 653 nm and the azimuthal angle φ1 of the director of the liquid crystal molecules near the first substrate and the azimuthal angle φ2 of the director of the liquid crystal molecules near the second substrate were 75°, was used to simulate the color difference between the wide viewing angle mode and the narrow viewing angle mode relative to the retardation of the first liquid crystal layer and the light-shielding angle relative to the retardation of the first liquid crystal layer as in Example 1. The results are shown in Table 1 as well as FIG. 13B and FIG. 14. The viewing angle-controlling liquid crystal panel of Reference Example 2 was an ECB mode liquid crystal panel which contained the liquid crystal molecules 131 having a positive anisotropy of dielectric constant and exhibited no twist with no voltage applied. The viewing angle-controlling liquid crystal panel of Reference Example 2 exhibited a front color shift amount (color difference) in switching between the modes of not less than 0.009, failing to satisfy the reference value (not more than 0.008).

Reference Example 3

A viewing angle-controlling liquid crystal panel of Reference Example 3 having the same configuration as in Example 1, except that the retardation Re of the first liquid crystal layer with voltage applied was 713 nm and the azimuthal angle φ1 of the director of the liquid crystal molecules near the first substrate and the azimuthal angle φ2 of the director of the liquid crystal molecules near the second substrate were 75°, was used to simulate the color difference between the wide viewing angle mode and the narrow viewing angle mode relative to the retardation of the first liquid crystal layer and the light-shielding angle relative to the retardation of the first liquid crystal layer as in Example 1. The results are shown in Table 1 as well as FIG. 13B and FIG. 14. The viewing angle-controlling liquid crystal panel of Reference Example 3 was an ECB mode liquid crystal panel which contained the liquid crystal molecules 131 having a positive anisotropy of dielectric constant and exhibited no twist with no voltage applied. The viewing angle-controlling liquid crystal panel of Reference Example 3 exhibited a front color shift amount (color difference) in switching between the modes of not less than 0.009, failing to satisfy the reference value (not more than 0.008).

Reference Example 4

A viewing angle-controlling liquid crystal panel of Reference Example 4 having the same configuration as in Example 1, except that the retardation Re of the first liquid crystal layer with voltage applied was 760 nm and the azimuthal angle φ1 of the director of the liquid crystal molecules near the first substrate and the azimuthal angle φ2 of the director of the liquid crystal molecules near the second substrate were 75°, was used to simulate the color difference between the wide viewing angle mode and the narrow viewing angle mode relative to the retardation of the first liquid crystal layer and the light-shielding angle relative to the retardation of the first liquid crystal layer as in Example 1. The results are shown in Table 1 as well as FIG. 13B and FIG. 14. The viewing angle-controlling liquid crystal panel of Reference Example 4 was an ECB mode liquid crystal panel which exhibited no twist. The viewing angle-controlling liquid crystal panel of Reference Example 4 exhibited a front color shift amount (color difference) in switching between the modes of not less than 0.009, failing to satisfy the reference value (not more than 0.008).

Reference Example 5

A viewing angle-controlling liquid crystal panel of Reference Example 5 having the same configuration as in Example 1, except that the retardation Re of the first liquid crystal layer with voltage applied was 831 nm and the azimuthal angle φ1 of the director of the liquid crystal molecules near the first substrate and the azimuthal angle φ2 of the director of the liquid crystal molecules near the second substrate were 75°, was used to simulate the color difference between the wide viewing angle mode and the narrow viewing angle mode relative to the retardation of the first liquid crystal layer and the light-shielding angle relative to the retardation of the first liquid crystal layer as in Example 1. The results are shown in Table 1 as well as FIG. 13B and FIG. 14. The viewing angle-controlling liquid crystal panel of Reference Example 5 was an ECB mode liquid crystal panel which contained the liquid crystal molecules 131 having a positive anisotropy of dielectric constant and exhibited no twist with no voltage applied. The viewing angle-controlling liquid crystal panel of Reference Example 5 exhibited a front color shift amount (color difference) in switching between the modes of not less than 0.009, failing to satisfy the reference value (not more than 0.008).

Reference Example 6

A viewing angle-controlling liquid crystal panel of Reference Example 6 having the same configuration as in Example 1, except that the retardation Re of the first liquid crystal layer with voltage applied was 926 nm and the azimuthal angle φ1 of the director of the liquid crystal molecules near the first substrate and the azimuthal angle φ2 of the director of the liquid crystal molecules near the second substrate were 75°, was used to simulate the color difference between the wide viewing angle mode and the narrow viewing angle mode relative to the retardation of the first liquid crystal layer and the light-shielding angle relative to the retardation of the first liquid crystal layer as in Example 1. The results are shown in Table 1 as well as FIG. 13B and FIG. 14. The viewing angle-controlling liquid crystal panel of Reference Example 6 was an ECB mode liquid crystal panel which exhibited no twist. The viewing angle-controlling liquid crystal panel of Reference Example 6 exhibited a front color shift amount (color difference) in switching between the modes of not less than 0.009, failing to satisfy the reference value (not more than 0.008).

Reference Example 7

A viewing angle-controlling liquid crystal panel of Reference Example 7 having the same configuration as in Example 1, except that the retardation Re of the first liquid crystal layer with voltage applied was 1033 nm and the azimuthal angle φ1 of the director of the liquid crystal molecules near the first substrate and the azimuthal angle φ2 of the director of the liquid crystal molecules near the second substrate were 75°, was used to simulate the color difference between the wide viewing angle mode and the narrow viewing angle mode relative to the retardation of the first liquid crystal layer and the light-shielding angle relative to the retardation of the first liquid crystal layer as in Example 1. The results are shown in Table 1 as well as FIG. 13B and FIG. 14. The viewing angle-controlling liquid crystal panel of Reference Example 7 was an ECB mode liquid crystal panel which contained the liquid crystal molecules 131 having a positive anisotropy of dielectric constant and exhibited no twist with no voltage applied. The viewing angle-controlling liquid crystal panel of Reference Example 7 exhibited a front color shift amount (color difference) in switching between the modes of not less than 0.009, failing to satisfy the reference value (not more than 0.008).

Reference Example 8

A viewing angle-controlling liquid crystal panel of Reference Example 8 having the same configuration as in Example 1, except that the azimuthal angle φ1 of the director of the liquid crystal molecules near the first substrate was 90° and the azimuthal angle φ2 of the director of the liquid crystal molecules near the second substrate were 60°, was used to simulate the color difference between the wide viewing angle mode and the narrow viewing angle mode relative to the retardation of the first liquid crystal layer and the light-shielding angle relative to the retardation of the first liquid crystal layer as in Example 1. The results are shown in Table 1 as well as FIG. 13B and FIG. 14. The viewing angle-controlling liquid crystal panel of Reference Example 8 was an ECB mode liquid crystal panel which contained the liquid crystal molecules 131 having a positive anisotropy of dielectric constant and in which the twist angle with no voltage applied was 30° (initial twist angle was 30°). The viewing angle-controlling liquid crystal panel of Reference Example 8 exhibited a front color shift amount (color difference) in switching between the modes of not less than 0.009, failing to satisfy the reference value (not more than 0.008).

Example 5

Figure 15:
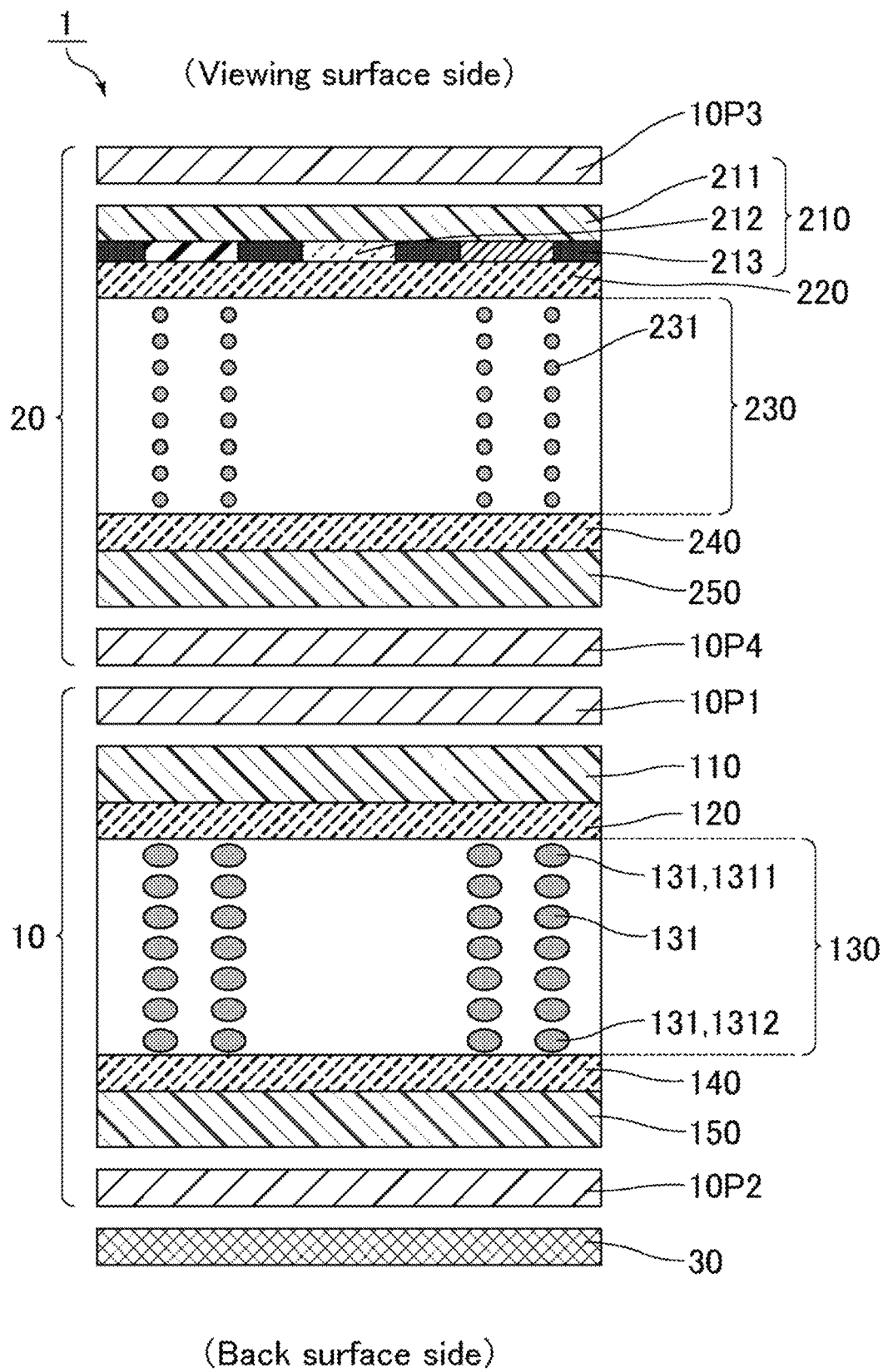
FIG. 15 is a schematic cross-sectional view of a display device of Example 5.
Figure 16:
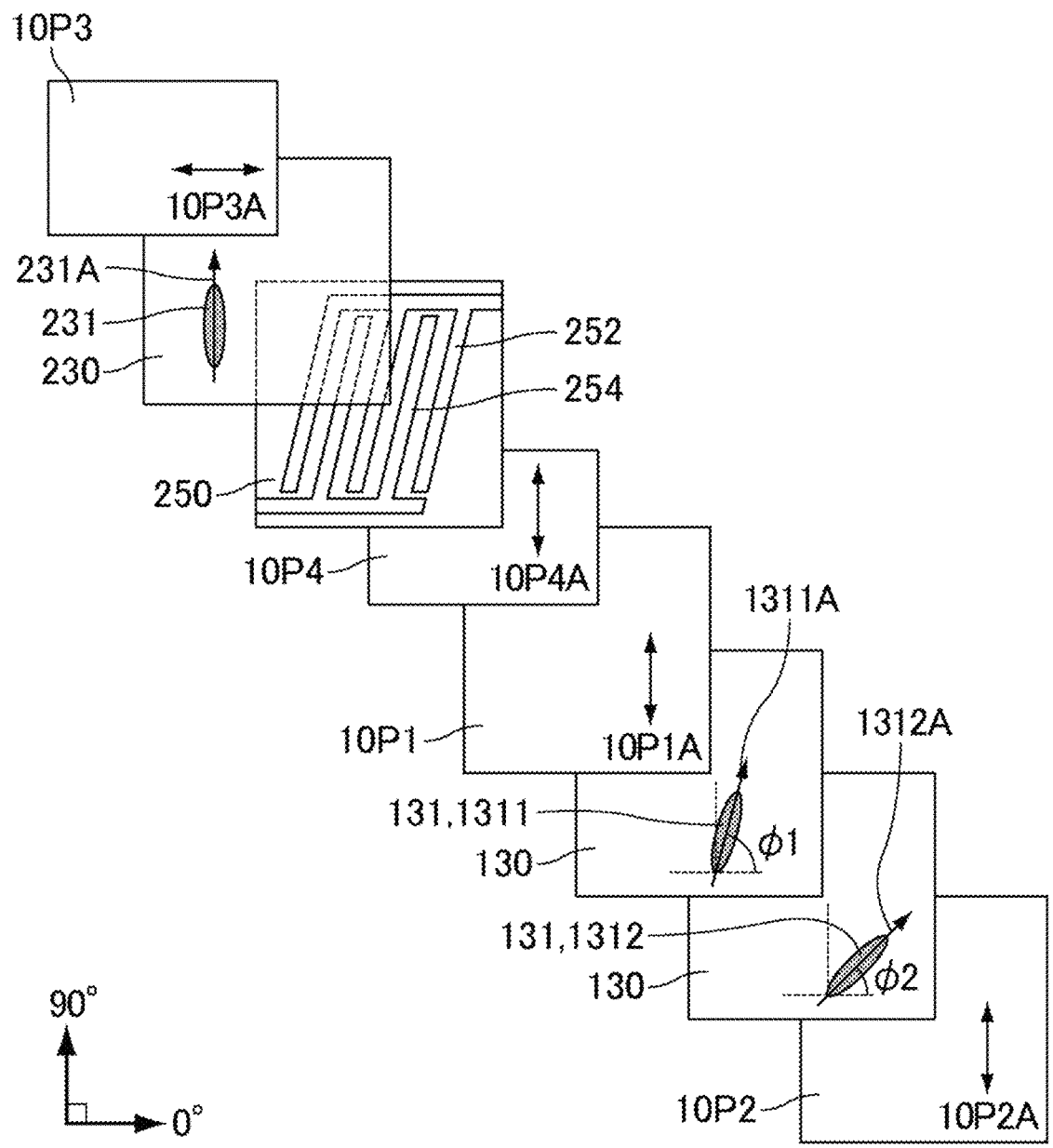
FIG. 16 is a schematic front view of the display device of Example 5.

FIG. 15 is a schematic cross-sectional view of a display device of Example 5. FIG. 16 is a schematic front view of the display device of Example 5. A display device 1 of Example 5 having the same configuration as in Embodiment 2 was used to simulate the viewing angles. The LCD Master 2D was used to simulate the viewing angles of the display device. Specifically, the voltage dependence of the transmittance (vertical axis) relative to the polar angle (horizontal axis) at each azimuthal angle (with 5° increments) in the viewing angle-controlling liquid crystal panel, so that the viewing angle characteristics of the viewing angle-controlling liquid crystal panel in terms of the luminance at 0 V (wide viewing angle mode) and the luminance at 5.5 V (narrow viewing angle mode) were simulated. In addition, the viewing angle characteristics of the display panel were also simulated in the same manner as in the viewing angle-controlling liquid crystal panel. The viewing angle characteristics of the viewing angle-controlling liquid crystal panel and the display panel were accumulated to determine the viewing angle characteristics of the display device.

Specifically, as shown in FIG. 15 and FIG. 16, the display device 1 of Example 5 included, sequentially from the back surface side toward the viewing surface side, the backlight 30, the viewing angle-controlling liquid crystal panel 10 of Example 3, and the liquid crystal display panel 20 as a display panel.

In the viewing angle-controlling liquid crystal panel 10 with no voltage applied, the azimuthal angle φ1 of the director 1311A of the liquid crystal molecules 1311 near the first substrate 110 was 90°, and the azimuthal angle φ2 of the director 1312A of the liquid crystal molecules 1312 near the second substrate 150 was 75°. The azimuthal angles of the first absorption axis 10P1A of the first polarizing plate 10P1 and the second absorption axis 10P2A of the second polarizing plate 10P2 were 90°.

In the liquid crystal display panel 20, the third polarizing plate 10P3 and the fourth polarizing plate 10P4 were absorptive linearly polarizing plates, the third absorption axis 10P3A was set at an azimuthal angle of 0°, and the fourth absorption axis 10P4A was set at an azimuthal angle of 90°. The third alignment film 220 and the fourth alignment film 240 were horizontal alignment films which have undergone the rubbing treatment and thus can align the liquid crystal molecules 231 in the horizontal direction. The second liquid crystal layer 230 contained the positive liquid crystal molecules 231. The fourth substrate 250 had an IPS electrode structure in which each of the third electrodes 252 and the fourth electrodes 254 was a comb-teeth electrode. The liquid crystal display panel 20 was an IPS mode liquid crystal panel which exhibited homogeneous alignment with no voltage applied. The director 231A of the liquid crystal molecules 231 in the second liquid crystal layer 230 with no voltage applied was set at an axis azimuth of 90°.

The backlight 30 included one light guide plate having a high degree of directivity. In other words, the backlight 30 was one that does not switch between the public mode and the privacy mode.

Figure 17:
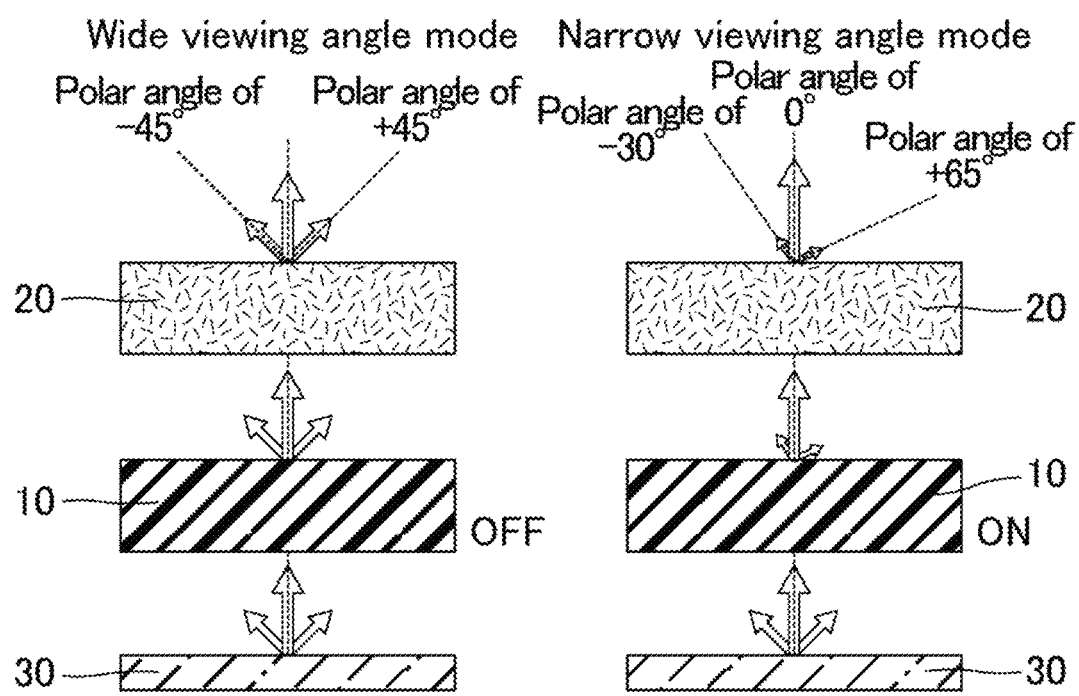
FIG. 17 is a schematic cross-sectional view showing the viewing angles in the narrow viewing angle mode and the wide viewing angle mode of the display device of Example 5.

FIG. 17 is a schematic cross-sectional view showing the viewing angles in the narrow viewing angle mode and the wide viewing angle mode of a display device 1 of Example 4. With no voltage applied to the viewing angle-controlling liquid crystal panel 10, as shown in the left part of FIG. 17, the transmittance of light (polarized light) from the backlight 30 having passed through the viewing angle-controlling liquid crystal panel 10 was high in both the front direction and the oblique direction (polar angle of 45°), which led to bright display in both the front direction and the oblique direction. Since the liquid crystal display panel 20 is driven in the transverse electric field mode, light having passed through the viewing angle-controlling liquid crystal panel 10 passed through the liquid crystal display panel 20 not only in the front direction but also in the oblique direction. This resulted in transmission of light to the viewing surface side in a wide polar angle range, so that the display device successfully achieved the wide viewing angle mode.

With voltage applied to the viewing angle-controlling liquid crystal panel 10, as shown in the right part of FIG. 17, the transmittance of light (polarized light) from the backlight 30 having passed through the viewing angle-controlling liquid crystal panel 10 was maximum in the front direction (polar angle of 0°), while being minimum at a polar angle of −30°. This light has similar angle profiles after passing through the liquid crystal display panel 20. The display device thus successfully achieved a small light-shielding angle in the narrow viewing angle mode, especially on the left side.

The configuration of Example 5, lacking the viewing angle-controlling liquid crystal panel on its outermost surface, is advantageous in that it can be adopted together with the in-cell touch panel technique. The display device 1 shown in Example 5 is applicable to display devices for vehicles, PCs, or smartphones, for example.

Example 6

Figure 18:
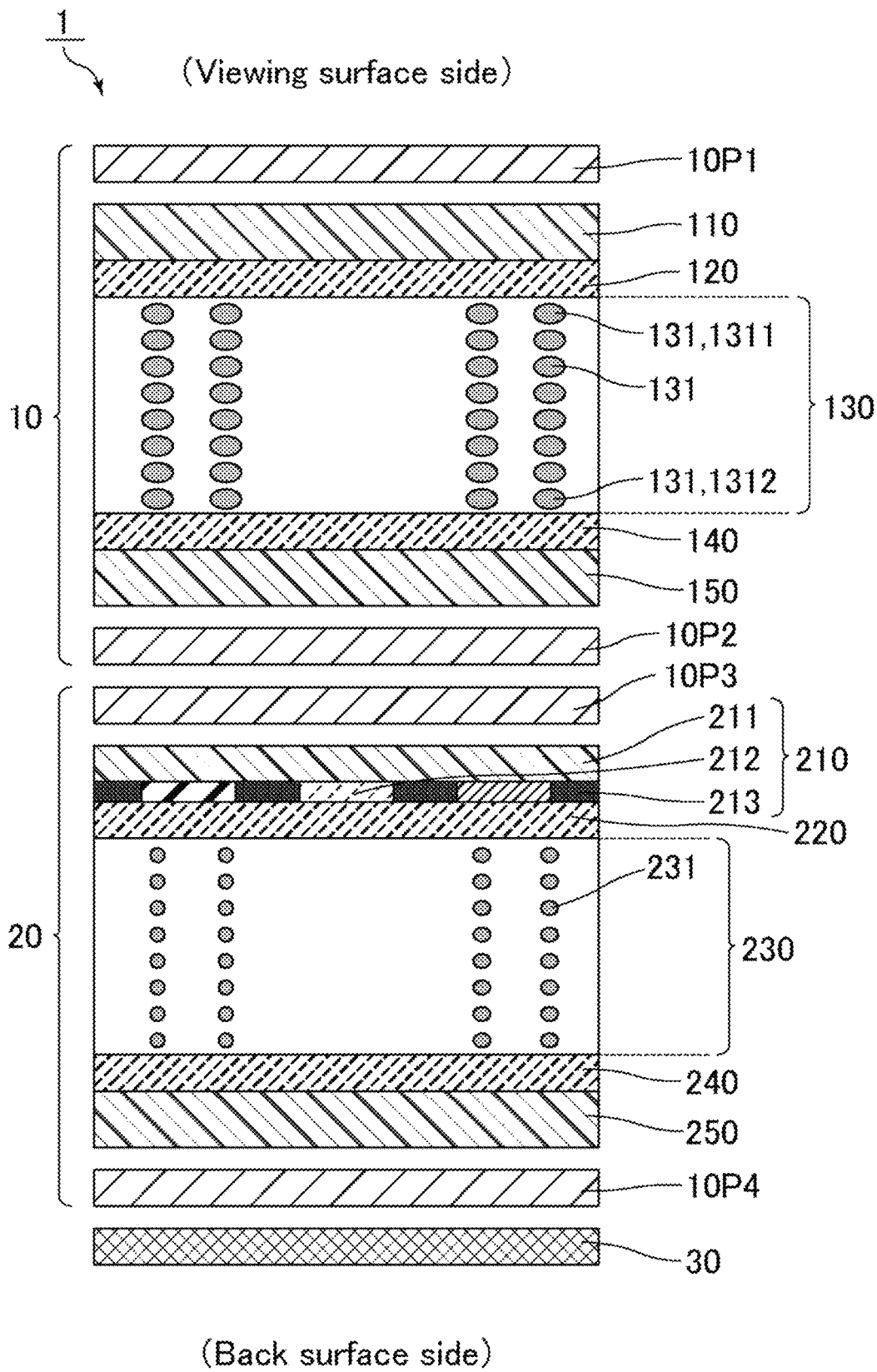
FIG. 18 is a schematic cross-sectional view of a display device of Example 6.
Figure 19:
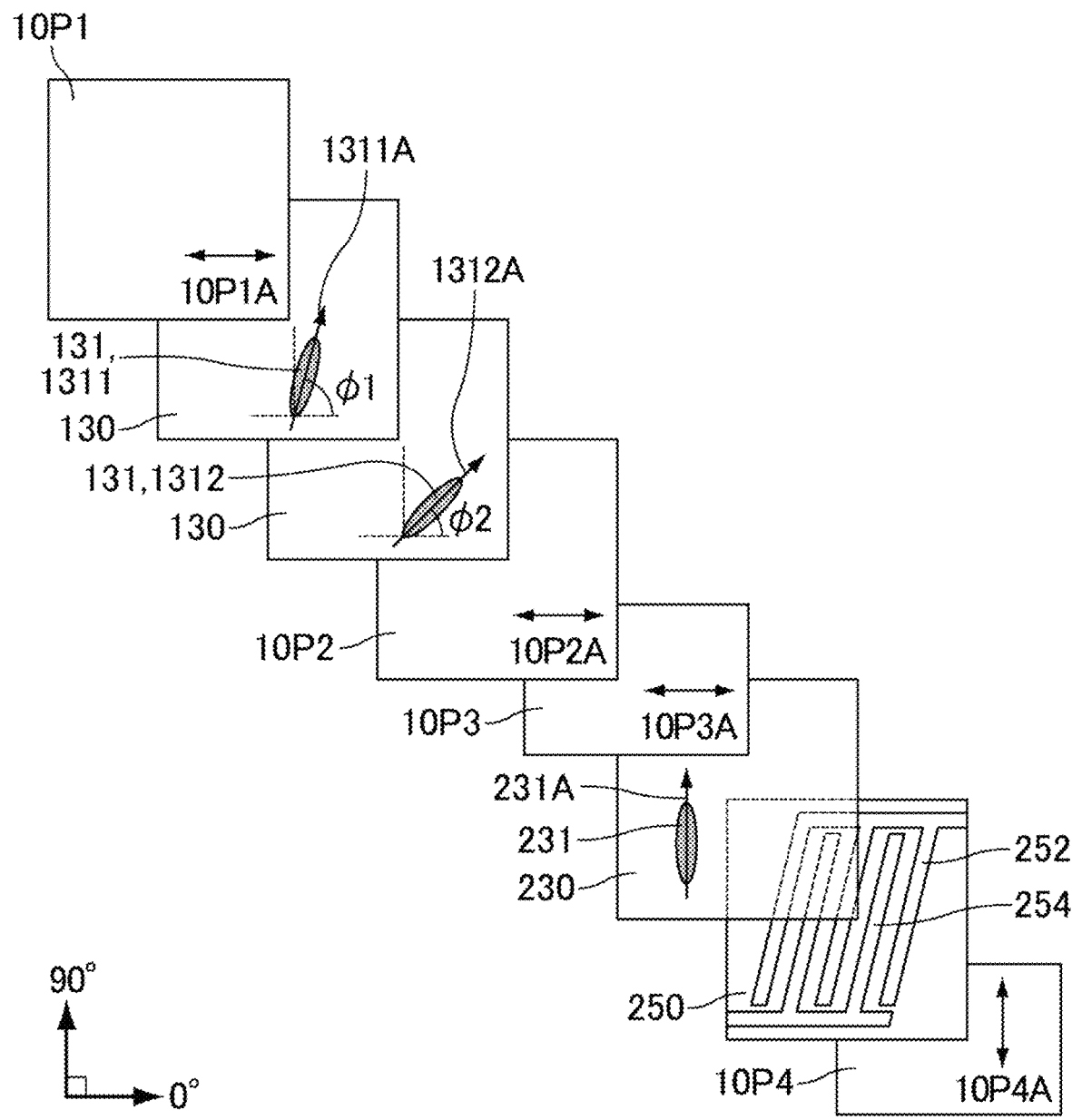
FIG. 19 is a schematic front view of the display device of Example 6.
Figure 20:
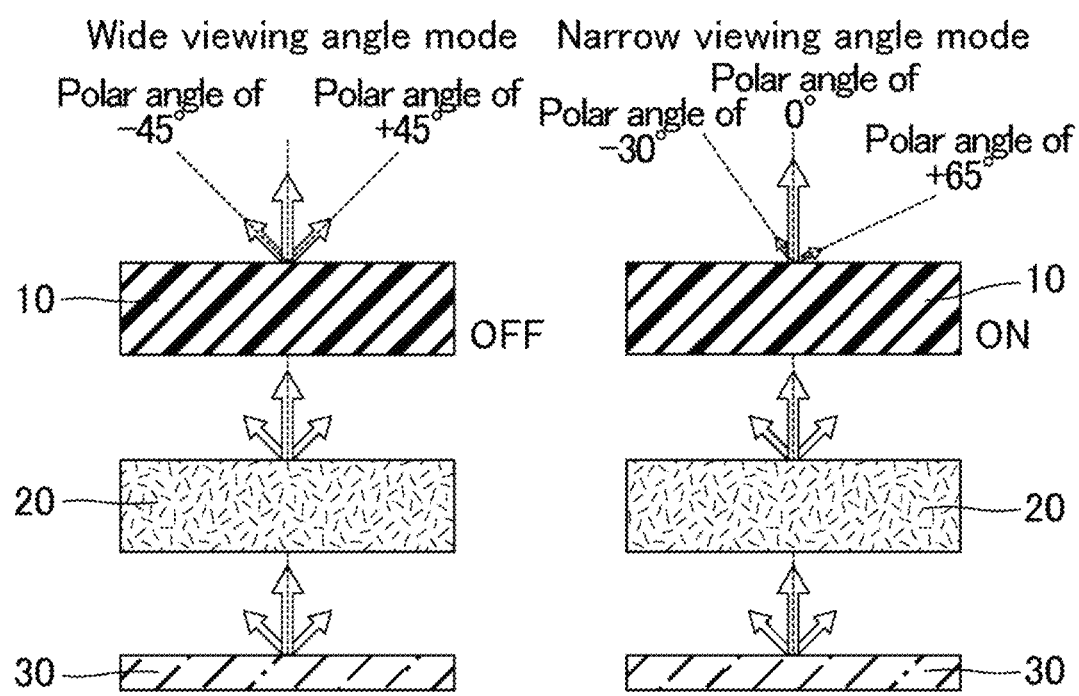
FIG. 20 is a schematic cross-sectional view showing the viewing angles in the narrow viewing angle mode and the wide viewing angle mode of the display device of Example 6.

FIG. 18 is a schematic cross-sectional view of a display device of Example 6. FIG. 19 is a schematic front view of the display device of Example 6. FIG. 20 is a schematic cross-sectional view showing the viewing angles in the narrow viewing angle mode and the wide viewing angle mode of a display device 1 of Example 6. The display device 1 of Example 6 shown in FIG. 18 and FIG. 19 having the same configuration as in Modified Example 1 of Embodiment 2 was used to simulate the viewing angles as in Example 5. The display device 1 of Example 6 had the same configuration as in Example 5 except that it included the viewing angle-controlling liquid crystal panel 10 on the viewing surface side of the liquid crystal display panel 20 and the axis azimuths were varied as shown in FIG. 19. Specifically, the first absorption axis 10P1A of the first polarizing plate 10P1 was at an azimuthal angle of 0°, the second absorption axis 10P2A of the second polarizing plate 10P2 was at an azimuthal angle of 0°, the third absorption axis 10P3A of the third polarizing plate 10P3 was at an azimuthal angle of 0°, and the fourth absorption axis 10P4A of the fourth polarizing plate 10P4 was at an azimuthal angle of 90°.

With no voltage applied to the viewing angle-controlling liquid crystal panel 10, as shown in the left part of FIG. 20, the transmittance of light (polarized light) from the backlight 30 having passed through the liquid crystal display panel 20 and then the viewing angle-controlling liquid crystal panel 10 was high in both the front direction and the oblique direction (polar angle of 45°), which led to bright display in both the front direction and the oblique direction. This resulted in transmission of light to the viewing surface side in a wide polar angle range, so that the display device successfully achieved the wide viewing angle mode.

With voltage applied to the viewing angle-controlling liquid crystal panel 10, as shown in the right part of FIG. 20, the transmittance of light (polarized light) from the backlight 30 having passed through the liquid crystal display panel 20 and then the viewing angle-controlling liquid crystal panel 10 was maximum in the front direction (polar angle of) 0°, while being minimum at a polar angle of −30°. In other words, the display device successfully achieved a light-shielding angle of −30° in the narrow viewing angle mode.

With the configuration of Example 6, the viewing angle-controlling liquid crystal panel 10 can cut light, especially light in oblique directions, among lights resulting from diffraction by the TFTs of the liquid crystal display panel 20 or diffusion by the apertures of the black matrix layer 213. Such a panel was found to exhibit a high capability of blocking light in the narrow viewing angle mode.

The display device 1 shown in Example 6 is applicable to display devices for vehicles, PCs, or smartphones, for example.

Example 7

Figure 21:
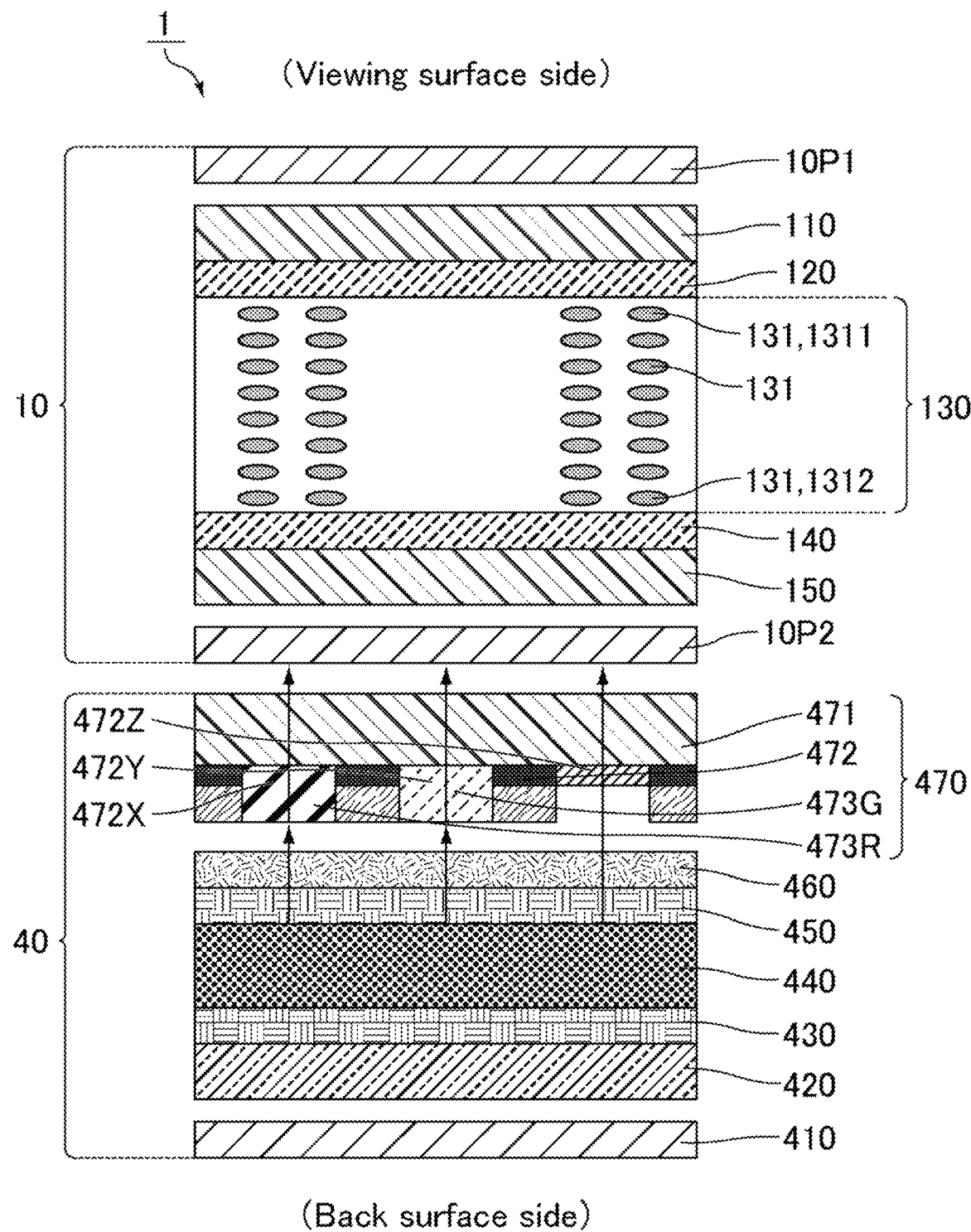
FIG. 21 is a schematic cross-sectional view of a display device of Example 7.
Figure 22:
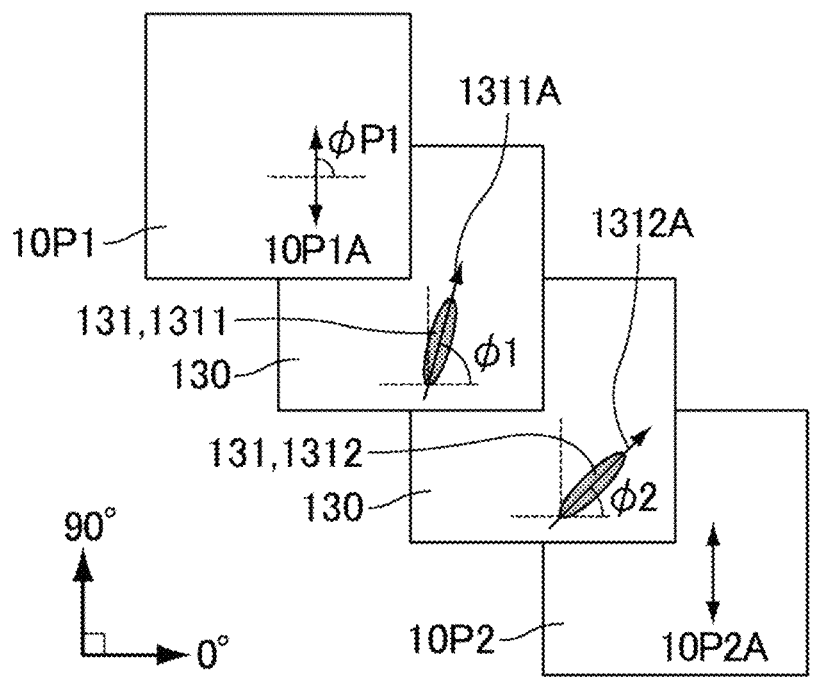
FIG. 22 is a schematic front view of the display device of Example 7.

FIG. 21 is a schematic cross-sectional view of a display device of Example 7. FIG. 22 is a schematic front view of the display device of Example 7. A display device 1 of Example 7 having the same configuration as in Modified Example 2 of Embodiment 2 was used to simulate the viewing angles as in Example 5.

Specifically, as shown in FIG. 21 and FIG. 22, the display device 1 of Example 7 included, sequentially from the back surface side toward the viewing surface side, the organic EL display panel 40 as the display panel, and the viewing angle-controlling liquid crystal panel 10 of Example 3. The organic EL display panel 40 was a color conversion-type OLED.

In the viewing angle-controlling liquid crystal panel 10 with no voltage applied, the azimuthal angle φ1 of the director 1311A of the liquid crystal molecules 1311 near the first substrate 110 was 90°, and the azimuthal angle φ2 of the director 1312A of the liquid crystal molecules 1312 near the second substrate 150 was 75°. The first absorption axis 10P1A of the first polarizing plate 10P1 and the second absorption axis 10P2A of the second polarizing plate 10P2 were at an azimuthal angle of 90°.

The organic EL display panel 40 included, sequentially from the back surface side toward the viewing surface side, a TFT substrate 410, an anode 420, a hole injection layer/hole transport layer 430, a blue light-emitting layer 440, an electron injection layer/electron transport layer 450, a cathode 460, and a counter substrate 470. The counter substrate 470 included on a support substrate 471 a black matrix layer 472 provided with a first aperture 472X, a second aperture 472Y, and a third aperture 472Z, a red quantum dot sheet 473R disposed in the first aperture 472X, and a green quantum dot sheet 473G disposed in the second aperture 472Y.

Figure 23:
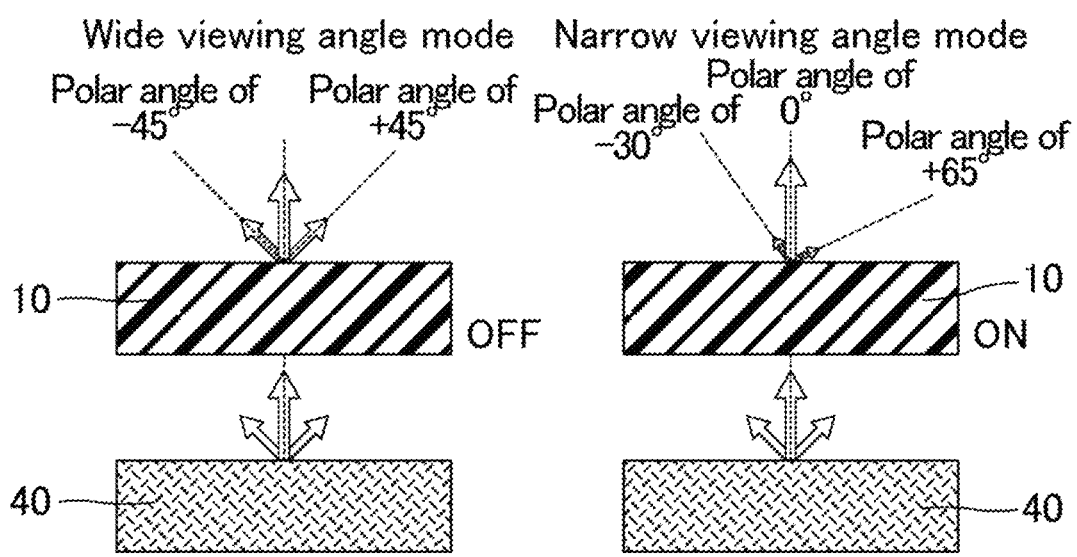
FIG. 23 is a schematic cross-sectional view showing the viewing angles in the narrow viewing angle mode and the wide viewing angle mode of the display device of Example 7.

FIG. 23 is a schematic cross-sectional view showing the viewing angles in the narrow viewing angle mode and the wide viewing angle mode of the display device of Example 7. With no voltage applied to the viewing angle-controlling liquid crystal panel 10, as shown in the left part of FIG. 23, the transmittance of light (unpolarized light) from the organic EL display panel 40 having passed through the viewing angle-controlling liquid crystal panel 10 was high in both the front direction and the oblique direction (polar angle of 45°), which led to bright display in both the front direction and the oblique direction. This resulted in transmission of light to the viewing surface side in a wide polar angle range, so that the display device successfully achieved the wide viewing angle mode.

With voltage applied to the viewing angle-controlling liquid crystal panel 10, as shown in the right part of FIG. 23, the transmittance of light (unpolarized light) from the organic EL display panel 40 having passed through the viewing angle-controlling liquid crystal panel 10 was maximum in the front direction (polar angle of 0°), while being minimum at a polar angle of −30°. In other words, the display device successfully achieved a light-shielding angle of −30° in the narrow viewing angle mode.

The configuration of Example 7 adopts the organic EL display panel 40 as the display panel and thus the display device can be reduced in thickness and weight as compared with a case of adopting the liquid crystal display panel 20. This configuration is therefore suitable for mobile device uses. The display device 1 shown in Example 7 is applicable to display devices for vehicles, PCs, or smartphones, for example.

Example 8-1 to Example 8-4

Figure 24:
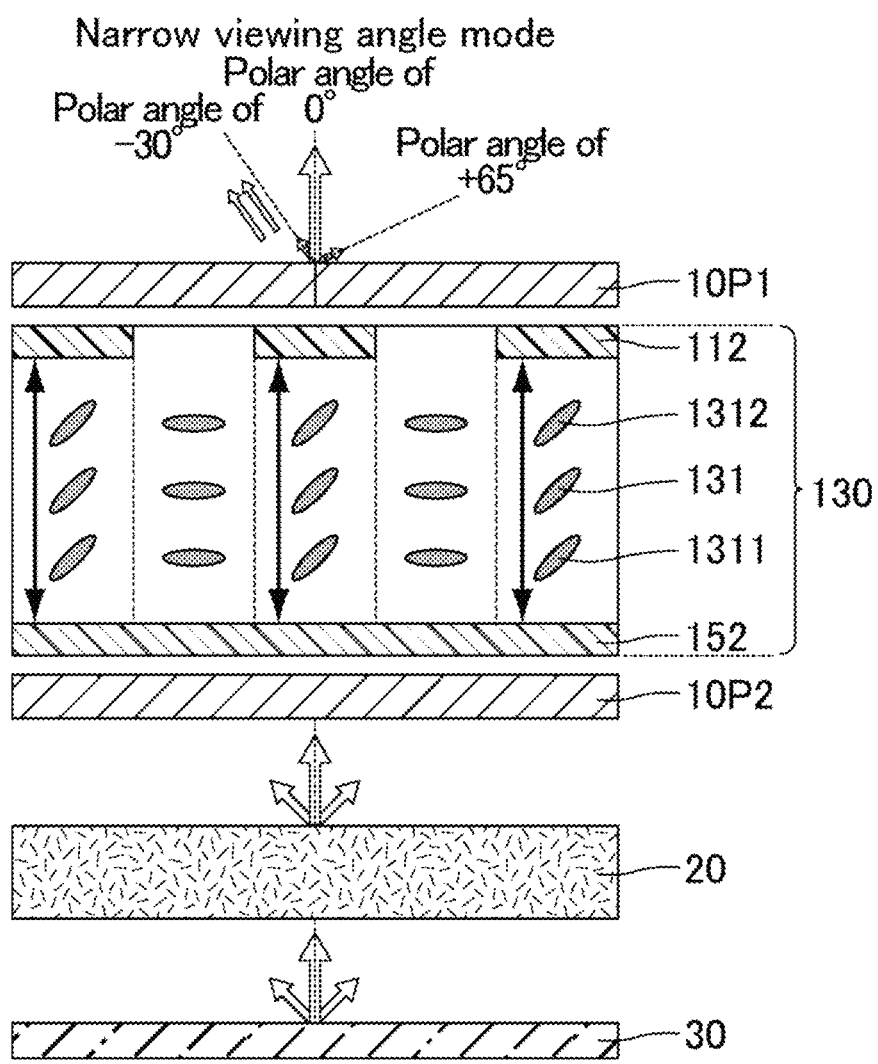
FIG. 24 is a schematic cross-sectional view showing the viewing angles in the narrow viewing angle mode of display devices of Example 8-1 to Example 8-4.
Figure 25:
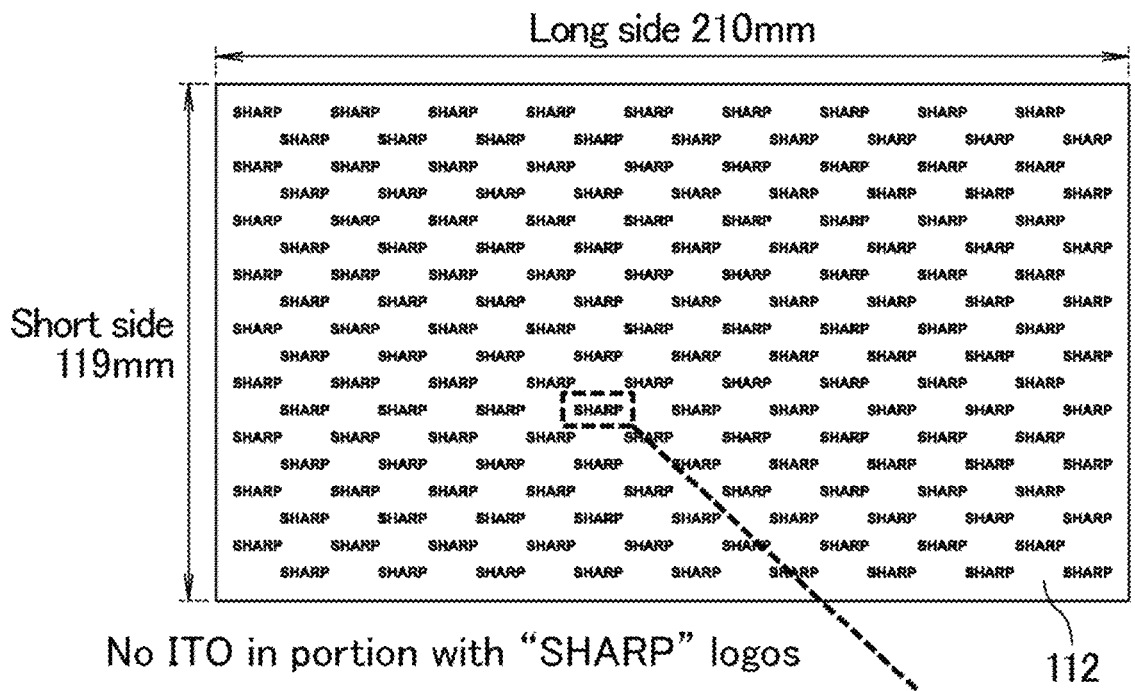
FIG. 25 is a view showing a pattern on a first electrode in the display device of Example 8-1.
Figure 25:
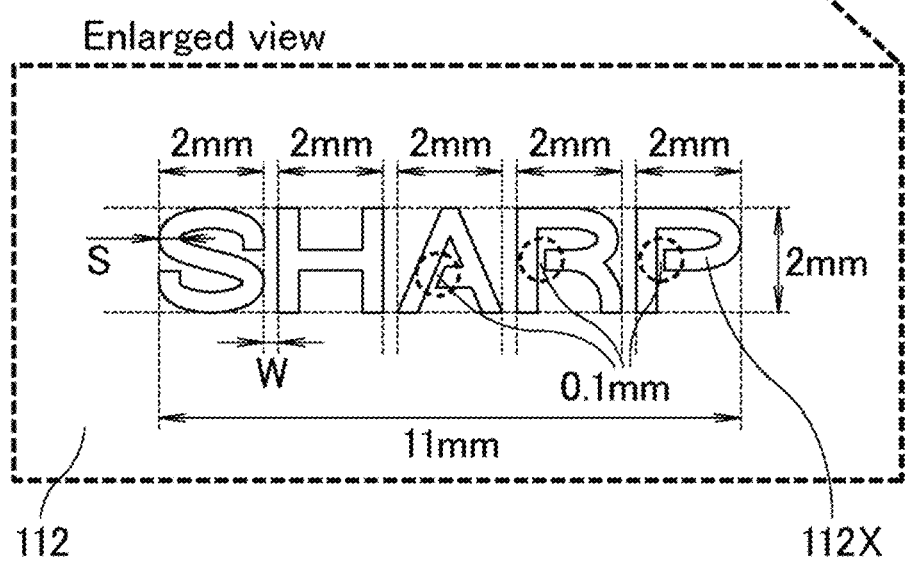
Figure 26:
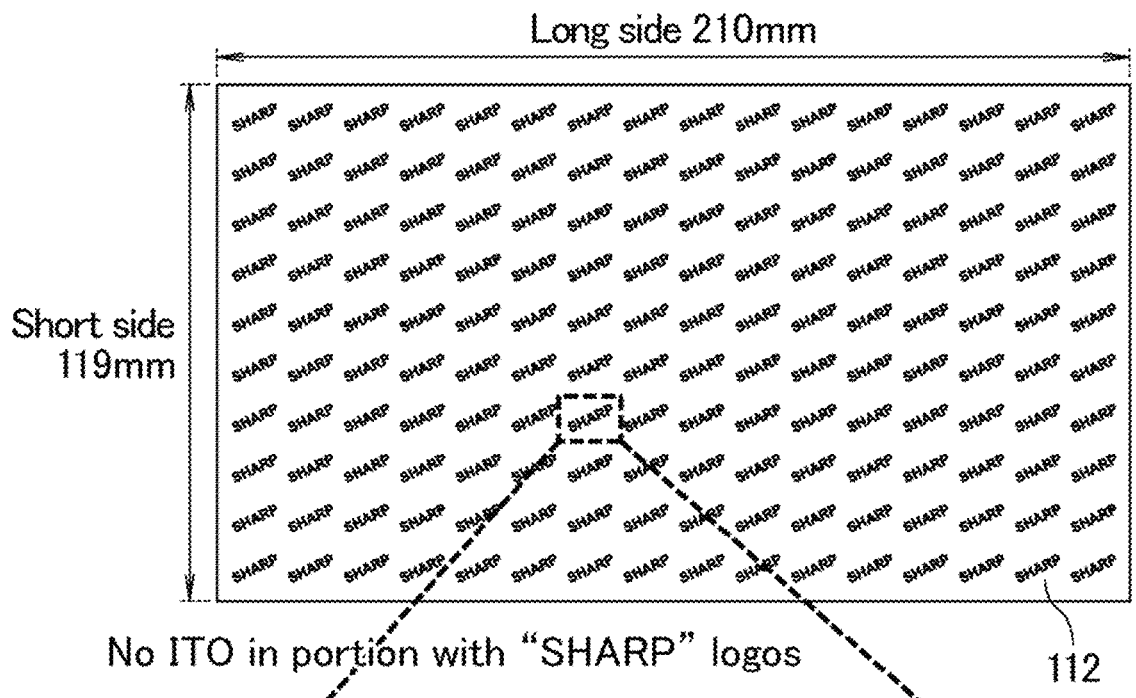
FIG. 26 is a view showing a pattern on a first electrode in the display device of Example 8-2.
Figure 26:
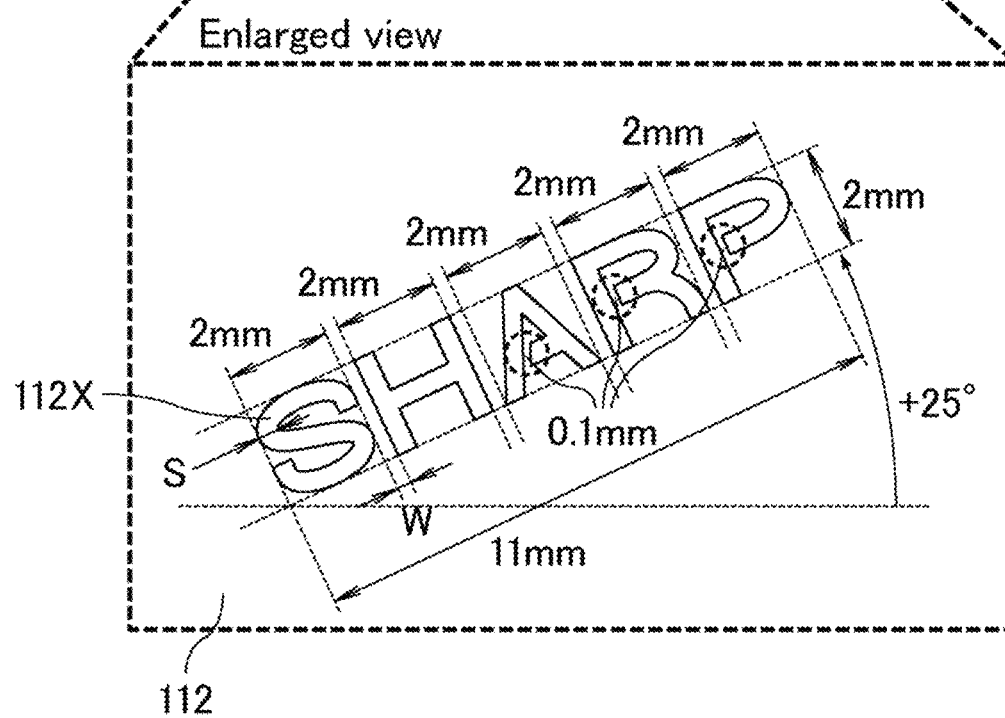
Figure 27:
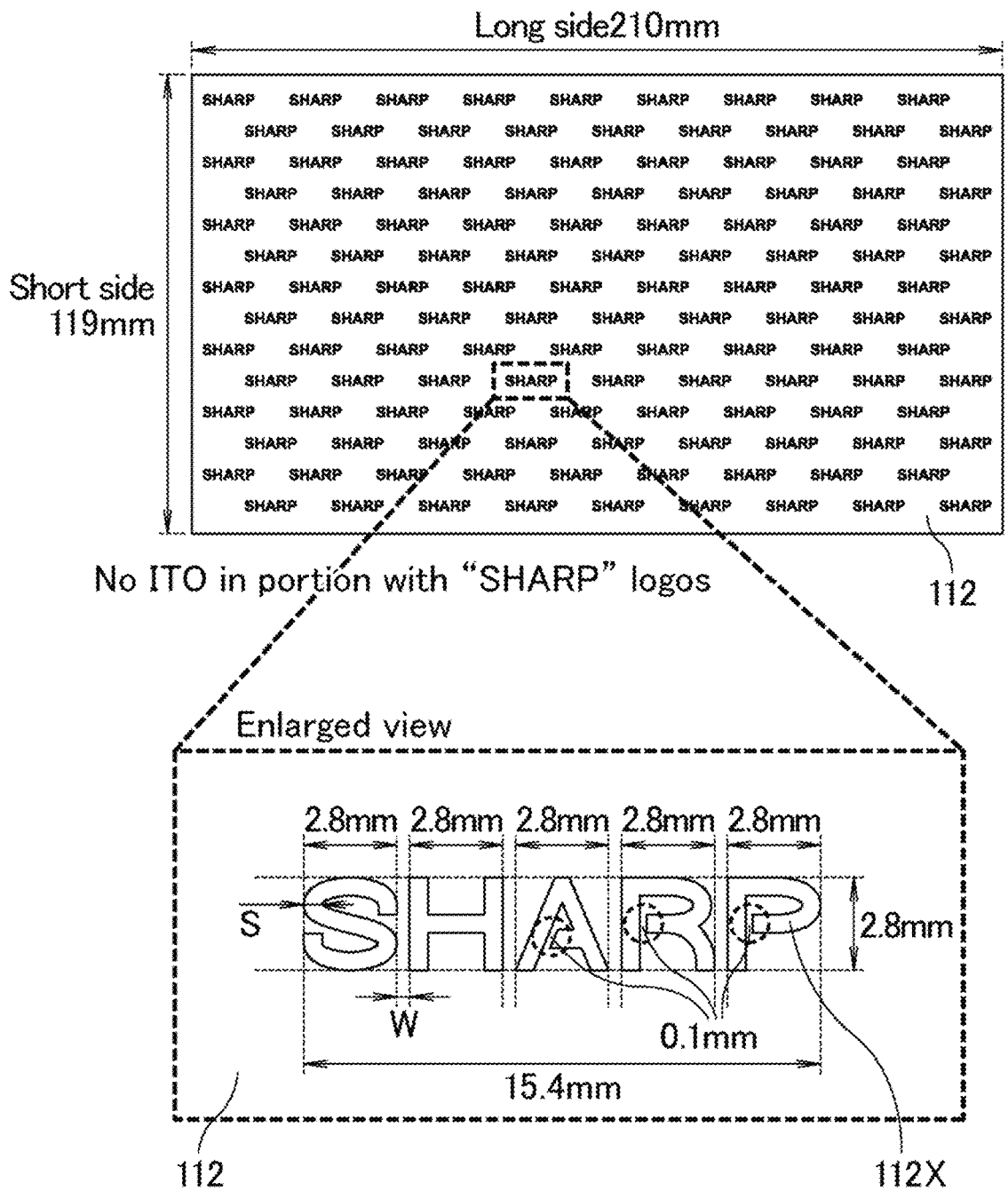
FIG. 27 is a view showing a pattern on a first electrode in the display device of Example 8-3.
Figure 28:
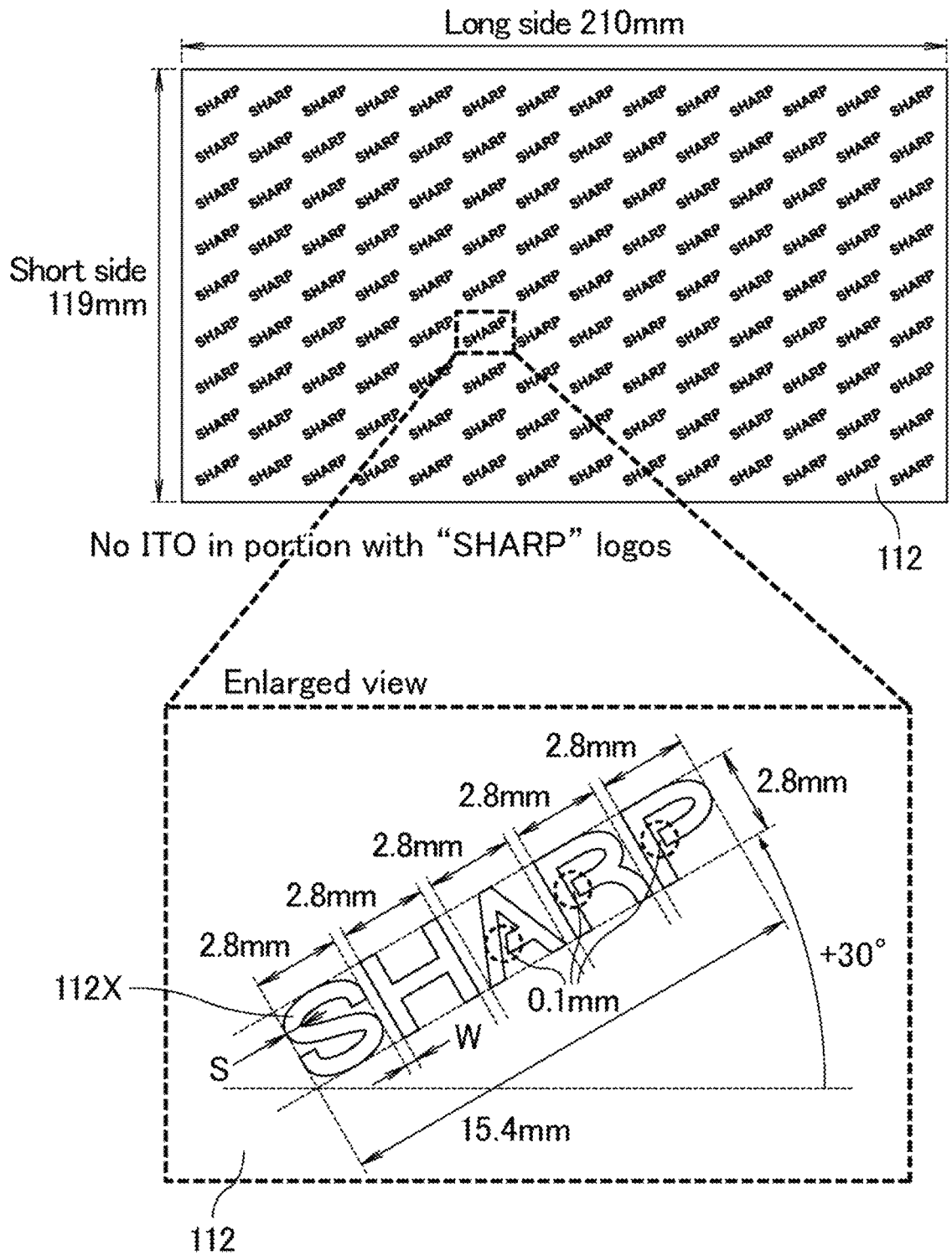
FIG. 28 is a view showing a pattern on a first electrode in the display device of Example 8-4.
Figure 29:
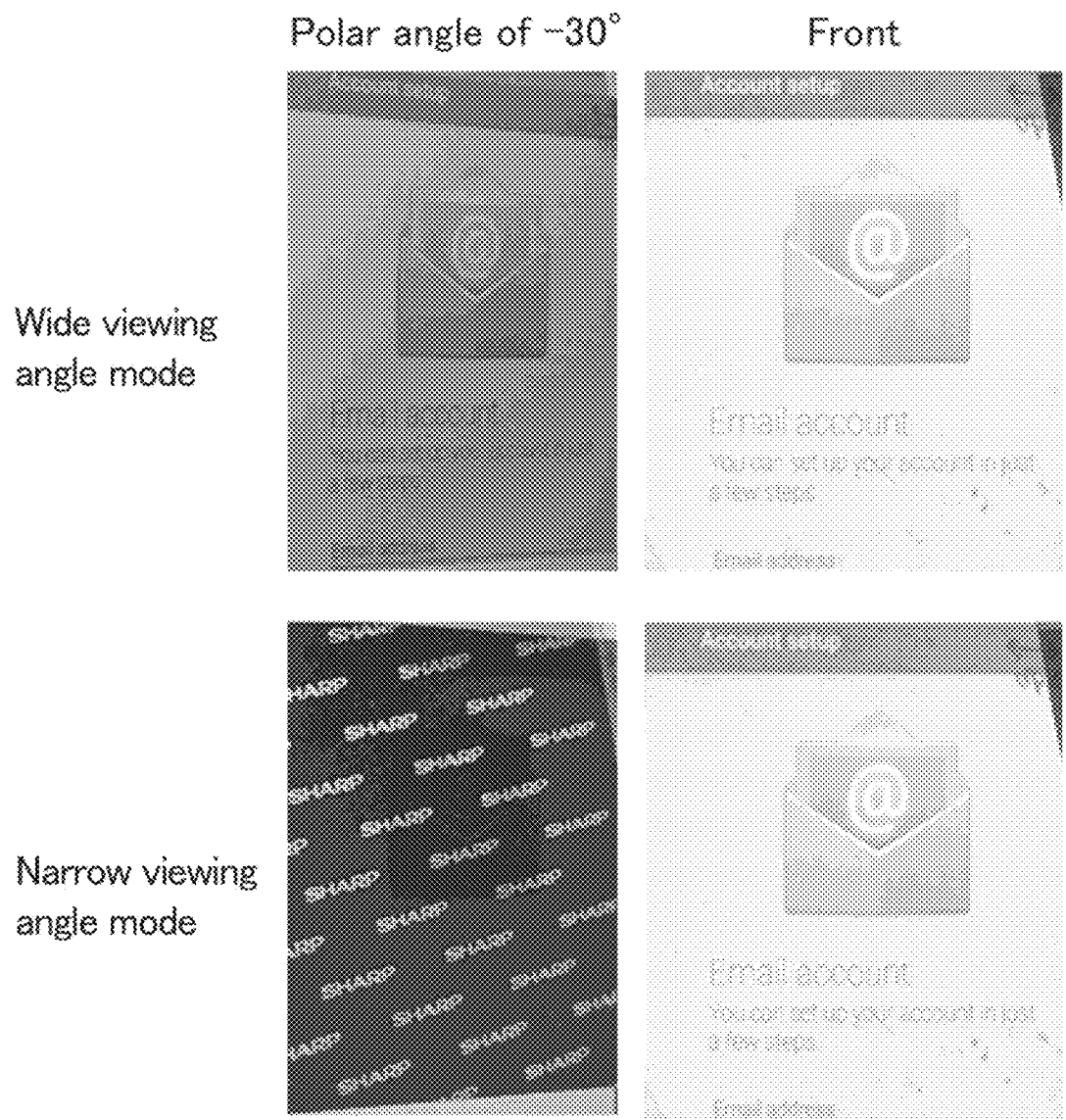
FIG. 29 is a view of examples of the appearance of a sample in the narrow viewing angle mode and the wide viewing angle mode in the display devices of Example 8-1 to Example 8-4.

FIG. 24 is a schematic cross-sectional view showing the viewing angles in the narrow viewing angle mode of display devices of Example 8-1 to Example 8-4. FIG. 25 to FIG. 28 are views respectively showing the patterns on the first electrodes in the display devices of Example 8-1 to Example 8-4. In FIG. 25 and FIG. 26, for example, the width W between the characters can be set to 0.25 mm, and the width S of each line of characters can be set to 0.5 mm. The logos in FIG. 26 can be tilted by, for example, 25°. In FIG. 27 and FIG. 28, for example, the width W between characters can be set to 0.35 mm, and the width S of each line of characters can be set to 0.5 mm. The logos in FIG. 28 can be tilted by, for example, 30°. FIG. 29 is a view of examples of the appearance of a sample in the narrow viewing angle mode and the wide viewing angle mode in the display devices of Example 8-1 to Example 8-4. The image "Email account" in FIG. 29 was displayed on the liquid crystal display panel 20.

As shown in FIG. 25 to FIG. 28, the display devices of Example 8-1 to Example 8-4 having the same configuration as in Example 6, except that the first electrode 112 was patterned with the logos and the retardation Re of the first liquid crystal layer 130 with voltage applied was 800 nm, was used to simulate the viewing angles as in Example 5. The studies made by the present inventors revealed that, when the retardation Re of the first liquid crystal layer with voltage applied was 600 nm, the front transmittance is different (a difference of about 13% was generated) between the wide viewing angle mode and the narrow viewing angle mode, so that the logos were observable from the front. Thus, in the display devices of Example 8-1 to Example 8-4, the retardation Re of the first liquid crystal layer 130 with voltage applied was set to 800 nm in order to reduce the difference in front transmittance between the wide viewing angle mode and the narrow viewing angle mode (to substantially 0%), and to allow the logos to be perceived in an oblique view while preventing the logos from being perceived in the front view.

As shown in FIG. 24, the first electrodes 112 of the viewing angle-controlling liquid crystal panels 10 in the display devices 1 of Example 8-1 to Example 8-4 were respectively patterned with the "SHARP" logos as shown in FIG. 25 to FIG. 28. In other words, the first electrodes 112 each were made of ITO and provided with an aperture 112X with no ITO correspondingly to the portion with the "SHARP" logos.

The display devices 1 of Example 8-1 to Example 8-4, as shown in FIG. 25 to FIG. 28, included the viewing angle-controlling liquid crystal panel 10 having the first electrode 112 which was an ITO electrode patterned with the logos, and the liquid crystal display panel 20.

With no voltage applied to the viewing angle-controlling liquid crystal panel 10, the transmittance of light (polarized light) from the backlight 30 having passed through the liquid crystal display panel 20 and then the viewing angle-controlling liquid crystal panel 10 (the logoed ECB mode liquid crystal panel having asymmetric viewing angle range) was high in both the front direction and the oblique direction (polar angle of −30°), which led to bright display in both the front direction and the oblique direction. This resulted in transmission of light to the viewing surface side in a wide polar angle range as shown in FIG. 29, so that the display device successfully achieved the wide viewing angle mode.

With voltage applied to the viewing angle-controlling liquid crystal panel 10, as shown in FIG. 24 and FIG. 29, the transmittance of light (polarized light) from the backlight 30 having passed through the liquid crystal display panel 20 and then the viewing angle-controlling liquid crystal panel 10 was maximum in the front direction (polar angle of 0°), while being minimum at a polar angle of −30°. In other words, the display device successfully achieved a light-shielding angle of −30° in the narrow viewing angle mode. Here, the portion with the "SHARP" logos transmits light and thus the logos, i.e., characters, are displayed. These logos made the contents with "Email account", displayed on the liquid crystal display panel 20 behind the back surface of the viewing angle-controlling liquid crystal panel 10, less perceivable than in the case with no "SHARP" logos, which successfully further enhanced privacy protection. Also, increasing the size of the logos to reduce the density as in Example 8-4 in FIG. 28 was found to successfully further enhance privacy protection at a polar angle of −30°.

The display devices 1 of Example 8-1 to Example 8-4 are applicable to display devices for vehicles, PCs, or smartphones, for example.

Example 9

Figure 30:
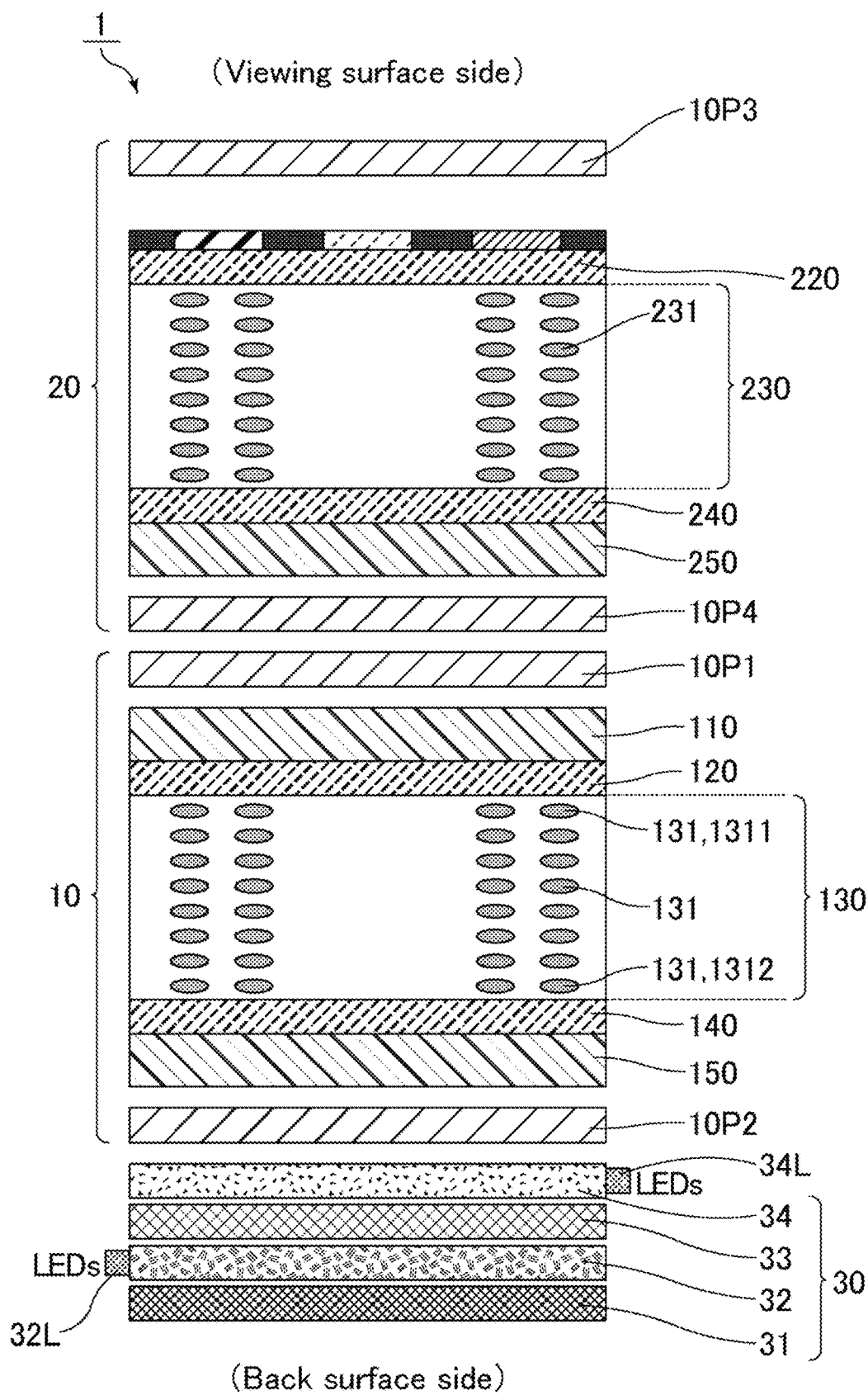
FIG. 30 is a schematic cross-sectional view of a display device of Example 9.
Figure 31:
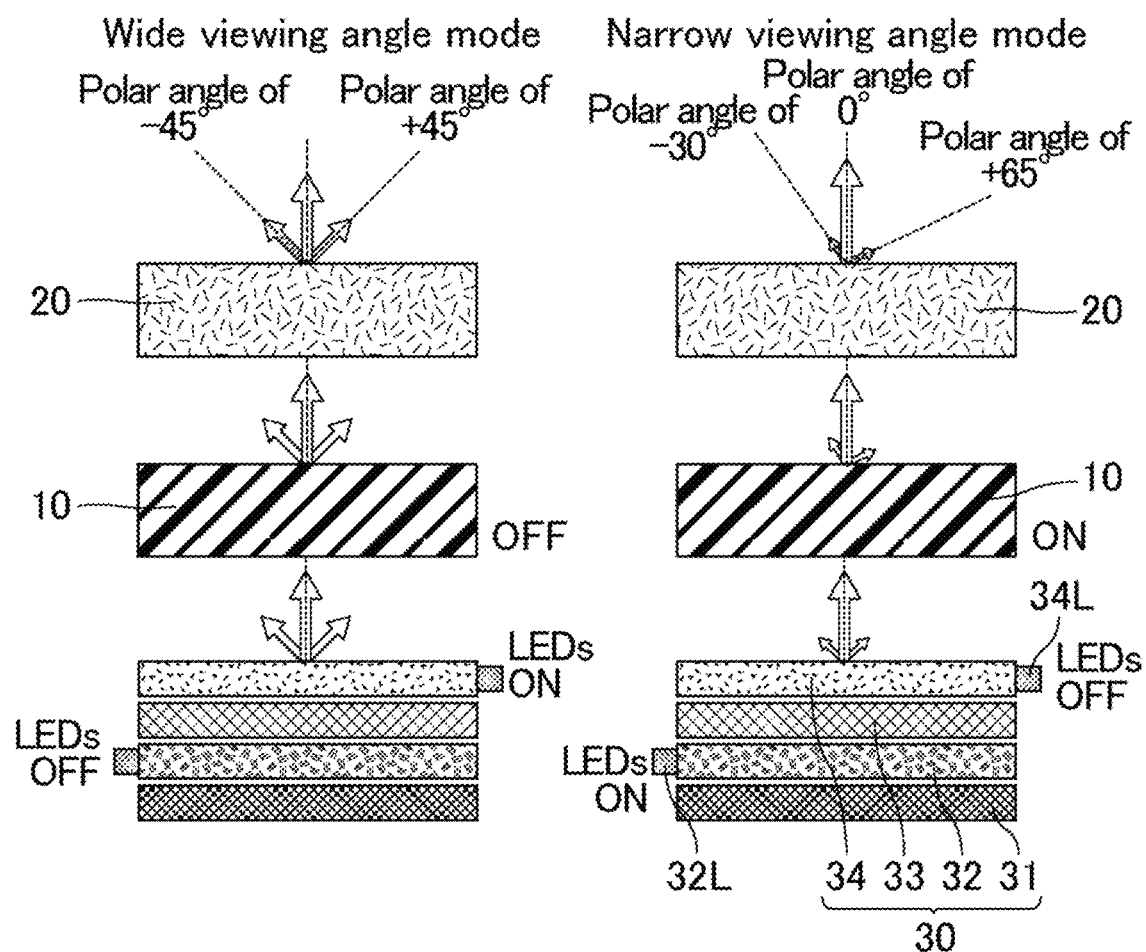
FIG. 31 is a schematic cross-sectional view showing the viewing angles in the narrow viewing angle mode and the wide viewing angle mode of the display device of Example 9.

FIG. 30 is a schematic cross-sectional view of a display device of Example 9. FIG. 31 is a schematic cross-sectional view showing the viewing angles in the narrow viewing angle mode and the wide viewing angle mode of a display device of Example 9. A display device 1 of Example 9 shown in FIG. 30 was used to simulate the viewing angles as in Example 5. The display device 1 of Example 9 had the same configuration as in Example 5 except for the configuration of the backlight 30. The backlight 30 of Example 9 included, sequentially from the back surface side toward the viewing surface side, an enhanced specular reflector (ESR) 31 available from 3M, a privacy-mode light guide plate 32 having LEDs 32L at its end, a louver film 33 that cuts light in the left-right direction, and a public-mode light guide plate 34 having LEDs 34L at its end. The ESR 31 was an optical film formed from a polyester resin (multilayered film structure) and had a reflectance of not lower than 98%. The public-mode light guide plate 34 had a function of diffusing light from the LEDs 34L on the structures engraved in the public-mode light guide plate 34, thereby emitting diffused light toward the viewing angle-controlling liquid crystal panel 10. The privacy-mode light guide plate 32 had a function of allowing light from the LEDs 32L to pass through the louver film 33, thereby emitting light with directivity toward the viewing angle-controlling liquid crystal panel 10.

With no voltage applied to the viewing angle-controlling liquid crystal panel 10, the LEDs 32L at the end of the privacy-mode light guide plate 32 being in the off state, and the LEDs 34L at the end of the public-mode light guide plate 34 being in the on state, as shown in the left part of FIG. 31, the transmittance of light (unpolarized light) from the backlight 30 having passed through the liquid crystal display panel 20 and then the viewing angle-controlling liquid crystal panel 10 was high in both the front direction and the oblique direction (polar angle of 45°), which led to bright display in both the front direction and the oblique direction. This resulted in transmission of light to the viewing surface side in a wide polar angle range, so that the display device successfully achieved the wide viewing angle mode.

With voltage applied to the viewing angle-controlling liquid crystal panel 10, the LEDs 32L at the end of the privacy-mode light guide plate 32 being in the on state, and the LEDs 34L at the end of the public-mode light guide plate 34 being in the off state, as shown in the right part of FIG. 31, the transmittance of light (polarized light) from the backlight 30 having passed through the liquid crystal display panel 20 and then the viewing angle-controlling liquid crystal panel 10 was maximum in the front direction (polar angle of) 0°, while being minimum at a polar angle of −30°. In other words, the display device successfully achieved a light-shielding angle of −30° in the narrow viewing angle mode.

With the two light guide plates of the privacy-mode light guide plate 32 and the public-mode light guide plate 34, the luminance modulation width can be increased in an oblique direction (oblique polar angle on one side) in the wide viewing angle mode and the narrow viewing angle mode (i.e., wide luminance-controlling range can be achieved). This can further increase the luminance in the wide viewing angle mode while more clearly switching the modes and blocking light at a higher level in the narrow viewing angle mode.

REFERENCE SIGNS LIST

1: display device
10: viewing angle-controlling liquid crystal panel
10P1: first polarizing plate
10P1A: first absorption axis
10P1B: first transmission axis
10P2: second polarizing plate
10P2A: second absorption axis
10P2B: second transmission axis 10P3: third polarizing plate
10P3A: third absorption axis
10P4: fourth polarizing plate
10P4A: fourth absorption axis
11P, 21P: pixel
20: liquid crystal display panel
30, 30N: backlight
31: ESR
32: privacy-mode light guide plate
32L, 34L, 36L, 39L: LED
33, 38, 381: louver film
34, 39: public-mode light guide plate
35: reflector
36: normal light guide plate
37: prism sheet
40: organic EL display panel
50: screen
110: first substrate
111: first support substrate
112: first electrode
112X: aperture
120: first alignment film
130: liquid crystal layer (first liquid crystal layer)
131, 1311, 1312, 231: liquid crystal molecule
131A, 1311A, 1312A, 231A: director
140: second alignment film
150: second substrate
151: second support substrate
152: second electrode
153, 256: gate line
154, 257: source line
155: TFT (thin film transistor)
160: negative C plate
210: third substrate
211: third support substrate
212: color filter layer
212C, 212CB, 212CG, 212CR: color filter
213: black matrix layer
213S: aperture
220: third alignment film
230: second liquid crystal layer
240: fourth alignment film
250: fourth substrate
250P: pixel electrode
250PS: slit
251: fourth support substrate
252: third electrode
253: insulating layer
254: fourth electrode
254a: linear electrode
254b: aperture
410: TFT substrate
420: anode
430: hole injection layer/hole transport layer
440: blue light-emitting layer
450: electron injection layer/electron transport layer
460: cathode
470: counter substrate
471: support substrate
472: black matrix layer
472X: first aperture
472Y: second aperture
472Z: third aperture
473G: green quantum dot sheet
473R: red quantum dot sheet
S, W: width

What is claimed is:

1. A liquid crystal panel sequentially comprising:
a first polarizing plate with a first absorption axis;
a first substrate including a first electrode;
a liquid crystal layer containing liquid crystal molecules; and
a second substrate including a second electrode, wherein
the liquid crystal panel satisfies the following Formula (1) as well as the following Formula (2-1) or Formula (2-2):

$$5° \leq |\varphi1 - \varphi2| \leq 20° \quad \text{(Formula 1)}$$

$$5° \leq |\varphi P1 - \varphi2| \leq 20° \quad \text{(Formula 2-1)}$$

$$65° \leq |\varphi P1 - \varphi2| \leq 80° \quad \text{(Formula 2-2)}$$

wherein φ1 represents an azimuthal angle of a director of liquid crystal molecules near the first substrate, φ2 represents an azimuthal angle of a director of liquid crystal molecules near the second substrate, and φP1 represents an azimuthal angle of the first absorption axis of the first polarizing plate, each without any voltage applied,
the first electrode or the second electrode has a pattern when viewed from an oblique direction of the liquid crystal panel with voltage applied to the liquid crystal layer,
the pattern is a logo, and an area of the logo is equal to or more than 5 mm² and equal to and less than 500 mm₂, and
a retardation of the liquid crystal layer without any voltage applied is equal to or more than 700 nm and equal to or less than 900 nm.

* * * * *